US007854863B2

(12) United States Patent
Drotleff et al.

(10) Patent No.: US 7,854,863 B2
(45) Date of Patent: *Dec. 21, 2010

(54) FUNCTIONAL MATERIALS FOR USE IN OPTICAL SYSTEMS

(75) Inventors: Elizabeth Drotleff, Worthington, OH (US); Vincent D. McGinniss, Sunbury, OH (US); Steven M. Risser, Reynoldsburg, OH (US); Kevin Bruce, Worthington, OH (US)

(73) Assignee: Battelle Memorial Institute, Columbus, OH (US)

( * ) Notice: Subject to any disclaimer, the term of this patent is extended or adjusted under 35 U.S.C. 154(b) by 769 days.

This patent is subject to a terminal disclaimer.

(21) Appl. No.: 10/505,041

(22) PCT Filed: Feb. 6, 2002

(86) PCT No.: PCT/US02/03582

§ 371 (c)(1),
(2), (4) Date: Aug. 18, 2004

(87) PCT Pub. No.: WO02/069002

PCT Pub. Date: Sep. 6, 2002

(65) Prior Publication Data

US 2006/0175585 A1    Aug. 10, 2006

Related U.S. Application Data

(63) Continuation-in-part of application No. 09/777,439, filed on Feb. 6, 2001, now Pat. No. 6,610,219.

(51) Int. Cl.
*G02B 5/23* (2006.01)
*F21V 9/00* (2006.01)
(52) U.S. Cl. ................. 252/586; 252/582; 359/265; 359/267
(58) Field of Classification Search .......... 252/586, 252/582; 359/265, 267
See application file for complete search history.

(56) References Cited

U.S. PATENT DOCUMENTS

| 4,368,054 | A | * | 1/1983 | Hertel | ............. 8/527 |
| 5,601,947 | A | * | 2/1997 | Skotheim et al. | ........... 429/213 |
| 5,618,872 | A | * | 4/1997 | Pohl et al. | ........... 524/430 |
| 5,621,017 | A | * | 4/1997 | Kobayakawa et al. | ......... 522/16 |
| 6,084,702 | A | * | 7/2000 | Byker et al. | ............. 359/288 |
| 6,610,219 | B2 | * | 8/2003 | McGinniss et al. | .......... 252/582 |

* cited by examiner

*Primary Examiner*—Timothy J. Kugel
(74) *Attorney, Agent, or Firm*—Frost Brown Todd LLC

(57) ABSTRACT

The present invention provides both polymer systems and electrooptic (EO) chromophores that form the components of optical devices such as optical switches and other devices useful in an optical waveguide.

71 Claims, 9 Drawing Sheets

EO Response of the DR1/PMMA Sample

Normalized EO Response of the DR1/PMMA Sample

EO Response of the DR1/PMMA/CaF$_2$ Sample

Normalized EO Response of the DR1/PMMA/CaF$_2$ Sample

EO Response of the EO Active Polymer Sample

Normalized EO Response of the EO Active Polymer Sample

EO Response of the EO Active Polymer Sample with $CaF_2$

Normalized EO Response of the EO Active Polymer Sample with $CaF_2$

FUNCTIONAL MATERIALS FOR USE IN OPTICAL SYSTEMS

FIELD OF THE INVENTION

The field of this invention is functional materials useful in optical systems exemplified by, but not limited to, optical switches, modulators, and other devices that are compatible with silica or non-silica waveguides.

BACKGROUND OF THE INVENTION

A waveguide is any structure which permits the propagation of a wave through its length despite diffractive effects, and possible curvature of the guide structure. An optical waveguide is an optical structure capable of guiding a beam of laser light along light channels in the waveguide, and is defined by an extended region of increased index of refraction relative to the surrounding medium. The waveguide typically includes both the light channels in which light waves propagate in the waveguide, and surrounding cladding which confine the waves in the channel. The strength of the guiding, or the confinement, of the wave depends on the wavelength of light, the refractive index difference between the guide and the cladding, and the guide dimensions.

Discrete control of the refractive index of a given functional optical material is necessary for creating silica or non-silica waveguide optical switch components; however, it is not the only property, which determines the durability and efficiency required for a commercial product. The present invention demonstrates that there is a critical interplay between the polymer, the substrate, the electrodes and the electro-optic material which must be elucidated to create a commercially viable product.

Bosc et al., describe the use of two fluorinated monomers (1H, 1H, 2H, 2H tridecafluoro-octyl methacrylate and trifluoroethyl methacrylate) to create passive copolymers having refractive index values between 1.370 and 1.403 at 1.3 um (*Design and Synthesis of Low Refractive Index Polymers for Modulation in Optical Waveguides*, Optical Materials Vol. 13 (1999), pp. 205-209). Bosc, et al. further discuss copolymerization of an electro-optic monomer, methacrylic acid ester of Disperse Red 1 (the refractive index for a homopolymer of this material is 1.710). These monomers were blended to achieve a final terpolymer refractive index greater than 1.5. The Tg of these systems varied between 82° C. and 92° C. While these compositions allow (possess) some degree of optical modulation, they are not suitable for use in an optical switch, which requires the reliability and efficiency requirements of commercial communications networks.

BRIEF DESCRIPTION OF THE INVENTION

These and other deficiencies of the prior art are overcome by the present invention, which provides both polymer systems and electrooptic (EO) chromophores that form the components of a optical devices such as optical switches or modulators and other devices useful in an optical waveguide.

The polymer component is a thermoplastic or thermosetting polymer, which is blended or co-polymerized with an electrooptic chromophore. The thermoplastic or thermosetting polymer is typically selected from the group consisting of acrylics/methacrylics, polyesters, polyurethanes, polyimides, polyamides, polyphosphazenes, epoxy resins, and hybrid (organic-inorganic) or nanocomposite polyester polymers. Combinations of thermoplastic and thermosetting polymers (interpenetrating polymer networks) are also envisioned as part of this invention.

Additionally, the thermoplastic and/or thermosetting polymer typically has a glass transition temperatures above 100° C., one embodiment for low index materials has a refractive index values less than 1.5 while another embodiment for high index materials has refractive index values greater than 1.5. The polymers are combined with chromophores, either through blending or copolymerization and typically contain compatibilization additives or groups and/or adhesion promotion additives or groups. The chromophores according to the invention typically consists of a donor component, a conjugated and/or aromatic bridge region, and an acceptor component. The bridge and/or the acceptor typically have one or more fluorine atoms, located to enhance the compatibility of the chromophore with the polymers of this invention, while also enhancing or not substantially diminishing the nonlinear optical properties of the chromophore.

BRIEF DESCRIPTION OF THE DRAWING

For a fuller understanding of the nature and advantages of the present invention, reference should be had to the following detailed description taken in connection with the accompanying drawing, which.

DETAILED DESCRIPTION OF THE INVENTION

Figure 1:
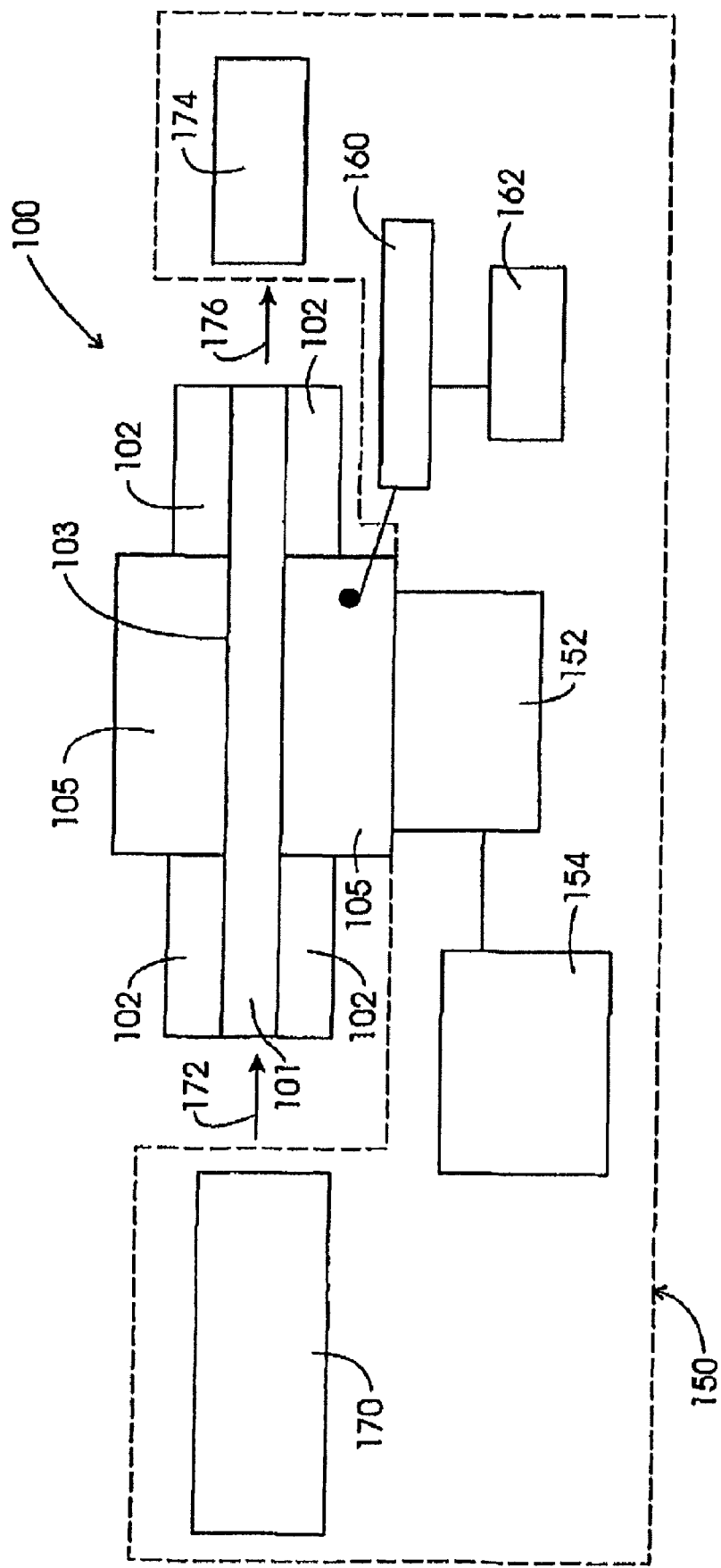
FIG. 1 illustrates a schematic for one embodiment of the invention where a material according to the invention is used to control light passing through a fiber optic waveguide in response to temperature changes.

A functional optical material is any optical material that changes its index of refraction or other selected optical property in response to changes in its environment. Examples of changes in the environment include, but are not limited to, changes in an electrical field, changes in a magnetic field, changes in temperature, and changes in pressure.

This invention broadly discloses functional optical materials and/or their applications that relate to optically active chromophores. An optically active chromophore is any molecule or chemical group, which changes its index of refraction or produces a change in the index of refraction of a compound or composition containing it, upon a change in the environmental conditions in which it is placed. More specifically, the invention discloses compounds and/or their uses that relate to electrooptic chromophores, thermooptic chromophores, and magnetooptic chromophores. An electrooptic chromophore is any molecule or chemical group which changes its refractive index or produces a change in the refractive index of a compound or composition containing it upon application of an electric field. A thermooptic chromophore is any molecule or chemical group which changes its refractive index or produces a change in the refractive index of a compound or composition containing it upon a change in temperature. A magnetooptic chromophore is any molecule or chemical group which changes its refractive index or produces a change in the refractive index of a compound or composition containing it upon application of a magnetic field.

The present invention provides both polymer systems and optically active chromophores that form the components in optical systems such as an optical switch useful for in an optical waveguide.

The following definitional terms apply to the present application:

Precursor materials unless specifically labeled otherwise are in weight percent (wt-%). All measured index of refractions listed herein are measured at about 20° C., and at wavelengths at the Sodium D line, about 589 nm, unless labeled otherwise.

As used herein, "glass transition temperature" or $T_g$ refers to the temperature in a polymer at which a hardened polymer shows a transition toward more mobile polymer chains as evidenced by dielectric spectroscopy.

The term "backbone" or "polymer backbone" as used herein indicates the extended linear repeating chain of a polymer.

Unless noted otherwise, all commercial polymers, solvents, chromophores, and chemicals were purchased from Aldrich Chemical Company, P.O. Box 2060 Milwaukee, Wis., 53201

I. Polymer Systems

The polymers of this invention are thermoplastic (i.e., melt-flow or solvent soluble), thermosetting in nature (i.e., resist melting and are not soluble in solvents), or are a combination of thermoplastic and thermosetting polymers (e.g., interpenetrating polymer networks).

The typical molecular weight range (number average) of polymers of this invention is between about 5,000 to about 5,000,000. Preferably the polymers of the invention have a molecular weight range between about 7,000 to about 1,000,000. Most preferably, the polymers of this invention have a molecular weight range of about 10,000 to about 500,000.

Additionally, the polymers of this invention typically have glass transition temperatures above 100° C. The refractive index values of these polymeric compositions typically vary between about 1.3 to about≧1.5 in one embodiment, and from about 1.5 to about 1.8 in a second embodiment. Typically, the polymers of the present invention can contain (as part of the backbone structure) between 0.1 and 10% of an adhesive promotion group or combination of groups such as, for example, silane, carboxylic acid, nitrile, or hydroxyl functional groups. Additionally, all of the polymers can be either blended with an EO chromophore or can have the EO chromophore covalently attached to the polymer backbone structure.

Thermoplastic polymers are polymers that soften or become plastic when they are heated. The process of heating and cooling such polymers can be carried out repeatedly without affecting any appreciable change in the properties of the polymers. After thermoplastic polymers are synthesized, they can be dissolved in a solvent and applied to surfaces. Additionally, these polymers can be heated causing them to melt flow and generally develop strong adhesive bonds to a substrate.

Thermosetting polymers include polymer materials in which chemical reactions, including cross-linking, occur while the resins are being molded. The appearance and chemical and physical properties of the final product are entirely changed, and the product is resistant to further applications of heat (up to the charring point). The thermosetting polymers of the present invention are structurally defined as three dimensional crosslinked chains or polymeric network structures.

A primary difference between thermoplastic polymers and thermosetting polymers is that thermoplastic polymers are capable of melting and reflowing, and are soluble in solvents. Thermosetting polymers, after they are cured or crosslinked, are not soluble in solvents and will not reflow when heated. Combinations of thermoplastic and thermosetting polymers (interpenetrating polymer networks) are also envisioned as part of this invention.

The chemistry of thermoplastic and thermosetting polymer systems includes the following preferred materials and reactions:

(a) acrylic thermoplastic polymers containing functional groups (carbon-carbon double bonds, epoxides, alcohols, acids) capable of entering into secondary chemical reactions that create three dimensional network structures that are solvent insoluble or will not melt and reflow upon heating;

(b) polyurethane polymers based on diisocyanates and multifunctional alcohols that react to create three dimensional network structures that are not soluble in solvents;

(c) polyesters that contain ethylenic unsaturated sites in their backbone structure or contain acid/hydroxy functional groups that can be chemically reacted with other appropriate multifunctional crosslinking agents to create three dimensional network structures;

(d) epoxy resins that can be reacted with, e.g., polyamides, polymercaptans, or polyacids to create three dimensional structures; and (e) polyphosphazenes and polysiloxane systems also can be prepared to contain multiple vinyl unsaturation sites that can be cured with peroxides or other free radical addition initiation mechanisms to create three dimensional structures.

A broad embodiment of the invention includes the following:

A. For a low refractive index optical system (e.g., silica based optical waveguide systems): i) selecting and reacting one or more monomers having a low index of refraction (n<1.5); ii) optionally selecting and reacting one, or more monomers having a high index of refraction (n≧1.5), wherein the concentration of the monomer(s) with a high index of refraction is typically less than the concentration of monomer(s) having a low index of refraction; iii) optionally selecting and reacting one or more optically active chromophores according to the invention, or optionally one or more of conventional optical chromophores disclosed herein, or optionally selecting and blending one or more optically active chromophores according to the invention, or optionally one or more of conventional optical chromophores disclosed herein, with the proviso that at least one chromophore must be selected; iv) optionally selecting and reacting one or more compatibilizers for the selected chromophore(s); v) optionally selecting and reacting one or more adhesion enhancers according to the invention. Additional materials may be added to obtain selected properties such as, for example, electrical properties, flow control, water resistance, and the like.

B. For a high refractive index optical system (e.g., non-silica based optical waveguide systems): i) selecting and reacting one or more monomers having a high index of refraction ($n \geq 1.5$) according to the invention; ii) optionally selecting and reacting one or more monomers having a low index of refraction ($n<1.5$) according to the invention wherein the concentration of the monomer having a low index refraction is typically less than the monomer having a high index of refraction, iii) optionally selecting and reacting one or more optically active conventional chromophores disclosed herein, or optionally one or more of the optically active chromophores according to the invention, or optionally selecting and blending one or more optically active chromophores according to the invention, or optionally one or more of conventional optical chromophores disclosed herein, with the proviso that at least one chromophore must be selected; iv) optionally selecting and reacting one or more compatibilizers for the one or more chromophores; v) and optionally selecting and reacting one or more adhesion enhancers according to the invention. Additional materials may be added to obtain selected properties such as electrical properties, flow control, water resistance, and the like.

Typical polymer systems or functional optical materials of the present invention are derived from selected combinations of the following materials:
 (i) low refractive index monomers;
 (ii) high refractive index monomers;
 (iii) polar and nonpolar monomers;
 (iv) optically active chromophores, such as EO chromophores (conventional and the novel chromophores disclosed herein) that react with monomers of this invention or can be blended with the polymers of this invention;
 (v) monomers that act as compatibilizers or solubilizers for optically active chromophores, such as EO or thermooptic chromophores that are blended with the materials of this invention;
 (vi) monomers that act as compatibilizers or solubilizers for optically active chromophores, such as EO or thermooptic chromophores that react with monomers for forming polymers according to the invention;
 (vii) adhesion promotion monomers (e.g., for glass and metal electrodes);
 (viii) monomers that provide thermal stability;
 (ix) monomers that provide moisture resistance;
 (x) monomers which increase or provide high Tg values (e.g., greater than 100° C.);
 (xi) monomers capable of providing thermoplastic and thermosetting polymer structures;
 (xii) monomers that allow for enhanced poling; and
 (xiii) monomers that provide enhanced flow characteristics during formation of the final product.

The various examples provide herein include the methodology necessary to synthesize polymer systems that possess the durability and efficiency required for commercial optical systems, such as, for example, optical switches, optical modulators, and other optical components that may be used in conjunction with silica or non-silica waveguides. As is described in more detail elsewhere herein, monomers and precursors that provide a low refractive index are preferred for silica based devices, while monomers and precursors that provide a high refractive index are typically preferred for non-silica based devices. Silica based systems typically require a polymer system or polymer composition that has a refractive index of about 1.3 to about 1.5. Typically monomers and the quantity of the respective monomer are selected that will provide refractive indexes within this range in the final functional optical material. Typically for use with silica based optical systems and with optical systems that behave similarly to silica systems, monomers are selected from the group of monomers that produce homopolymers having a refractive index below 1.5. However, this may not always be the case as it is envisioned that small quantities of monomer from homopolymers having refractive indexes above about 1.5 may be incorporated as co-monomers with the low refractive index ($n<1.5$) producing monomers to achieve specific effects in the final functional optical material (e.g., higher $T_g$, optically active chromophore compatibilization, shifted optical loss at specific wavelengths, better poling, adhesion, enhanced crosslinking, and the like). However, in silica based systems and systems having like properties, the majority of the monomer content will be derived from one or more monomers having low refractive indexes. Typically for use with non-silica based optical systems, monomers are selected from the group of monomers that produce homopolymers having a refractive index above about 1.5. However, this may not always be the case as it is envisioned that quantities of monomer from homopolymers having refractive indexes below 1.5 may be incorporated as co-monomers with the high refractive index producing monomers ($n \geq 1.5$) to achieve specific effects in the final functional optical material (e.g., higher $T_g$, optically active chromophore compatibilization, shifted optical loss at specific wavelengths, better poling, adhesion, enhanced crosslinking, and the like). This methodology includes the combination of acrylic, methacrylic, styrene, and other liquid or solid ethylenically unsaturated monomers.

Typically, the optically active chromophores of the present invention, including fluorinated chromophores and those having primary as well as secondary electron withdrawing groups, are used with silica based optical systems. In some cases, the conventional chromophores may be used with low refractive index systems such as silica. Typically, the conventional EO chromophores, as well as the chromophores of the present invention, may be used with non-silica based optical systems. Compatibilizers useful with EO chromophores of the present invention typically include, for example, nitriles, fluorinated and nonfluorinated esters and aromatic groups, hydroxyls, and other groups that contain polar functionality. Compatibilizers useful with conventional EO chromophores typically include, for example, nitriles, esters, and aromatics.

Electrooptic measurement techniques used in the present invention are described in *Electro-optic Coefficient Determination in Stratified Organized Molecular Thin Films: Application to Poled Polymers*, P. A. Chollet, et al.; *Thin Solid Films*, 242 (1994), 132-138; and *Simple Reflection Techniques for Measuring the Electro-optic Coefficient of Poled Polymers*, C. C. Teng and H. T. Man, Appl. Phys. Lett., Vol. 56. No. 18, (1990), 1734-1736.

The preferred polymers of the present invention can be prepared according to methods found in *Preparative Methods of Polymer Chemistry*, Sorenson and Campbell, Interscience Publishers, New York, N.Y. (1968), and include linear polymers, lightly branched linear polymers, and heavily branched linear polymers. The preferred thermoplastic polymers of the present invention include: acrylics/methacrylics (copolymers of esters of acrylic and methacrylic acid where the alcohol portion of the ester can be based on hydrocarbon or partially or fully fluorinated alkyl chains); polyesters (where the diacid or diol can contain carbon-hydrogen aliphatic, aromatic or carbon-fluorine functionality); polyurethanes (where the diisocyanate can be aliphatic or aromatic and the diol can contain carbon-hydrogen or carbon-fluorine functionality);

polyimides where the acid, amine, or diamine can be partially or fully fluorinated; polyamides (where the diacid or diamine can contain carbon-hydrogen aliphatic, aromatic or carbon-fluorine functionality); polyphosphazenes (where the polyphosphazene backbone structure can contain fluorinated aromatic or aliphatic functional groups, as well as carbon-hydrogen functionality); epoxy resin (where the epoxy resin can contain carbon-hydrogen or carbon-fluorine functionality) which can further be reacted with diacids or anhydrides (that also contain carbon-hydrogen or carbon-fluorine functionality); and hybrid (organic-inorganic) or nanocomposite polyester polymers (where the polyester component consists of aliphatic, aromatic carbon hydrogen or carbon-fluorine functionality and the inorganic components are based on silane or organometallic materials such as titanates, zirconates, and other multivalent metal organics).

The general chemical structures of these preferred polymers is as follows:

Acrylic (Polymers of Acrylic Acid Ester Monomers)

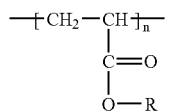

Copolymers of Acrylic Acid Esters, Methacrylic Acid Esters and Other Single Unsaturated Monomers

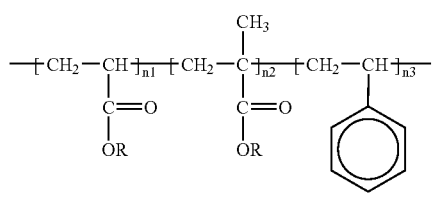

polyesters

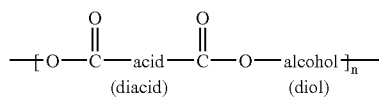

polyurethanes

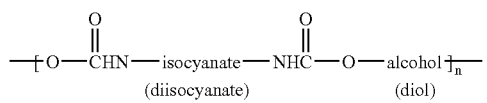

polyimides

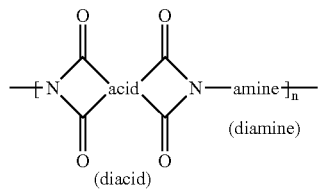

polyamides

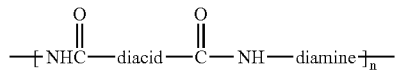

polyphosphazenes

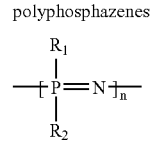

Tables 1, 2, and 3 list a number of monomer systems that have low refractive index (n) values (n=about 1.33 to about 1.50) and high refractive index values (n=greater than about 1.50, preferably greater than about 1.50 to about 1.6.

TABLE 1

| Acrylate Monomers | |
|---|---|
| NAME | REFRACTIVE INDEX (at 20° C.) |
| Acid | 1.4202 |
| Allyl ester | 1.4320 |
| Anhydride | 1.4487 |
| Benzyl ester | 1.5143 |
| 4-Biphenylyl ester | |
| Bisphenol A ethoxylate diester | 1.5450 |
| Bisphenol A diglycidyl ether diester | 1.5570 |
| 2-Bromo- | |
| 3-Bromo-, cis- | |
| 2-Bromo-, ethyl ester | |
| 2-Bromoethyl ester | 1.4770 |
| 2-Bromomethyl- | |
| 2-Bromomethyl-, ethyl ester | 1.478 |
| 2-Bromomethyl-, methyl ester | 1.490 |
| 1,3-Butylene diester | 1.4500 |
| 1,4-Butylene diester | 1.4560 |
| 2-Butylene-1,4 diester | 1.4422 |
| 2-(2-Butoxyethoxy)ethyl ester | 1.4394 |
| 2-Butoxyethyl ester | 1.4323 |
| n-Butyl ester | 1.4180 |
| s-Butyl ester | 1.4140 |
| t-Butyl ester | 1.4108 |
| 2-Chloro- | |
| 2-Chloro-, butyl ester | |
| 2-Chloro-, ethyl ester | 1.4384 |
| 2-Choloro-, methyl ester | 1.4420 |
| 3-Chloro-, cis- | |
| 3-Chloro-, trans- | |
| 2-Chloroethyl ester | 1.4384 |
| Cinnamyl ester | 1.5660 |
| Crotyl ester | |
| 2-Cyano-, butyl ester | 1.4420 |
| 2-Cyano-, ethyl ester | |
| 2-Cyano-, isobutyl ester | |
| 2-Cyanoethyl ester | 1.4433 |
| Cyclohexyl ester | 1.4673 |
| Cyclopentyl ester | |
| n-Decyl ester | 1.440 |
| 2,3-Dibromopropyl ester | 1.5520 |
| 2,3-Dichloropropyl ester | 1.4765 |
| Dicyclopentenyl ester | |
| Dicyclopentenyloxyethyl ester | 1.5010 |
| 2-(Diethylamino)ethyl ester | 1.443 |
| 3-(Diethylamino)propyl ester | 1.441 |
| Di(ethylene glycol) diester | 1.4630 |
| Dihydrodicyclopentadienyl ester | 1.509 |
| 2,3-Dihydroxypropyl ester | |
| 2(Dimethylamino) ethyl ester | 1.4380 |
| 3-(Dimethylamino) neopentyl ester | 1.439 |
| 3-(Dimethylamino) propyl ester | 1.4400 |
| Dipentaerythritol pentaester | |
| Di(propylene glycol) diester | 1.4488 |
| Di(trimethylolpropane) tetraester | 1.4790 |
| Dodecyl ester | 1.4450 |
| 1H,1H,11H-Eicosafluoroundecylester | |
| 2-(2-Ethoxyethoxy)ethyl ester | 1.4390 |

TABLE 1-continued

Acrylate Monomers

| NAME | REFRACTIVE INDEX (at 20° C.) |
|---|---|
| 2-Ethoxyethyl ester | 1.4282 |
| Ethyl ester | 1.4060 |
| Ethylene diester | 1.4610 |
| 2-Ethylhexyl ester | 1.4360 |
| Furfuryl ester | 1.4800 |
| Glycidyl ester | 1.4490 |
| Glycerol propoxylate triester | 1.4610 |
| 1H,1H,2H,2H-Heptadecafluorodecyl ester | 1.3380 |
| 1H,1H-Heptafluorobutyl ester | 1.3301 |
| Heptyl ester | 1.4311 |
| Hexadecyl ester | 1.4470 |
| 2,2,3,4,4,4-Hexafluorobutyl ester | 1.352 |
| 1H-Hexafluoroisoporpyl ester | 1.3190 |
| Hexanediol diester | 1.4562 |
| n-Hexyl ester | 1.4280 |
| 4-Hydroxybutyl ester | 1.4520 |
| 2-Hydroxyethyl ester | 1.4502 |
| 2-Hydroxy-3-phenoxypropyl ester | 1.5280 |
| 2-Hydroxypropyl ester | 1.4448 |
| Isobornyl ester | 1.4760 |
| Isobutyl ester | 1.4140 |
| Isodecyl ester | 1.4420 |
| Isooctyl ester | 1.4370 |
| Isopropoxyethyl ester | 1.4258 |
| Isopropyl ester | 1.4060 |
| Methallyl ester | 1.4372 |
| 2-(2-Methoxyethoxy) ethyl ester | 1.4392 |
| 2-Methoxyethyl ester | 1.4272 |
| Methyl ester | 1.4020 |
| 2-Methylbutyl ester | 1.4800 |
| 2-(N-Morpholino)ethyl ester | 1.4728 |
| 1-Naphthyl ester | |
| 2-Naphthyl ester | |
| Neopentyl ester | |
| Neopentyl glycol diester | 1.4530 |
| Nonyl ester | 1.4375 |
| Octadecyl ester | |
| 1H,1H,5H-Octafluoropentyl ester | 1.3467 |
| n-Octyl ester | 1.4350 |
| 1H,1H-Pentadecafluorooctyl ester | 1.3279 |
| Pentaerythritol tetraester | 1.4870 |
| Pentaerythritol triester | 1.4840 |
| Pentaerythritol stearate diester | |
| 2,2,3,3,3-Pentafluoropropyl ester | 1.3363 |
| 1,5-Pentanediol diester | 1.4551 |
| n-Pentyl ester | 1.4240 |
| 2-Phenoxyethyl ester | 1.5180 |
| Phenyl ester | |
| 1,4-Phenylene diester | |
| 1,4-Phenylene di(acrylic acid) | |
| 2-Phenylethyl ester | |
| Trimethyl 2-phosphonoacrylate | 1.4540 |
| Propargyl ester | |
| n-Propyl ester | 1.4130 |
| 1,2-Propylene glycol diester | 1.4470 |
| 1,3-Propylene glycol diester | 1.4529 |
| Tetradecyl ester | 1.4468 |
| Tetra(ethylene glycol) diester | 1.4638 |
| 2,2,3,3-Tetrafluoropropyl ester | 1.3629 |
| Tetrahydrofurfuryl ester | 1.4580 |
| S,S'-Thiodi-1,4-phenylene dithiol diester | |
| 2,3,3-Trichloro- | |
| Tridecyl ester | |
| Tri(ethylene glycol) diester | 1.4609 |
| 2,2,2-Trifluoroethyl ester | 1.3506 |
| 1,1,1-Tri(2-hydroxyethoxy-methyl)propane triester | 1.4710 |
| Tri(2-hydroxyethyl) isocyanurate triester | |
| 3,5,5-Trimethylcyclohexyl ester | 1.455 |
| 3,5,5-Trimethylhexyl ester | 1.4370 |
| Trimethylolpropane triester | 1.4736 |
| Trimethylolpropane ethoxylate triester | 1.4720 |
| Tri(propylene glycol) diester | 1.4500 |
| Vinyl ester | 1.4320 |

TABLE 2

Methacrylate Monomers

| Name | REFRACTIVE INDEX (at 20° C.) |
|---|---|
| Acid | 1.432 |
| 2-(Acetonacetoxy)ethyl ester | 1.4560 |
| Allyl ester | 1.4360 |
| Anhydride | 1.454 |
| 2-(1-Aziridinyl)ethyl ester | |
| Benzyl ester | 1.5120 |
| Bisphenol A diester | |
| Bisphenol A tetraethozylate diester | 1.5320 |
| 2-Bromoethyl ester | |
| 1,3-Butylene diester | 1.4520 |
| 1,4-Butylene diester | 1.4565 |
| 2-Butoxyethyl ester | 1.4335 |
| n-Butyl ester | 1.4230 |
| s-Butyl ester | 1.4195 |
| Tert-Butyl ester | 1.4150 |
| N-tert-Butyl-2-aminoethyl ester | 1.4420 |
| 2-Chloro-2-hydroxypropyl ester | 1.4750 |
| 2-Chloroethyl ester | |
| Chloromethyl ester | 1.4434 |
| Cinnamyl ester | |
| Chloride | 1.4420 |
| 2-Cyanoethyl ester | 1.4459 |
| 1,4-Cyclohexanediol diester | |
| Cyclohexyl ester | 1.459 |
| Decanediol diester | 1.4577 |
| Decyl ester | 1.443 |
| 2,3-Dibromopropyl ester | |
| 2-(Dibutylamino)ethyl ester | 1.4474 |
| Dicyclopentenyl ester | 1.4990 |
| Dicyclopentenyloxyethyl ester | 1.4970 |
| 2-(Diethylamino) ethyl ester | 1.4442 |
| 3-(Dimethylamino) propyl ester | |
| Di(Ethylene glycol) diester | 1.4580 |
| 3,4-Dihydroxybutyl ester | |
| 2,3-Dihydroxypropyl ester | |
| 2-(Dimethylamino) ethyl ester | 1.4400 |
| Diurethane diester (isomers) | 1.485 |
| 1H,1H,7H-Dodecafluoroheptyl ester | |
| Dodecanediol diester | |
| Dodecyl ester | 1.4450 |
| 2,3-Epithiopropyl ester | |
| 2,3-Epoxybutyl ester | 1.4422 |
| 3,4-Epoxybutyl ester | 1.4472 |
| 2,3-Epolyopropyl ester | 1.4490 |
| 4-Ethoxybutyl ester | 1.4223 |
| 2-Ethoxyethyl ester | 1.4290 |
| Ethyl ester | 1.4130 |
| Ethyl 2-bromomethyl-ester | 1.4790 |
| 2-Ethylbutyl ester | |
| 1,2-Ethylene diester | 1.4540 |
| 2-Ethylhexyl ester | 1.4380 |
| 2-(Ethylthio)ethyl ester | |
| Ethyl 2-(trimethoxysilylmethyl-) ester | 1.4380 |
| Furfuryl ester | 1.4820 |
| Glycerol diester | 1.4720 |
| Glycerol triester | |
| Glycidyl ester | 1.4490 |
| 1H,1H,2H,2H-Heptadeca-fluorodecyl ester | |
| 1H,1H-Heptafluorobutyl ester | 1.3410 |
| Heptyl ester | |

TABLE 2-continued

Methacrylate Monomers

| Name | REFRACTIVE INDEX (at 20° C.) |
|---|---|
| 1,6-Hexanediol diester | 1.4580 |
| 2,2,3,4,4,4,-Hexafluorobutyl ester | 1.3610 |
| 1H-Hexafluoroisopropyl ester | 1.3310 |
| Hexyl ester | 1.432 |
| 4-Hydroxybutyl ester | |
| 2-Hydroxyethyl ester | 1.4520 |
| 3-(5-Hydroxypentyloxy)-3-oxopropyl ester | |
| 3-Hydroxyporopyl ester | 1.4470 |
| Isobornyl ester | 1.4770 |
| Isobutyl ester | 1.420 |
| 2-Isocyanatoethyl ester | |
| Isodecyl ester | 1.4430 |
| Isopropyl ester | 1.4122 |
| Metallyl ester | |
| 2-(2-Methoxyethoxy) ethyl ester | 1.4397 |
| 2-Methoxyethyl ester | 1.4310 |
| Methyl ester | 1.4140 |
| 2-Methyl-2-nitropropyl ester | 1.450 |
| 2-(Methylthio) ethyl ester | 1.4800 |
| Methyl 2-bromomethyl ester | 1.4900 |
| Methyl 2-(1-hydroxyethyl-)ester | 1.4520 |
| 2-N-Morpholinoethyl ester | |
| Neopentylglycol diester | 1.4530 |
| Nona(ethylene glycol) diester | 1.4660 |
| Nona(propylene glycol)diester | 1.4520 |
| Nonyl ester | 1.4660 |
| 4-Nonylphenyl ester | 1.5020 |
| n-Octyl ester | 1.4373 |
| Pentabromophenyl ester | |
| Pentachlorophenyl ester | |
| 1H,1H-Pentafluorooctyl ester | |
| Pentaerythritol tetraester | |
| 2,2,3,3,3-Pentafloropropyl ester | 1.3482 |
| Pentyl ester | |
| 2-Phenoxyethyl ester | 1.5130 |
| Phenyl ester | 1.5184 |
| 2-Phenylethyl ester | 1.508 |
| n-Propyl ester | 1.4450 |
| 1,2-Propylene diester | 1.4450 |
| 1,3-Propylene diester | |
| 2-Sulfoethyl ester | 1.4772 |
| 3-Sulfopropyl ester, potassium salt | |
| Tetra(ethylene glycol) diester | 1.4630 |
| 2,2,3,3-Tetrafluoropropyl ester | 1.3730 |
| Trimethylsilyl ester | 1.4147 |
| 2-(Trimethylsilyloxy)ethyl ester | 1.4280 |
| 3-(trimethylsilyloxy)propyl ester | 1.4310 |
| 3-(Tris(trimethylsilyloxy)silyl) propyl ester | 1.4190 |
| Vinyl ester | 1.4360 |

TABLE 3

Other Ethylenically Unsaturated Liquid or Solid Monomers

| MONOMERS | REFRACTIVE INDEX (at 20° C.) |
|---|---|
| Styrene | 1.5470 |
| α,β Difluorostyrene | 1.506 |
| 1,2 Difluorostyrene | 1.4990 |
| 2,6 Difluorostyrene | 1.4990 |
| Monofluorostyrene | 1.51 |
| Trifluoromethylstyrene | 1.46-1.47 |
| Pentafluorostyrene | 1.446 |
| Vinyl acetate | 1.3950 |
| Vinyl trifluroethylacetate | 1.3170 |
| Vinyl ethers | 1.37-1.52 |

TABLE 3-continued

Other Ethylenically Unsaturated Liquid or Solid Monomers

| MONOMERS | REFRACTIVE INDEX (at 20° C.) |
|---|---|
| Vinyl amides | 1.48-1.51 |
| Vinyl esters | 1.31-1.55 |
| Butenes and butadiene | 1.37-1.57 |
| Maleate/fumarate esters | 1.4-1.49 |
| Acrolein | 1.4025 |
| Acryl and methacrylamides | 1.41-1.51 |
| Allyl monomers | 1.38-1.56 |

Table 4 lists limits typical of the compositions and polymers described in Tables 5, 6, and 13.

TABLE 4

Critical Limits for Polymers

| Polymer low refractive index range | $1.3 < n < 1.5$ |
|---|---|
| Polymer high refractive index range | $1.5 \leq n < 1.8$ |
| Water Moisture Sensitivity | less than 2% water absorption by the polymer in a 24 hour water immersion test at room temperature |
| Ease of poling | less than 100 volts per micron of film thickness |
| Thermal stability | less than 10% weight loss at 200° C. |
| Adhesion | better than about 90% crosshatch adhesion to any given substrate (ASTM D3359-78) |
| Optical Clarity in The Infrared | less than 5% by weight hydrogen in the polymer of the functional optical material |
| EO Chromophore compatability | less than 1% weight loss or phase separation of the EO chromophore in the polymer matrix. |

In summary, then, the polymers of this invention are unique in their durability characteristics, especially with regard to nonlinear optical (electro-optic {second order} and all-optic {third order}) phenomena and devices, and their compatibility/workability with non-linear optical chromophores.

The unique polymers of this invention advantageously possess the following characteristics:
1. Control of refractive index [low (less than 1.5) to high (greater than 1.5)]
2. High Tg
3. Low optical loss
4. Thermal stability and crosslinking capability
5. Chromophore compatibility (guest-host or chemical reaction with the chromophore for incorporation into the polymer chain or crosslinking network); film quality control (flow, continuous films, homogeneity, etc.)
6. Adhesion promotion to a wide variety of mixed substrates (glass, quartz, metal oxides, metals, and plastics); ability to influence electrical poling if so desired (important in electro-optic devices, but not in third order devices)

In order to accomplish the polymer requirements of this invention, the polymer backbone can be made up of a number of complex monomer units such as: refractive index control monomer, Tg control monomer, optical loss control monomer, thermal stability (crosslinking) monomer, chromophore compatibility and film quality control monomer, and adhesion promotion and ease of poling control monomer.

Examples 1-6 represent various classes of low refractive index polymers (prior art and inventive), while Examples 7-9 represent durable polymers that have high refractive index values (n>1.50)

Polymer Example 1

Prior Art Polymer

The co-polymer system 1H, 1H, 2H, 2H tridecafluorooctyl methacrylate (48.5%), trifluoroethyl methacrylate (19.4%) (monomer, n=1.361), methacrylic acid ester of Disperse Red-1 (32.1%) (conventional chromophore) described in Bosc, et al. was prepared and tested for its potential of creating a practical commercial communications optical switch device. The test results for this prior art system are given in Table 5. Descriptions of the results in each of the testing criteria follow Table 5.

TABLE 5

Analysis of Prior Art Terpolymer

| Refractive Index | Tg | Optical Loss | Thermal Stability {Cross-Linking Capability} | Water/ Moisture Sensitivity | Ease of Poling | Adhesion | EO (Conventional) Chromophore Compatibility | Control of Total System Refractive index |
|---|---|---|---|---|---|---|---|---|
| Low (n = 1.5) | Less than 100° C. (373° K) | Poor | Poor/{none} | Poor | Poor | Poor | Poor | Poor |

Regarding optical loss, the electrooptic (EO) chromophore and monomer have a high percentage of carbon-hydrogen bonds, which can cause high optical losses at 1.3 μm wavelength of light (communication requirements).

Regarding thermal stability, the low Tg for this copolymer system (84° C.) allows the material to flow on melt above 100°-130° C. This system is not crosslinked and is thermoplastic in its nature and, thus, can melt/flow at high temperature. The low thermal stability of this polymer also limits the ability of the polymer to maintain its poling capabilities over a long time period.

Regarding moisture sensitivity, copolymer films containing gold electrodes and on quartz or ITO coated quartz substrates were easily removed or debonded either by water immersion or subjection to 85% RH/85° C. environmental exposure conditions.

Regarding ease of poling, this copolymer had a tendency to breakdown (form pinholes) and short out the electrodes under a wide range of DC voltage poling conditions.

Regarding adhesion, this copolymer could be easily removed from quartz substrates using a scratch or cut/tape adhesion test.

Regarding EO chromophore compatibility, a common electrooptic (EO) chromophore such as Disperse Red 1 is not soluble or compatible in the copolymer compositions disclosed in this prior art. Copolymerization of all carbon-hydrogen monomer of Disperse Red 1 does allow one to put in a small amount (less than 50%) of the EO chromophore; however, over time/temperature this copolymerized EO chromophores can segregate away from the copolymer and lower its EO efficiency and optical clarity (increased optical loss).

Regarding control of total system refractive index, the conventional electrooptic (EO) chromophore has a very high inherent refractive index value. For this reason higher concentrations of the EO chromophore raises the entire refractive index value of the total system to where it is no longer efficient for optical switching in a silica waveguide or other applications requiring low refractive index values. In order to reduce the overall refractive index of the system one needs to use a lower concentration of the conventional EO chromophore, which reduces the overall switching capability or efficiency of the entire system.

The development of a practical and robust (durable) polymer system for silica waveguide optical switch communications components requires the following elements:

(a) control of the overall refractive index of the total system (n<1.5);

(b) control of the Tg and crosslinking capability of the total system;

(c) control of the optically active chromophore compatibility and low optical loss (low numbers of C—H bonds) of the system;

(d) inherent water resistance and strong adhesive bonding capabilities for silica and metal (gold, silver, aluminum, nickel, etc.) electrode substrates; and (e) a total system designed for enhanced poling capabilities, high dielectric strength, and breakdown resistant capabilities.

The first step in this embodiment of the present invention is the selection of low or refractive index monomers as exemplified in Tables 1, 2, and 3 (refractive index adjustment or control), and in Table 8 where the monomer of a homopolymer having appropriate properties can be selected. The monomers, and monomers of homopolymers listed in these tables are meant to be exemplary and are not to be construed as a limitation on the invention. Other monomers, not listed in the tables that possess the properties required by the present invention also may be used. When monomers are mixed, the refractive index of the multi-component polymer is controlled by altering the fractional amount of each monomer contained in the polymer. The refractive index of the multi-component polymer can be made to vary smoothly between the lowest refractive index of a homopolymer formed from any one component and the highest refractive index of a homopolymer formed from any other component.

Polymer Example 2

Novel Thermoplastic Polymer

As an example of this embodiment, the low refractive index monomer selected was trifluoroethyl methacrylate (n=1.361). The next monomers selected (acrylonitrile, methyl methacrylate, {pentafluorostyrene in Polymer Example 3}) were used to compatibilize a conventional (all carbon hydrogen bonds) EO chromophore (metanitroaniline or Disperse Red-1) and to raise the Tg of the total system. The next monomer selected was methacryloxypropyltrimethoxysilane, which can promote adhesion to silica or indium tin oxide coatings.

The multi-monomer thermoplastic polymer of this invention was prepared by combing the following ingredients (all in wt-%):

60% of trifluoroethyl methacrylate monomer (n=1.361),
30% methyl methacrylate monomer (n=1.49),
8% acrylonitrile (compatibility promoter for the chromophore), and
2% of the methacryloxypropyltrimethoxysilane (adhesion promoter).

This liquid monomer mixture (25 cc) was added slowly to 200 mls of dry tetrahydrofuran (THF) contained in a 400 ml round bottom 3-neck flash fitted with a heating mantle, glass shaft stirrer, reflux condenser, and addition funnel. To the monomer mixture was added 0.5 grams of Vazo 64™ (free radical initiator from E. I. DuPont DeNemours, Wilmington, Del., USA) and the entire mixture heated in the THF at 68° C. over a 1 hour time period. The reaction was continued over an 8-hour time period after which the THF/polymer solution was cooled to room temperature and the polymer precipitated out of the solution with excess methanol. The resulting polymer had a refractive index value below 1.5 and a Tg value greater than 100° C.

To this polymer was added 10% by weight of a conventional EO chromophore (metanitroaniline or Disperse Red-1) or an EO chromophore of this invention (4-fluoro-3-nitroaniline) in dioxane (1%-5% solids) and spun down onto indium tin oxide (ITO) coated glass or silica substrates. This system was metalized and poled in a similar manner as Polymer Example 1.

The poling and dielectric strength capabilities for this particular copolymer were superior (less pinholes, defects, and electrical shorting) to the prior art example discussed previously. This copolymer was analyzed in the same fashion as the prior art polymer in Polymer Example 1. The data from this analysis is given in Table 6.

TABLE 6

Novel Thermoplastic Polymer

| Refractive Index | Tg | Optical Loss | Thermal Stability {Cross-Linking Capability} | Water/ Moisture Sensitivity | Ease of Poling | Adhesion | EO (Conventional Chromophore Compatibility) {Non Conventional EO Chromophore Compatability} | Control of Total System Refractive Index |
|---|---|---|---|---|---|---|---|---|
| Low n < 1.5 | 100° C.> | Low | Acceptable {none} | Good | Good | Excellent | Good {Excellent} | Good |

This novel polymer had a Tg>100° C. and, thus, was not as susceptible to thermal stress as the prior art polymer system. The addition of crosslinking capability greatly improved the overall thermal stability of the system. Additionally, this polymer has excellent water resistance and excellent adhesion to silica surfaces, indium tin oxide coatings, and gold electrodes. Both the nitrile and silane functional groups in the polymer are responsible for this excellent adhesion.

The nitrile functional group in the polymer and the hydrocarbon ester increased the solubility (up to 10%) of the conventional EO chromophore, but the EO chromophores of this invention could be put into this polymer up to a 30% or greater loading while still maintaining the overall low refractive index for the total system.

Polymer Example 3

Novel Thermoplastic Polymers

Another embodiment of this invention includes a copolymer system prepared in a manner similar that in Polymer Example 2, but where the methyl methacrylate monomer is replaced with pentafluorostyrene monomer (n=1.446). This particular system had even greater water resistance and adhesion than Polymer Example 2, while still maintaining EO response capabilities with conventional EO chromophores, or EO chromophores of the present invention.

A number of other homopolymer and copolymers were prepared in a similar manner as the previous examples and their compositions and general properties summarized in Table 7.

TABLE 7

Thermoplastic Polymers Useful with this Invention

| Sample Number | Monomers | Concentration (gm) | Product | General Property Comments |
|---|---|---|---|---|
| 1 | Trifluoroethyl Acrylate | 25 | Homopolymer | Low n, low Tg |
| 2 | Trifluoroethyl methacrylate<br>Acrylonitrile | 17<br>5 | Copolymer | Low n, good adhesion |
| 3 | Trifluoroethyl methacrylate<br>Methylmethacrylate | 8<br>5 | Copolymer | Low n, poor adhesion |
| 4 | Trifluoroethyl methacrylate<br>Methyl methacrylate<br>Acrylonitrile<br>Trimethoxysilylpropyl-methacrylate | 11<br>11<br>2.5<br>0.5 | Copolymer | n = Approx. 1.5, good adhesion and good water resistance |
| 5, 7 | Trifluoroethyl methacrylate<br>Methyl methacrylate | 4<br>10 | Copolymer | n = <1.49, high water sensitivity |
| 6 | Trifluoroethyl methacrylate | 9 | Homopolymer | Low n, poor adhesion |

Note:
There are also several commercial fluoropolymers that can be used in this invention (Dupont's TEFLON AF1600 and Lumiflon from Asahi Glass Chemicals are two examples of useful commercial fluoropolymers).

Table 8 provides a list of homopolymer systems compatible with the methodology of the present invention (see Polymer Example 3). These homopolymer systems have low n values (about 1.3 to <1.50); and high n values (n≧1.5). Additionally, Table 8, lists glass transition (Tg) values (° K.) for these homopolymers, as well as providing comments regarding a given homopolymer's polarity, adhesion bonding capabilities and water sensitivity.

TABLE 8

Homopolymer System Properties

| Polymer | Refractive Index (n) | Glass Transition Temperature (Tg) (°K) | Comments |
|---|---|---|---|
| Poly(pentadecafluorooctyl acrylate) | 1.339 | 256 | |
| Poly(tetrafluoro-3-(heptafluoropropoxy)propyl acrylate | 1.346 | | |
| Poly(tetrafluoro-3-(pentafluoroethyoxy)propyl acrylate) | 1.348 | | |
| Poly(undecafluorohexyl acrylate) | 1.356 | 234 | |
| Poly(nonafluoropentyl acrylate) | 1.360 | | |
| Poly(tetrafluoro-3-(trifluoromethyoxy)propyl acrylate) | 1.360 | | |
| Poly(pentafluorovinyl propionate) | 1.364 | | |
| Poly(heptafluorobutyl acrylate) | 1.367 | 330 | |
| Poly(trifluorovinyl acetate) | 1.375 | | |
| Poly(octafluoropentyl acrylate) | 1.380 | 238 | |
| Poly(pentafluoropropyl acrylate) | 1.385 | | |
| Poly(2-heptafluorobutoxy)ethyl acrylate) | 1.390 | | |
| Poly(2,2,3,4,4,4-hexafluorobutyl acrylate) | 1.392 | 251 | |
| Poly(trifluoroethyl acrylate) | 1.407 | 263 | |
| Poly(2-(1,1,2,2-tetrafluoroethyoxy)ethyl acrylate | 1.412 | | |
| Poly(trifluoroisopropyl methacrylate) | 1.4177 | 354 | |
| Poly(2-trifluoroethyoxy)ethyl acrylate | 1.4185 | | |
| Poly(trifluoroethyl methacrylate) | 1.437 | | |
| Poly(vinyl-isobutyl ether) | 1.4507 | | |
| Poly(vinyl ethyl ether) | 1.4540 | | |
| Poly(vinyl butyl ether) | 1.4563 | | |
| Poly(vinyl pentyl ether) | 1.4581 | | |
| Poly(vinyl hexyl ether) | 1.4591 | | |
| Poly(4-fluoro-2-trifluoromethylstyrene) | 1.46 | | |
| Poly(vinyl octyl ether) | 1.4613 | | |
| Poly(vinyl-2-ethylhexyl ether) | 1.4626 | | |
| Poly(vinyl decyl ether) | 1.4628 | | |
| Poly(2-methoxyethyl acrylate) | 1.463 | | |
| Poly(butyl acrylate) | 1.4631 | 219 | |
| | 1.466 | | |
| Poly(tert-butyl methacrylate) | 1.4638 | 391 | |
| Poly(vinyl dodecyl ether) | 1.4640 | | |
| Poly(3-ethoxypropyl acrylate) | 1.465 | | |
| Poly(vinyl propionate) | 1.4665 | | |
| Poly(vinyl acetate) | 1.4665 | | a, c |
| Poly(vinyl methyl ether) | 1.467 | | a, c |
| Poly(ethyl acrylate) | 1.4685 | | |
| Poly(vinyl methyl ether) (isotactic) | 1.47-1.48 | | a, c |
| Poly(3-methoxypropyl acrylate) | 1.4700 | | |
| Poly(2-ethoxyethyl acrylate | 1.471 | | a, c |

TABLE 8-continued

Homopolymer System Properties

| Polymer | Refractive Index (n) | Glass Transition Temperature (Tg) (°K) | Comments |
|---|---|---|---|
| Poly(methyl acrylate) | 1.471 | 283 | |
| Poly(isopropyl methacrylate) | 1.472-1.480 | 354 | |
| Poly(vinyl sec-butyl ether) (isotactic) | 1.4740 | | |
| Poly(dodecyl methacrylate) | 1.4740 | 208 | |
| Poly(tetradecyl methacrylate) | 1.4746 | 201 | |
| Poly(hexadecyl methacrylate) | 1.4750 | 288 | |
| Poly(vinyl formate) | 1.4757 | | |
| Poly(2-fluoroethyl methacrylate) | 1.4768 | | |
| Poly(isobutyl methacrylate) | 1.477 | 326 | |
| Poly(n-hexyl methacrylate) | 1.4813 | 268 | |
| Poly(n-butyl methacrylate) | 1.483 | 293 | |
| Poly(ethylene dimethacrylate) | 1.4831 | | |
| Poly(2-ethoxyethyl methacrylate) | 1.4833 | | |
| Poly(oxyethyleneoxymaleoyl) (poly(ethylene maleate)) | 1.4840 | | |
| Poly(n-propyl methacrylate) | 1.484 | 308 | |
| Poly(3,3,5-trimethylcyclohexyl methacrylate) | 1.485 | | |
| Poly(ethyl methacrylate) | 1.485 | 338 | |
| Poly(2-nitro-2-methylpropyl methacrylate) | 1.4868 | | |
| Poly(triethylcarbinyl methacrylate) | 1.4889 | | |
| Poly(1,1-diethypropyl methacrylate) | 1.4889 | | |
| Poly(methyl methacrylate) | 1.4893 | 373 | |
| Poly(ethyl glycolate methacrylate) | 1.4903 | | |
| Poly(3-methylcyclohexyl methacrylate) | 1.4947 | | |
| Poly(cyclohexyl α-ethoxyacrylate) | 1.4969 | | |
| Poly(4-methylcyclohexyl methacrylate) | 1.4975 | | |
| Poly(decamethylene glycol dimethacrylate) | 1.4990 | | b |
| Poly(2-bromo-4-trifluoromethylstyrene) | 1.5 | | |
| Poly(sec-butyl α-chloroacrylate) | 1.500 | | |
| Poly(ethyl α-chloroacrylate) | 1.502 | | |
| Poly(2-methylcyclohexyl methacrylate) | 1.5028 | | |
| Poly(bornyl methacrylate) | 1.5059 | | |
| Poly(ethylene glycol dimethacrylate) | 1.5063 | | b |
| Poly(cyclohexyl methacrylate) | 1.5066 | 377 | |
| Poly(cyclohexanediol-1,4-dimethyacrylate) | 1.5067 | | b |
| Poly(tetrahydrofurfuryl methacrylate) | 1.5096 | | |
| Poly(1-methylcyclohexyl methacrylate) | 1.5111 | | |
| Poly(2-hydroxyethyl methacrylate) | 1.5119 | 358 | a, b, c |
| Poly(vinyl chloroacetate) | 1.512 | | |
| Poly(vinyl methacrylate) | 1.5129 | | |
| Poly(N-butyl methacrylamide) | 1.5135 | | |
| Poly(methyl α-chloroacrylate) | 1.517 | | |
| Poly(2-chloroethyl methacrylate) | 1.517 | | |
| Poly(2-diethylaminoethyl methacrylate) | 1.5174 | | a, c |
| Poly(2-chlorocyclohexyl methacrylate) | 1.5179 | | |
| Poly (allyl methacrylate) | 1.5196 | | b |
| Poly(methyl isopropenyl ketone) | 1.5200 | | |
| Poly(ester) resin, rigid (ca. 50% styrene) | 1.523-1.54 | | b |
| Poly(N-2-methoxyethyl) methacrylamide) | 1.5246 | | |
| Poly(acrylic acid) | 1.527 | 379 | a, b, c |
| Poly(1,3-dichloropropyl methacrylate) | 1.5270 | | |
| Poly(2-chloro-1-(chloromethyl)ethyl methacrylate) | 1.5270 | | |
| Poly(acrolein) | 1.529 | | |
| Poly(1-vinyl-2-pyrrolidone) | 1.53 | | a, c |
| Poly(cyclohexyl α-chloroacrylate) | 1.532 | | |
| Poly(2-chloroethyl α-chloroacrylate) | 1.533 | | |
| Poly(2-aminoethyl methacrylate) | 1.537 | | a, c |
| Poly(furfuryl methacrylate) | 1.5381 | | |
| Poly(butylmercaptyl methacrylate) | 1.5390 | | |
| Poly(1-phenyl-n-amyl methacrylate) | 1.5396 | | |
| Poly(N-methyl-methacrylamide) | 1.5398 | | |
| Poly(sec-butyl α-bromoacrylate) | 1.542 | | |
| Poly(cyclohexyl α-bromoacrylate) | 1.542 | | |
| Poly(2-bromoethyl methacrylate) | 1.5426 | | |
| Poly(ethylmercaptyl methacrylate) | 1.547 | | |
| Poly(N-allyl methacrylamide) | 1.5476 | | b |
| Poly(1-phenylethyl methacrylate) | 1.5487 | | |
| Poly(vinylfuran) | 1.55 | | |
| Poly(2-vinyltetrahydrofuran) | 1.55 | | a, c |
| Poly(p-methyoxybenzyl methacrylate) | 1.552 | | |
| Poly(isopropyl methacrylate) | 1.552 | | |
| Poly(p-isopropylstyrene) | 1.554 | | |
| Poly(p,p-xylylenyl dimethacrylate) | 1.5559 | | b |
| Poly(1-phenylallyl methacrylate) | 1.5573 | | b |

TABLE 8-continued

Homopolymer System Properties

| Polymer | Refractive Index (n) | Glass Transition Temperature (Tg) (°K) | Comments |
|---|---|---|---|
| Poly(p-cylcohexylphenyl methacrylate) | 1.5575 | | |
| Poly(2-phenylethyl methacrylate) | 1.5592 | | |
| Poly(1-(0-chlorophenyl)ethyl methacrylate) | 1.5624 | | |
| Poly(styrene-co-maleic anhydride) | 1.564 | | b, c |
| Poly(1-phenylcyclohexyl methacrylate) | 1.5645 | | |
| Poly(methyl α-bromoacrylate) | 1.5672 | | |
| Poly(benzyl methacrylate) | 1.5680 | | |
| Poly(2-phenylsulfonyl)ethyl methacrylate) | 1.5682 | | |
| Poly(m-cresyl methacrylate) | 1.5683 | | |
| Poly(o-methoxyphenyl methacrylate) | 1.5705 | | |
| Poly(phenyl methacrylate) | 1.5706 | 407 | |
| Poly(o-cresyl methacrylate) | 1.5707 | | |
| Poly(diallyl phthalate) | 1.572 | | b |
| Poly(2,3-dibromopropyl methacrylate) | 1.5739 | | |
| Poly(vinyl benzoate) | 1.5775 | | |
| Poly(1,2-diphenylethyl methacrylate) | 1.5816 | | |
| Poly(o-chlorobenzyl methacrylate) | 1.5823 | | |
| Poly(m-nitrobenzyl methacrylate) | 1.5845 | | |
| Poly(N-(2-phenylethyl)methacrylamide) | 1.5857 | | |
| Poly(4-methoxy-2-methylstyrene) | 1.5868 | | |
| Poly(o-methylstyrene) | 1.5874 | | |
| Poly(styrene) | 1.59-1.592 | | |
| Poly(o-methoxystyrene) | 1.5964 | 348 | |
| Poly(diphenylmethyl methacrylate) | 1.5933 | | |
| Poly(p-bromophenyl methacrylate) | 1.5964 | | |
| Poly(N-benzyl methacrylamide) | 1.5965 | | |
| Poly(p-methoxystyrene) | 1.5967 | | |
| Poly(o-chlorodiphenylmethyl methacrylate) | 1.6040 | | |
| Poly(pentachlorophenyl methacrylate) | 1.608 | | |
| Poly(0-chlorostyrene) | 1.6098 | | |
| Poly(phenyl α-bromoacrylate) | 1.612 | | |
| Poly(p-divinylbenzene) | 1.6150 | | b |
| Poly(N-vinylphthalimide) | 1.6200 | | |
| Poly(2,6-dichlorostyrene) | 1.6248 | 440 | |
| Poly(β-naphthyl methacrylate) | 1.6298 | | |
| Poly(α-naphthyl carbinyl methacrylate) | 1.63 | | |
| Poly(2-vinylthiophene) | 1.6376 | | |
| Poly(α-naphthyl methacrylate) | 1.6410 | | |
| Poly(vinyl phenyl sulfide) | 1.6568 | | |
| Poly(vinylnaphthalene) | 1.6818 | | |
| Poly(vinylcarbazole) | 1.683 | | |
| Poly(pentabromophenyl-methacrylate) | 1.71 | | | a polar
b crosslinking
c adhesion
Comments a, b and c are based on the individual monomer properties that form the final homopolymer material, where: Tg (° C.) = Tg (° K) − 273°

Table 9 shows how different polymer systems and blends interact with conventional EO chromophores and the EO chromophores of the present invention, and influence the refractive index of the total system.

TABLE 9

Thermoplastic Polymer Combinations (Conventional EO Chromophores and EO Chromophores of the Present Invention)

| Sample No. | Polymer System | EO Chromophore | Refractive Index (n) | Film Thickness (um) |
|---|---|---|---|---|
| 1 | 50/50 blend of polymethylmethacrylate and trifluoroethyl methacrylate/ acrylonitrile copolymer (Sample 2, Table 7) | None | 1.465 | — |
| 2 | (1 gram sample) (Sample 2, Table 7) | 0.01 gm Disperse Red-1 (conventional EO chromophore) | 1.51 | 0.49 |

TABLE 9-continued

Thermoplastic Polymer Combinations (Conventional EO Chromophores and EO Chromophores of the Present Invention)

| Sample No. | Polymer System | EO Chromophore | Refractive Index (n) | Film Thickness (um) |
|---|---|---|---|---|
| 3 | 1 gram sample (Sample 2, Table 7) | 0.01 gm Disperse Red-1 (conventional EO chromophore) | 1.51 | 1.0 |
| 4 | 1 gram sample polymethylmethacrylate | 0.01 gm Disperse Red-1 (conventional EO chromophore) | 1.51 | 1.24 |
| 5 | 1 gram sample (Sample 6, Table 7) (homopolymer of trifluoroethyl methacrylate) | Neither Disperse Red-1 nor nitroaniline were soluble in this polymer (conventional EO chromophores) | — | — |
| 6 | 1 gram sample (Sample 6, Table 7) (homopolymer of trifluoroethyl methacrylate) | 0.01 gm fluorinated meta-nitroaniline EO chromophore of this invention | 1.49 | 0.49 |

The solubility of the conventional EO chromophore was better with a blend of a conventional polymer with the copolymers of this invention, or with copolymers of this invention that contained a nitrile functional group.

Table 10 presents electrooptic coefficient information for the thermoplastic polymer systems of the present invention.

TABLE 10

Electrooptic Coefficient

| System | Film Thickness (um) | Poling Temperature ° C. | Poling Voltage (DC) | EO Coefficient (pm/v) |
|---|---|---|---|---|
| Disperse Red-1 (conventional EO chromophore) in polymethyl methacrylate (control) | 1.8 | 95 | 120 | 2.6 |
| 3-nitroaniline (conventional EO chromophore) in polymethyl methacrylate (control) | 1.1 | 95 | 110 | Could not be measured (0.1<) |
| 4-fluoro-3-nitroaniline (EO chromophore of this invention) in polymethyl methacrylate | 1.1 | 95 | 110 | 0.3 |
| Sample 4 (Table 7) with Disperse Red-1 (conventional EO chromophore) | 2.8 | 80 | 150 | 1 |

Polymer Example 4

Novel Thermosetting Polymers

A copolymer was prepared in a similar manner as described for Polymer Examples 2 and 3; but in this embodiment, part of the methyl methacrylate monomer (15%) was replaced with hydroxyethyl methacrylate. This copolymer contained approximately (all wt-%):

60% trifluoroethyl methacrylate (monomer of low refractive index n=1.361),
15% methyl methacrylate (monomer of slightly higher refr. index n=1.49),
15% hydroxyethyl methacrylate (crosslinker),
8% acrylonitrile (compatibility with chromophore),
1% methacryloxypropyl-trimethoxy silane (adhesion promoter), and
1% acrylic acid (adhesion promoter).

This polymer system was combined with a conventional EO chromophore (metanitroaniline) and a thermally activated condensation/transetherification crosslinking agent, such as hexamethoxymelamine, and dissolved in dioxane (1%-5% solids). This solution was spun onto ITO coated quartz or glass slides and baked in an oven at 80° C. for 1 hr to effect the crosslinking reaction. This cured or crosslinked film had excellent solvent resistance, while still maintaining a high degree of electrooptical activity. In contrast, all of the thermoplastic polymers of the prior art and this invention could be redissolved with solvent after applying to a substrate.

The system could also be combined with an EO chromophore of this invention with similar results.

Polymer Example 5

Direct Formation of Novel Thermosetting Polymers or Gels

In this example, a novel approach was used to create three polymer systems that were highly suitable for fabrication of optical switch devices. In this example, the following basic ingredients were used:

trifluroethyl methacrylate (50%) (monomer for low refractive index),
ethyleneglycoldiacrylate (30%) (to cross-link and increase $T_g$),
acrylonitrile (5%) (compatibility with chromophore), and
acrylic acid (1%) (adhesion promotion).

In a first and second reaction, the conventional EO chromophores (Disperse Red-1 or methacrylic acid ester of Disperse Red-1) were mixed with and reacted with the basic ingredients. In a third reaction, a fluorinated EO chromophore of this invention was combined to create a 100% reactive liquid system. To this liquid reactive system was added a free radical initiator (benzoyl peroxide, 2% by weight) and the catalyzed liquid system applied to a quartz waveguide, covered with a thin piece of weighted Teflon film, and heated in oven for 8 hours until fully cured into a rigid solid highly crosslinked film having excellent adhesion to the silica substrate. Gels can be prepared in a similar manner but the final reaction polymerized mixture would contain either unreacted monomer or a nonreactive solvent (see later discussion of gels).

TABLE 11

Direct Formation of Novel Thermosetting Polymers

| Sample No. | Ingredients (wt %) | EO chromophore | Free radical initiator |
|---|---|---|---|
| 1 | trifluroethyl methacrylate (50%) ethyleneglycoldiacrylate (30%) acrylonitrile (5%) acrylic acid (1%) | Disperse Red-1 | benzoyl peroxide |
| 2 | trifluroethyl methacrylate (50%) ethyleneglycoldiacrylate (30%) acrylonitrile (5%) acrylic acid (1%) | methacrylic acid ester of Disperse Red-1 | benzoyl peroxide |
| 3 | trifluroethyl methacrylate (50%) ethyleneglycoldiacrylate (30%) acrylonitrile (5%) acrylic acid (1%) | 4-fluoro-3-nitroanaline | benzoyl peroxide |

Polymer Example 6

Other Fluorine Containing or Low Refractive Index Polymer Systems

In alternative embodiments, the present invention is practiced using different monomer building blocks (see Table 12 below) to create new polymer systems other than those constructed using unsaturated monomer materials (Tables 1, 2, and 3).

TABLE 12

Polyester, Polyamide, Polyurethane, Polyimide, and Epoxy Monomers

| Monomers | Refractive Index |
|---|---|
| Alkanediols and Fluorinated Alkanediols | 1.43-1.46 |
| Etherdiols and Fluorinated polyetherdiols | 1.44-1.46 |
| Anhydrides | 1.324-1.51 |
| Dianhydrides | — |

TABLE 12-continued

Polyester, Polyamide, Polyurethane, Polyimide, and Epoxy Monomers

| Monomers | Refractive Index |
|---|---|
| Diacids | — |
| Diamines | 1.45 |
| Epoxides | 1.36-1.55 |
| Diisocyanates | 1.45-1.59 |
| Lactams and Lactones | 1.41-1.48 |

Polymer Example 6A

In this example, a fluorine containing polyester resin was prepared by combining one mole of tetrafluorosuccinic anhydride (n=1.320) and one mole of 2,2,3,3,4,4-hexafluoro-1,5-pentanediol or one mole of tetrafluorophthalic anhydride and ethylene glycol as shown below:

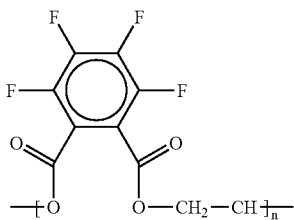

Polymer Example 6B

In this example, fluorine-containing polyamides were produced by reacting one mole of a diamine (1,6-hexane diamine) with one mole of a perfluoropolyether diacid fluoride as shown below:

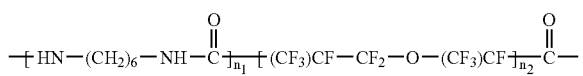

Polymer Example 6C

In this example, reactive epoxy resin systems were prepared by reacting equal parts of a fluorinated epoxy resin with a perfluorinated dianhydride as shown below:

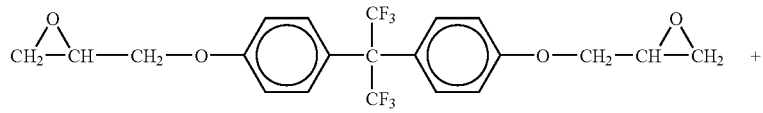

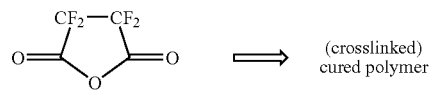

Polymer Example 6D

For this example, fluorinated polyurethane polymers (thermoplastic or thermosetting) were produced in a similar manner as shown in the following reaction sequence.

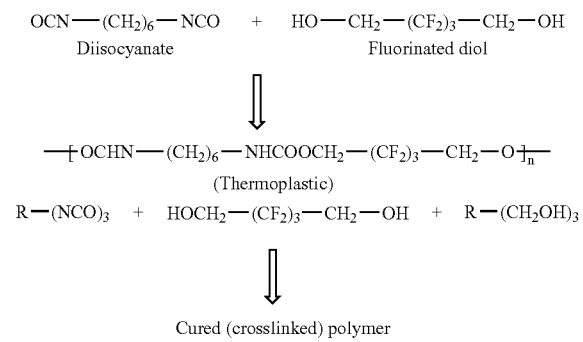

Polymer Example 6E

In this example, fluorinated polyimides can be produced by the following reaction sequence.

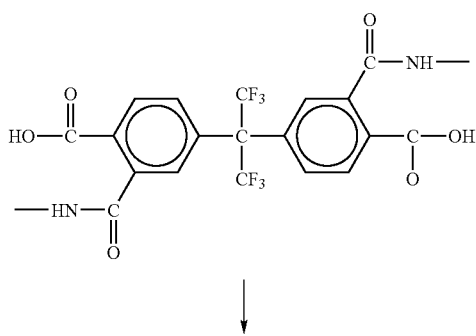

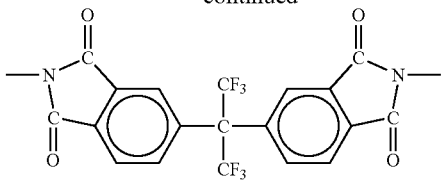

All of these previously described fluorine containing low refractive index polymer systems (polyesters, polyamides, polyimides, epoxy polymers, polyurethanes) can be further modified to contain adhesion promotion functionality (—CN, —COOH, —Si(OMe)$_3$) and chemically combined EO chromophores.

Polymer Example 6F

This example illustrates modified polyesters of the present invention that can be prepared according to the following reaction sequence:

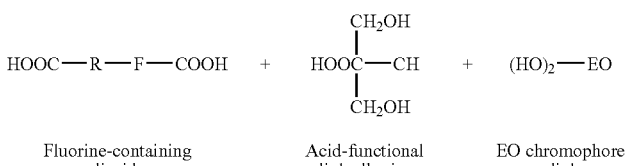

Polymer Example 6G

Hybrid (Organic-Inorganic) or Nanocomposite Polyester Polymers

A hybrid polyester polymer was prepared according to the processes described by Rob Van Der Linde and Suzan Frings, which was presented at the 6th *Biennial North American Research Conference* on "The Science and Technology of Organic Coatings", Nov. 5-8, 2000, at the Westin Resort Hotel, Hilton Head Island, S.C. (proceedings published by the Institute of Materials Science, New Paltz, N.Y.).

A hydroxy-terminated polyester was reacted with 3-(triethoxysilyl)propyl isocyanate followed by further reaction with tetraethoxy silane and hexamethoxy melamine. The final result was a highly transparent coating with good optical properties that can be used in optical devices.

Polymer Example 6H

Dendritic Polyester and Polyethers

Highly branched or dendritic polyesters can be made by the reaction of trimellitic anhydride with propylene oxide and the dendritic polyethers can be prepared using benzyl halide derivatives or dihydroxy benzene (complete synthetic procedures and descriptions of functional dendrimers, hyperbranched and star polymers can be found in Progress in Polymer Science, *An International Review Journal*, May 2000, Vol. 25, No. 4, K. Inoue, pages 453-571).

Polymer Example 6I

Modified Polyurethane

R—(NCO)$_2$ + RF—(OH)$_2$ + EO—(OH)$_2$, + HO—R—Si(OMe)$_3$
polyisocyanate   fluorine-containing   EO chromophore   adhesion
                 diol             diol          promoter

⇓

[low n]——[EO chromopore]——[adhesion promotion]——[excess OH functionality group for further crosslinking]

Modified polyurethanes according to the invention can be prepared by the following reaction of low refractive index fluorine containing diols, a polyisocyanate, an EO chromophore diol, and an adhesion promoter (preferably n=1.43-1.46).

Polymer Example 6J

Polyphosphazenes

According to the present invention, the preparation of polyphosphazenes systems is described in general terms as follows:

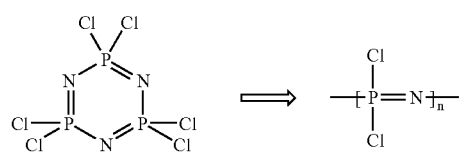

⇒

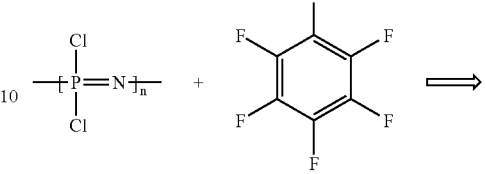

+

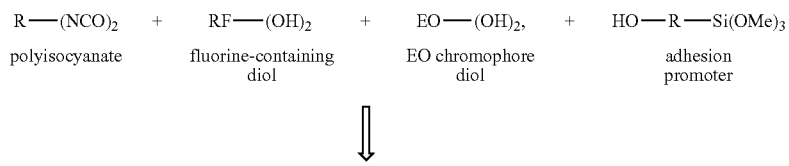

⇒

-continued

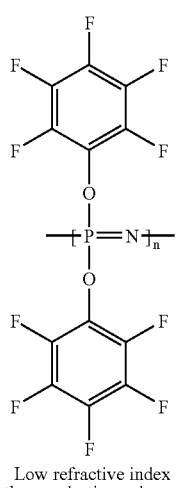

Low refractive index
thermoplastic poylmers

These polymers can be easily modified to be thermosetting, contain adhesive bonding capabilities as well as contain a covalently bonded EO chromophore. The following structure represents the general structure of a preferred polymer according to the present invention:

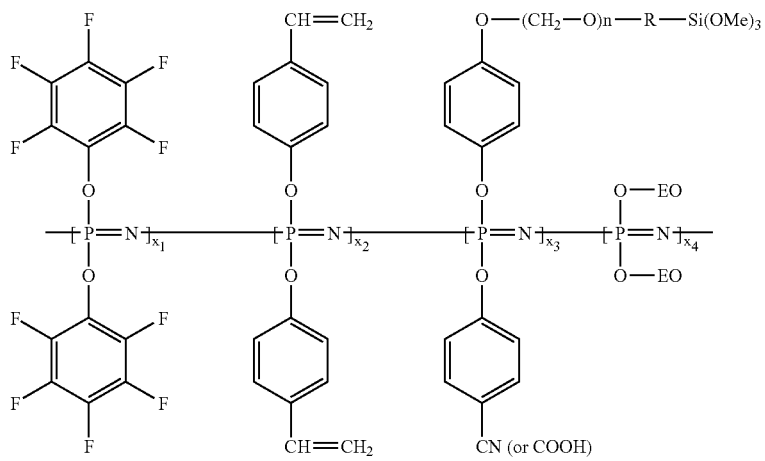

wherein $x_1$=50-80%, $x_2$=10-15%, $x_3$=1-5%, $x_4$=5-20%, and wherein said percentages are by wt-%. Further, any one or more of the —F groups can be replaced by an —H group. Typically in a preferable embodiment of the invention, there is at least one —F atom present. Preferably, there are sufficient —F atoms present to obtain the desired refractive index and compatibilization with EO chromophores.

Polymer Example 7

Polymer for Nonsilica Substrates such as Glass and Plastics

The previously described polymer systems are designed to have relatively low refractive index values but it is possible to design other polymer systems with higher refractive index values but with the same critical requirements as described earlier. The desired profiles of these new polymers are shown in Table 13.

TABLE 13

Comparison of the Prior Art High Refractive Index Polymers and the High Refractive Index Polymers of this Invention

| | Refractive Index | Tg | Thermal Stability {cross-linking capability} | Water/Moisture Sensitivity | Ease of Poling | Adhesion | EO Chromophore Compatibility |
|---|---|---|---|---|---|---|---|
| Prior Art | n > 1.5 | 100° C.> | Variable {Variable} | Yes | No | Poor | Highly variable |
| Example 7 | n > 1.5 | 100° C.> | Yes {Yes} | No | Yes | Excellent | Excellent |

A copolymer for this invention was prepared by free radical (benzoyl peroxide or azo-bisbutyinitrile) polymerization in toluene solution (20% solids) of (all wt-%):

80% styrene monomer (base monomer),

13% methyl methacrylate (base comonomer),

5% acrylonitrile (EO compatibility), and

2% methacryloxypropylsilane (trimethoxy) (adhesion promoter).

The resultant polymer had a Tg of around 100° C. and excellent adhesion to glass or polystyrene and polycarbonate substrates. A control polymer that only contained styrene and methyl methacrylate did not have good adhesion to glass or plastic substrates. These particular polymers can be used with conventional EO chromophores, as well as the EO chromophores of this invention.

Polymer Example 8

Improved Flow

It has been discovered that small amounts of aromatic functional groups in or attached to the polymer backbone help in causing the polymer in a solvent to wet and flow evenly to produce excellent thin film properties For example, a 100% acrylic polymer (polymethylmethacrylate) dissolved in dioxane (20% solution) was spin coated onto glass slides and produced films that had a wide variety of ridges and structures. A copolymer of methyl methacrylate and 1% styrene (flow agent) resulted in a very thin film when spin cast out of dioxane, but these films had very little ridges or striations.

Similar results were observed for low refractive index polymer systems that contained small amounts of styrene or perfluorinated styrene monomers copolymerized with low refractive index acrylic monomer materials. The addition of aromatics such as styrene or perfluorinated styrene (for the low refractive index system) provides the desired improved flow properties.

Polymer Example 9

Poling Efficiency

Polymers, such as polymethylmethacrylate, that contain EO chromophore (Disperse Red-1) generally require approximately 100 volts per micron of film thickness to align or pole the EO chromophore. Other factors, such as Tg, temperature, and polymer molecular weight, also influence the poling efficiency of a polymer and EO system.

It has been found that polymers containing —$CF_3$, —CN, and

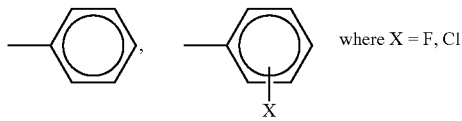

functional groups in the range of 1% to 50% in or on their backbone structures can be used in lowering the poling voltage to below 100 volts per micron film thickness.

Regarding thermoplastic and thermosetting polymers, the following conclusions are apparent based on the present invention:

low refractive index fluoropolymers are not sufficient alone to create a durable host material for a guest or chemically bonded optically active chromophore (prior art);

(b) combinations of fluorine containing monomers with non-fluorine containing monomers allows one to maintain an acceptable refractive index value and high Tg values for silica based optical waveguide systems (the invention);

(c) the use of optically active chromophore compatibilization groups (solubilization groups) provides materials with superior properties:

(1) for conventional chromophores (as defined elsewhere herein), typical examples being nitrites (e.g., acrylonitrile), and esters (note: in some embodiments aromatics may be included);

(2) for the novel chromophores disclosed herein, typical examples being nitriles, hydroxyls, fluorinated and nonfluorinated esters, aromatics, and other groups that contain polar functionality;

(d) the use of adhesive promotion functional groups (typical examples being nitrites, silanes, fluorinated silanes, organic acids (e.g., carboxylic acids), fluorinated acids, alcohols, and fluorinated alcohols; and in some embodiments amides, amines, may be included) increase the overall durability of the entire polymer system in a device (the invention);

(e) polymer electrical property control functional groups (typical examples being nitrites and aromatics) can be added to enhance electrical properties;

(f) water resistant functional groups (typical examples being styrenes, cycloaliphatics, fluorine, partially or fully fluorinated alipahtics, and aromatics) all increase the overall durability of the entire polymer system in a device (the invention); and (g) the polymers (copolymers and blends of homopolymers with other homopolymers or copolymers) disclosed herein can be used to create enhanced total systems (superior to the prior art) using conventional high hydrocarbon content optically active chromophores.

Typically, and preferably the functional optical material contains between about 0.1% to about 20% of one or more compatibilizers as described above. Typically, the functional optical material contains between about 0.1% to about 10% of an adhesive promotion group, or combination of adhesive promotion groups as described above.

When a particular compatibilizer also perform another function (e.g., as an adhesion promoter), better overall properties may be obtained when a different material is added that performs the other function. Thus, if a nitrile is used as a compatibilizer for chromophores, then another material, such as a silane or fluorinated silane, can be used for adhesion enhancement. While one alone would perform both functions, both materials together may perform synergistically to provide greatly enhanced performance over either alone.

The polymers of this invention are even more superior when the inventive fluorinated optically active chromophores are used. In addition, the polymers of the present invention, as illustrated with the material from Sample 4 (Table 7) above, work with non-fluorinated optically active chromophores as well.

II. Gels or Plasticized Polymers for Electrooptic and All-Optical Systems and Devices The gels of this invention are unique in their durability characteristics and their integration with either second-order electro-optic or third-order nonlinear optical phenomena. The gels or plasticized polymers of this invention can have the following general characteristics:

1) Low refractive index polymers with low refractive index liquids, and either prior art chromophores or chromophores of this invention (either as a guest-host system or chemically reacted with the polymer).

2) High refractive index polymers with high refractive index liquids, and either prior art chromophores or chromophores of this invention (either as a guest-host system or chemically reacted with the polymer).

3) Any combination of the above.

The same practical considerations described for the polymers of this invention apply to the novel gels as well. Thus, the key features of the gels of this invention are as follows:

1) Control of optical loss and refractive index (n<1.50; n≧1.50);

2) Polymer-solvent compatibility;

3) Durability (adhesion, water resistance);

4) Temperature (Tg), viscosity (flow) control;

5) Thermoplastic (plasticized) or thermoset (solvent swollen or solvent trapped in a polymer network);

6) Chromophore compatibility (guest-host or chemically bound);
7) Control of electrical properties (poling, dielectric constant, conductance);

ibility and film quality control monomer; and adhesion promotion and ease of poling control monomer.

The general classes of materials that can be used to create gels of this invention are listed in Table 14.

TABLE 14

| Gel Components | | | | |
|---|---|---|---|---|
| Refractive index control monomers and polymers (thermoplastic and thermosetting) (also optical loss control) | Solvents (viscosity, modulus, and thermal control) (also film control) | Crosslinking capability (Tg, viscosity, modulus, durability) | Chromophores $\chi^{(2)}$ or $\chi^{(3)}$ (film control and compatibility) | Adhesion and poling control |
| See Examples 2 through 9, and Tables 1-3, 6-9, 11-13 of this invention. Reactive polymers (epoxy resins, unsaturated polyesters, polyimides, polyurethanes, polysiloxanes) | Aliphatic/aromatic alcohols, esters, carbonates, and ethers. Plasticizers Fluorinated solvents | Functional polymers Reactive monomers (di-tri- multifunctional acrylates/methacrylates, triols) Polyols/polyisocyanates Epoxy resins/hardeners Polyimides | Unreactive (guest-host) Reactive (capable of being chemically attached to the polymer gel backbone structure) | Polar functionality (—OH, —COOH, —CN, —NH$_2$, —NHCO—) Silanes |

A functional optical gel is defined in this invention as being comprised of a thermoplastic or thermosetting polymer, a nonlinear optical chromophore ($\chi^{(2)}$, $\chi^{(3)}$) or a filler or electrochromic, photochromic, fluorescent/phosphorescent chromophore and a nonvolatile (at the operating temperature) solvent (reactive or nonreactive). This combination of materials results in a gel (polymer swollen with solvent containing chromophores or fillers and other additives) that is non-deformable, self-standing, non-flowable at the operating temperature of a device that contains the gel. The operational temperature is the temperature at which the device containing the gel is designed to function. The polymers can be thermoplastic (vinyls, acrylics, polyesters, polyurethanes, polycarbonates, etc.) or thermosetting (acrylics, unsaturated or functional polyesters, polyurethanes, epoxy resins, etc.) or combinations of thermoplastic and thermosetting polymers. The non-reactive solvents can be alcohols, esters, oils, polyether, carbonates, etc. and the reactive solvents can be multifunctional alcohols, unsaturated vinyls/acrylics, poly-isocyanates, etc. The chromophores can be guest-host or chemically bound/reacted into the gel network structure. Fillers (active/passive) and other additives (adhesion promoters, compatibilizing agents) can also be contained in the gel. The final refractive index can be either greater than or less than 1.5, depending on the optical device in which the gel is being used.

The general concept that influences the unique gel compositions of this invention are: refractive index control monomer, polymer, or solvent (also optical loss control); Tg/viscosity/modulus control monomer, polymer, or solvent (thermal control); crosslinking capability (monomer, functional polymer, or reactive diluent); chromophore compat- There are at least four methods by which one can create the nonlinear optical gels of this invention.

Method 1—Solvent Swollen or Plasticized Thermoplastic Polymers

In this case a thermoplastic polymer or copolymer (see for example the thermoplastic copolymers and homopolymers from Polymer Examples 2 and 3, and listed in Tables 6-9 herein) is added to a compatible solvent (1%-99% polymer or 99%-1% solvent) that contains a conventional $\chi^{(2)}$ or $\chi^{(3)}$ nonlinear optical chromophore or one of the $\chi^{(2)}$ or $\chi^{(3)}$ modified (fluorinated) chromophores of this invention.

Method 2—Crosslinked

Polymers containing reactive functionalities that can be crosslinked in the presence of a reactive crosslinking agent or reactive or nonreactive solvents with reactive or nonreactive chromophores.

Method 3—Direct Formation

The gel is formed and crosslinked in situ using combinations of reactive monomers (see Tables 1, 2, 3 herein and Polymer Example 5), polymers, and solvents in the presence of reactive or non-reactive chromophores.

Method 4—Interpenetrating Polymer Networks

Any combination of methods 1, 2, and 3.

Specific examples for each method are given in the following tables.

TABLE 15

Solvent Swollen or Plasticized Thermoplastic Polymers

| Thermoplastic polymer (weight-%) | Solvent (weight-%) | Chromophore ($\chi^{(2)}$, $\chi^{(3)}$) (weight-%) | Results |
|---|---|---|---|
| Polymethyl-methacrylate (90) | Trimethylolpropane Triacrylate (5) | Nitroaniline ($\chi^{(2)}$) (5) | Active |
| Copolymer of trifluoroethyl-methacrylate and hydroxyethyl-methacrylate (80%/20%) (90) | Dioctylsuberate (5) | Trifluoromethyl nitroaniline ($\chi^{(2)}$) (5) | Active |
| Thermoplastic polyester (90) | Propylene carbonate (5) | DR-1 ($\chi^{(2)}$) (5) | Active |
| Thermoplastic polyurethane (90) | Nitrobenzene (5) | DR-19 ($\chi^{(2)}$) (5) | Active |
| Polymethyl-methacrylate (90) | Dioctylsuberate (10) | None | Not Active |
| Polymethyl-methacrylate (90) | Dioctylsuberate (5) | DR-1 ($\chi^{(2)}$) (5) | Active |
| Polyvinyl chloride (90) | Dioctyl phthalate (5) | Fluorinated DR-1 ($\chi^{(2)}$) (5) | Active |
| Polymethyl-methacrylate (90) | Dioxane (5) | Anthracene or alkyl substituted polythiophene ($\chi^{(3)}$) (5) | Compatible |
| Thermoplastic polymer (weight-%) | Solvent (weight-%) | Chromophore ($\chi^{(2)}$, $\chi^{(3)}$) (weight-%) | Results |
| Copolymer of trifluoroethyl-methacrylate and hydroxyethyl-methacrylate (80%/20%) (90) | Dioxane (5) | Anthracene or alkyl substituted polythiophene ($\chi^{(3)}$) (5) | Not compatible |
| Copolymer of trifluoroethyl-methacrylate and hydroxyethyl-methacrylate (80%/20%) (90) | Dioxane (5) | Trifluoromethyl anthracene or trifluoroethyl substituted polythiophene ($\chi^{(3)}$) (5) | Compatible | where
Active = an electrooptic response was observed under 100 V/micron film thickness poling conditions.
Compatible = clear uniform transparent gels
DR-1 = Disperse Red 1
DR-19 = Disperse Red 19
Note:
All ingredients were blended together and placed in a transparent test cell (two plates of Indium tin oxide coated glass) and examined for their electrooptic response and optical clarity (compatibility).

TABLE 16

Crosslinked Gels

| Thermoplastic polymer (weight-%) | Solvent (weight-%) | Chromophore ($\chi^{(2)}$, $\chi^{(3)}$) (weight-%) | Results |
|---|---|---|---|
| Copolymer of trifluoroethyl-methacrylate and hydroxyethyl-methacrylate (80%/20%) (80) and hexamethylene diisocyanate (15) | Dioctyl subarate or dioxane (5) | Fluorinated DR-1 ($\chi^{(2)}$) or fluorinated anthracene ($\chi^{(3)}$) (5) (this invention) | Compatible |
| Copolymer of trifluoroethyl-methacrylate and hydroxyethyl-methacrylate (80%/20%) (80) and hexamethylene diisocyanate (15) | Dioctyl subarate or dioxane (5) | DR-1 ($\chi^{(2)}$) or anthracene ($\chi^{(3)}$) (5) (prior art) | Not compatible |
| EPON 1001 (Shell Chemical Company) (40) and diethylenetriamine (30) | Dibutylphthalate (25) | DR-1 ($\chi^{(2)}$) or anthracene ($\chi^{(3)}$) (5) (this invention) | Compatible |

Note:
All ingredients were mixed together, applied to a test cell (two pieces of quartz containing the gel between the faces; heated to 50° C. for 8 hours and then examined for compatibility (clarity of the gel)). Both the fluorinated DR-1 and non-fluorinated DR-1 can chemically react with the polymer network. Anthracene is not reactive with these polymers.

TABLE 17

Method-In situ or Direct Formation of Gels

| Reactive monomers (weight-%) | Solvents (reactive or nonreactive) (weight-%) | Chromophore (reactive or nonreactive) ($\chi^{(2)}$, $\chi^{(3)}$) (weight-%) | Results |
|---|---|---|---|
| Trifluoroethyl methacrylate (80) Trimethylolpropane triacrylate (10) | Dioxane or propylene carbonate (5) | Fluorinated DR-1 ($\chi^{(2)}$) or methacrylate ester of fluorinated DR-1 ($\chi^{(2)}$) or fluorinated anthracene ($\chi^{(3)}$) (5) (this invention) | Compatible gels |
| Trifluoroethyl methacrylate (80) Trimethylolpropane triacrylate (10) | Dioxane or propylene carbonate (5) | DR-1 ($\chi^{(2)}$) or anthracene ($\chi^{(3)}$) (5) (all hydrocarbon) (prior art) | Not compatible gels |

TABLE 17-continued

Method-In situ or Direct Formation of Gels

| Reactive monomers (weight-%) | Solvents (reactive or nonreactive) (weight-%) | Chromophore (reactive or nonreactive) ($\chi^{(2)}, \chi^{(3)}$) (weight-%) | Results |
|---|---|---|---|
| Styrene (45) and an unsaturated polyester (45) | Dibutylphthalate (5) | DR-1 ($\chi^{(2)}$) or anthracene ($\chi^{(3)}$) (5) (all hydrocarbon) (prior art) | Not compatible gels |

Note:
All the ingredients are combined and a small amount (0.1 to 10%) of a free radical initiator (benzoyl peroxide-thermal initiator or diethoxyacetophenone-photochemical free radical initiator) is added. The mixture is then placed between quartz plates, cured (thermally or photochemically) into a stable compatible gel.

TABLE 18

Combination Method of Gel Formation

| Materials (weight %) | Solvents (weight %) | Chromophore (weight %) | Results |
|---|---|---|---|
| Trifluoroethyl methacrylate (30) and trimethylol-propane triacrylate (30) (reactive monomers) Copolymer of methyl methacrylate and trifluoroethyl methacrylate(50/50) (30) | Dioxane or dibutyl subarate (5) | Fluorinated anilines ($\chi^{(2)}$) or fluorinated DR-1 ($\chi^{(2)}$) (5) (this invention) | Compatible gel |
| Polyvinyl chloride (10), tetrahydrofurfural methacrylate (30), ethylene glycol diacrylate (25), methyl methacrylate (20) | Dioxane or dibutyl subarate (10) | DR-1 ($\chi^{(2)}$) or anthracene ($\chi^{(3)}$) (5) | Compatible gel |

Note:
The gels were prepared in a similar manner as described in Table 17.

III. All Optical Switching with Third-Order $\chi^{(3)}$ Chromophores

The present invention comprises of two novel polymer elements:
1. High refractive index durable polymers and gels that are compatible with both types of conventional (all hydrocarbon) second-order ($\chi^{(2)}$) chromophores (these are defined as having both donor and acceptor functional groups separated by an unsaturated bridge structure) and third order ($\chi^{(3)}$) chromophores (these chromophores do not require separate donor and acceptor functional groups, but they do require a high degree of unsaturation sites and conjugation). Conventional $\chi^{(2)}$ and $\chi^{(3)}$ chromophores are those described in the prior art, and incorporated by the following references;
   a. *Nonlinear Optics of Organic Molecules and Polymers*, H. S. Nalwa and S. Mikats, eds., CRC Press, Boca Raton, Fla. (1997).
   b. *Organic Materials for Nonlinear Optics*, R. A. Hann and D. Blour, eds., Royal Society of Chemistry, Great Britain (1989).
   c. *Organic Nonlinear Optical Materials*, C. H. Bosshard, et. al., Gordon and Breach, Belgium (1995).
   Note: $\chi^{(2)}$ materials can also function as $\chi^{(3)}$ materials under high energy conditions.
2. Low refractive index durable polymers and gels that are only compatible with the special chromophore modifications (incorporation of fluorine groups at special/unique locations in/on the chromophore structures) of the present invention.

Examples of the advantages of $\chi^{(2)}$ chromophores with and without fluorine groups are disclosed elsewhere in this application. Examples of Conventional $\chi^{(3)}$ chromophores and the novel chemical modifications of this invention are listed in Table 19.

TABLE 19

Third-Order ($\chi^{(3)}$) Chromophores

| High Refractive Index Chromophores (compatible with high refractive index polymers) (Prior Art) | Modifications of chromophores for compatibility with low refractive index fluoropolymers. (This Invention) |
|---|---|
| Poly(p-Phenylenevinylene) with 2,5 alkyl or aryl substitutions | Change the 2,5 hydrocarbon alkyl or aryl groups to —CF$_3$ or fluorinated aryl groups |
| Alkyl-substituted polythiophenes | Change the hydrocarbon alkyl substituted polythiophenes to fluorinated alkyl groups |
| Alkyl/Aryl hydrocarbon substituted poly (phenylene-ethynylene). | Change the hydrocarbon alkyl/aryl groups to fluorine containing alkyl/aryl groups |
| Anthracene and other polynuclear hydrocarbons. | Fluorinated polynuclear hydrocarbons |

Example 10

Third-Order ($\chi^{(3)}$) Compatibility and Durability Results with Polymers

A series of conventional $\chi^{(3)}$ chromophores and new chromophores of this invention were formulated with conventional polymers and the polymers/gels of this invention. The results of these studies are given in Tables 20 and 21.

TABLE 20

$\chi^{(3)}$ - Polymer Compatibility Studies

| Polymers | $\chi^{(3)}$ Chromophore | Results |
|---|---|---|
| Polymethyl methacrylate (Prior Art) | Anthracene | Compatible but not durable |

TABLE 20-continued $\chi^{(3)}$ - Polymer Compatibility Studies

| Polymers | $\chi^{(3)}$ Chromophore | Results |
|---|---|---|
| Polymethyl methacrylate (Prior Art) | Polythiophene | Compatible but not durable |
| Polymer of Example 7 (n > 1.5) | Anthracene or polythiophene | Compatible and durable |
| Polymer of Example 3 (Table 7, No. 4) | Anthracene or polythiophene | Not compatible |
| Polymer of Example 3 (Table 7, No. 4) | Trifluoromethyl anthracene or trifluoroethyl-substituted polythiophene | Compatible and durable |

Compatible = clear films (no haze).
Durable = adhesion to glass and resistance (no haze or loss of adhesion) when exposed to water.

TABLE 21

Third-Order ($\chi^{(3)}$) Compatibility Results With Gels

| Gel | $\chi^{(3)}$ Chromophore | Results |
|---|---|---|
| Polyvinylchloride and dioctylphthalate (70/30 by weight) (n > 1.5) | Anthracene or Polyalkylthiophene | Compatible (clear film) |
| Polymer of Example 3 (Table 7, No. 4) and Trifluoroethyl acetate (80/20 by weight) (n < 1.5) | Anthracene or polyalkylthiophene | Not compatible (not soluble) |
| Polymer of Example 3 (Table 7, No. 4) and Trifluoroethyl acetate (80/20 by weight) (n < 1.5) | Trifluoromethyl anthracene or Triflurorethyl-substituted Polythiophene | Compatible (clear film) |

IV. Electrochromic/Photochromic Chromophores and Other Dyes in the Polymers and Gels of this Invention.

Electrochromic systems of this invention consist of a polar/high dielectric constant non-aqueous solvent (propylene carbonate), a low or high refractive index polymer (copolymer of trifluoroethyl methacrylate with hydroxyethy methacrylate and vinyltrimethoxysilane, or polymethyl methacrylate) and a conventional or fluorine-modified electrochromic chromophore such as viologen, fluorinated viologen, or other related materials (see *Polymeric Materials Encyclopedia*, J. C. Salomone, ed., Vol. 11, p 8606-8613, CRC Press, Boca Raton, Fla. (1996)). For example, 1 gm of either the high refractive index or low refractive index polymers of this invention was combined with 10 gm of a 1% by weight viologen in propylene carbonate mixture, and placed in a cell containing 2 parallel plate electrodes. This gel solution was clear but turned dark purple when activated by a 9V battery. Disconnection of the battery resulted in a clear solution, hence demonstrating the electrochromic effect.

Photochromic systems can also be prepared using the low and high refractive index polymers or gels of this invention. For example, azo dyes, stilbenes, spiropyrans, etc. (see *Polymeric Materials Encyclopedia*, Vol. 7, pages 5106-5136; Vol. 5, p 3421-3427, for a complete description of photochromic materials that can be used in this invention) were combined (10% loading) with the polymers and gels of this invention. UV light irradiation of the azo dye or the stilbene dye caused a shift in its absorption wavelength, which then returned to its normal position after the light was removed (this demonstrates the photochromic effect).

It should also be obvious from these examples that other dyes (fluorescent or phosphorescent) can be combined with the novel polymers or gels of this invention to produce novel optical devices (for a representative list of dyes, see Aldrich or Kodak Laboratory Chemicals No. 54 (1990)).

V. Enhanced Stability of the Electrooptic Response of Polymeric Systems.

Another aspect of the present invention broadly provides for a method to enhance the stability of chromophore/polymer systems used in electrooptic applications. For electrooptic applications, the chromophore/polymer material must be activated by poling, which is orienting the chromophores to create a preferred optical direction. This is commonly done through application of a large external electric field while the chromophore/polymer system is at an elevated temperature (roughly equal to or greater than the glass transition temperature, Tg, of the system), and then cooling the system with the field applied to lock in the preferred orientation. Over time, and/or with the application of temperature, this preferred orientation tends to disappear (depoling), reducing the effectiveness of the system. Also, the transmission of high intensity light through a chromophore/polymer system can lead to physical degradation of the chromophore due to chemical activity while the chromophore is in an optically excited state (photodegradation). This degradation process will also lead to decreased effectiveness of the system due to the decrease in the chromophore concentration.

More specifically, this aspect of the invention provides a method to both reduce the depoling of a chromophore polymer system, and also to reduce the photodegradation of the chromophore. This is accomplished using a method that does not greatly degrade, and may enhance, other physical properties (glass transition temperature, optical loss, adhesion to substrate, water uptake) needed to provide a commercially viable electrooptical system.

The MEK-ST colloidal silica was purchased from Nissan Chemical Industries, Ltd. $CaF_2$ was purchased from GFS with average particle size of 1.5 µm, and used as received. A second sample of $CaF_2$ was placed in acetonitrile and ground with a mortar and pestle, then filtered through a 0.45 µm syringe filter, to produce a $CaF_2$ sample that was smaller than 0.5 µm.

Example 11

Clarity of DR1/PMMA Sample with Silica Filler

A silica dispersion containing ~11.2 mg of silica in MEK was added to 1.08 g of a 10% PMMA in dioxane solution. The solids of the resulting combined solution contained approximately 10% silica. The solution was deposited on a glass slide, and allowed to dry, forming a film. The resulting film was very cloudy (opaque), due to the large scattering by the silica particles. The scattering is increased because of the refractive index mismatch between the PMMA and silica, and by the large size of the silica particles.

Example 12

Clarity of DR1/PMMA Sample with Large CaF2 Filler 20 mg of $CaF_2$ as received (average size ~1.5 µm) plus 20 mg of Disperse Red 1 were added to 2 gm of a 10% PMMA in dioxane solution. The resulting solution had a solids content that was ~10% $CaF_2$, 10% DR1, and 80% PMMA.

The solution was deposited onto a glass slide and allowed to dry. The resulting film was somewhat opaque, due to the large size of the $CaF_2$ particles.

Example 13

Clarity of DR1/PMMA Sample with Small CaF$_2$ Filler 30 mg of CaF$_2$ of the ground CaF$_2$ in ~1 ml acetonitrile were mixed with 36.7 mg of Disperse Red 1. 1.83 gm of a 20% PMMA in acetonitrile solution then was added. The resulting solution had a solids content that was ~10% CaF$_2$, 10% DR1, and 80% PMMA.

The solution was deposited onto a glass slide and allowed to dry. The resulting film was clear, due to the reasonable match between the refractive index of the CaF2 and PMMA, and the smaller size of the CaF$_2$ particles.

Example 14

EO Response of DR1/PMMA Sample

Figure 2:
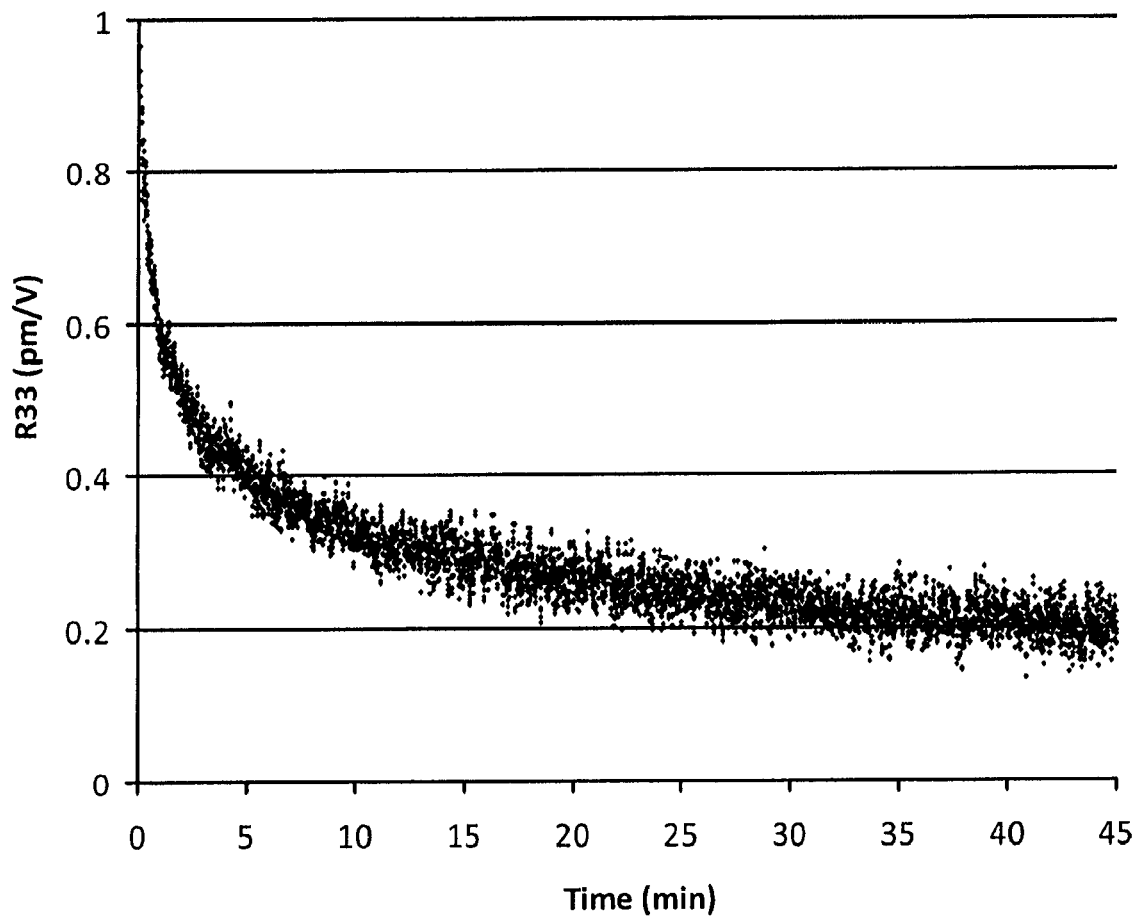
FIG. 2 illustrates the EO response of the DR1/PMMA sample in Example 14.
Figure 3:
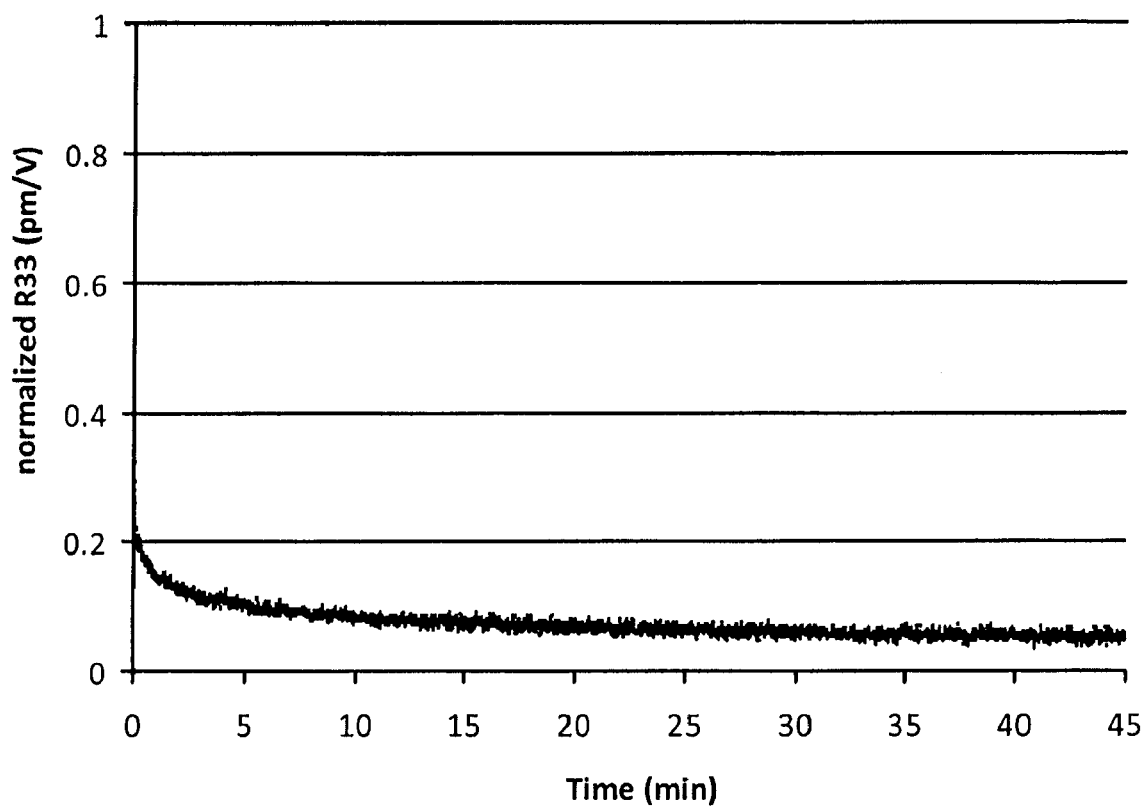
FIG. 3 illustrates the normalized EO response of the DR1/PMMA sample in Example 14.

A sample of PMMA mixed with Disperse Red 1 in dioxane (solids content of ~89% PMMA and 11% DR1) was prepared, spun down onto an ITO coated quartz slide, and dried at 125° C. for 2 hours. The film was then poled at 80° C. for ~20 minutes with a voltage of 250 V applied. The film was then allowed to cool to room temperature with the voltage applied. The EO response of the film was then measured as a function of time, as shown in FIG. 2.

Because of the large variation of EO response from the different chromophore/polymer systems included above, it is fruitful to also present the normalized EO response of the system, where the EO as a function of time is normalized to be 1 at time t=0. The normalized EO response of the DR1/PMMA system is shown in FIG. 2.

Example 15

EO Response of DR1/PMMA Sample with CaF2 Stabilizer

Figure 4:
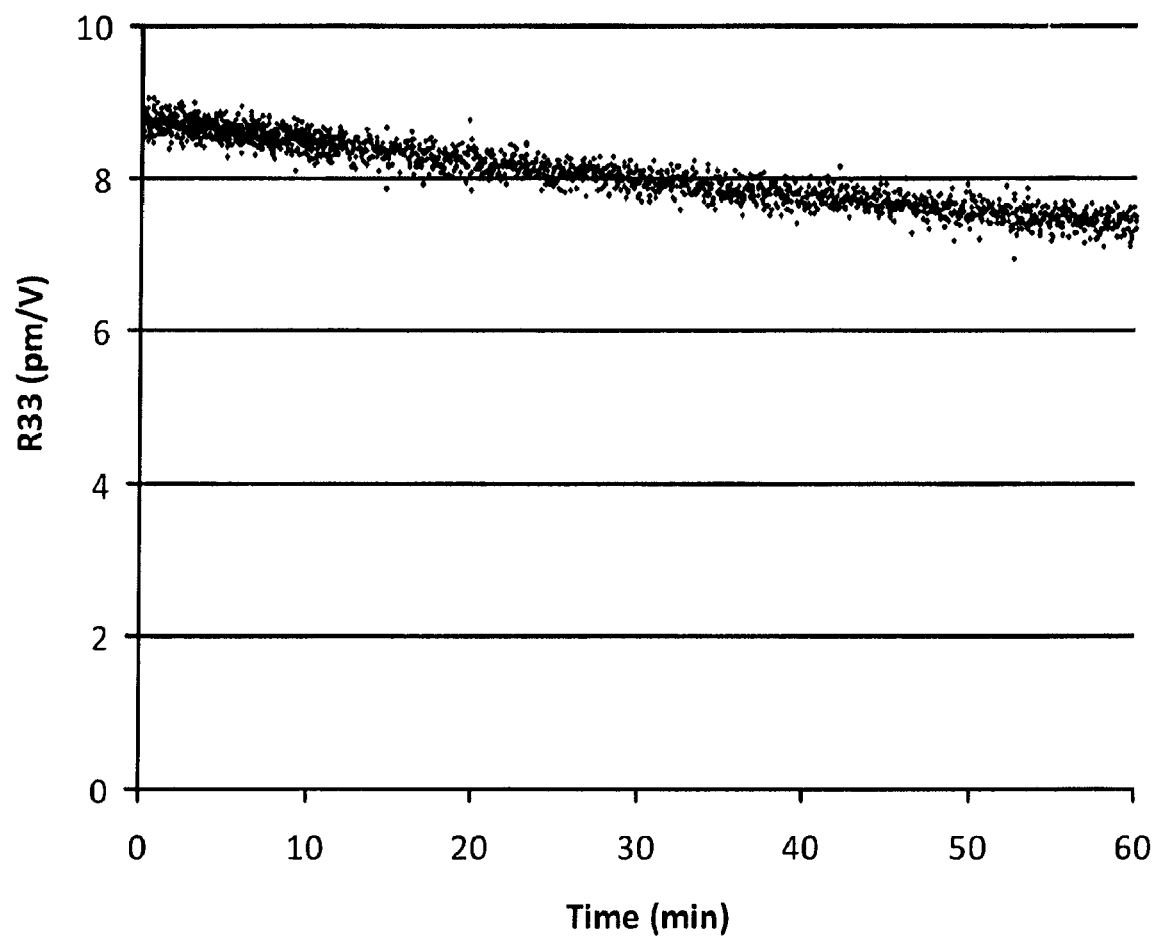
FIG. 4 illustrates the EO response of the DR1/PMMA/CaF$_2$ sample in Example 15.

A sample of PMMA mixed with Disperse Red 1 and filtered CaF$_2$ in dioxane (solids were .about.80% PMMA, 10% DR1 and 10% CaF$_2$) was prepared, spun down onto an ITO coated quartz slide. The film was then poled at 80° C. for .about.20 minutes with a voltage of 300 V applied. The film then was allowed to cool to room temperature with the voltage applied. The EO response of the film was then measured as a function of time. FIG. 4 shows the EO response of the film as a function of time.

Figure 5:
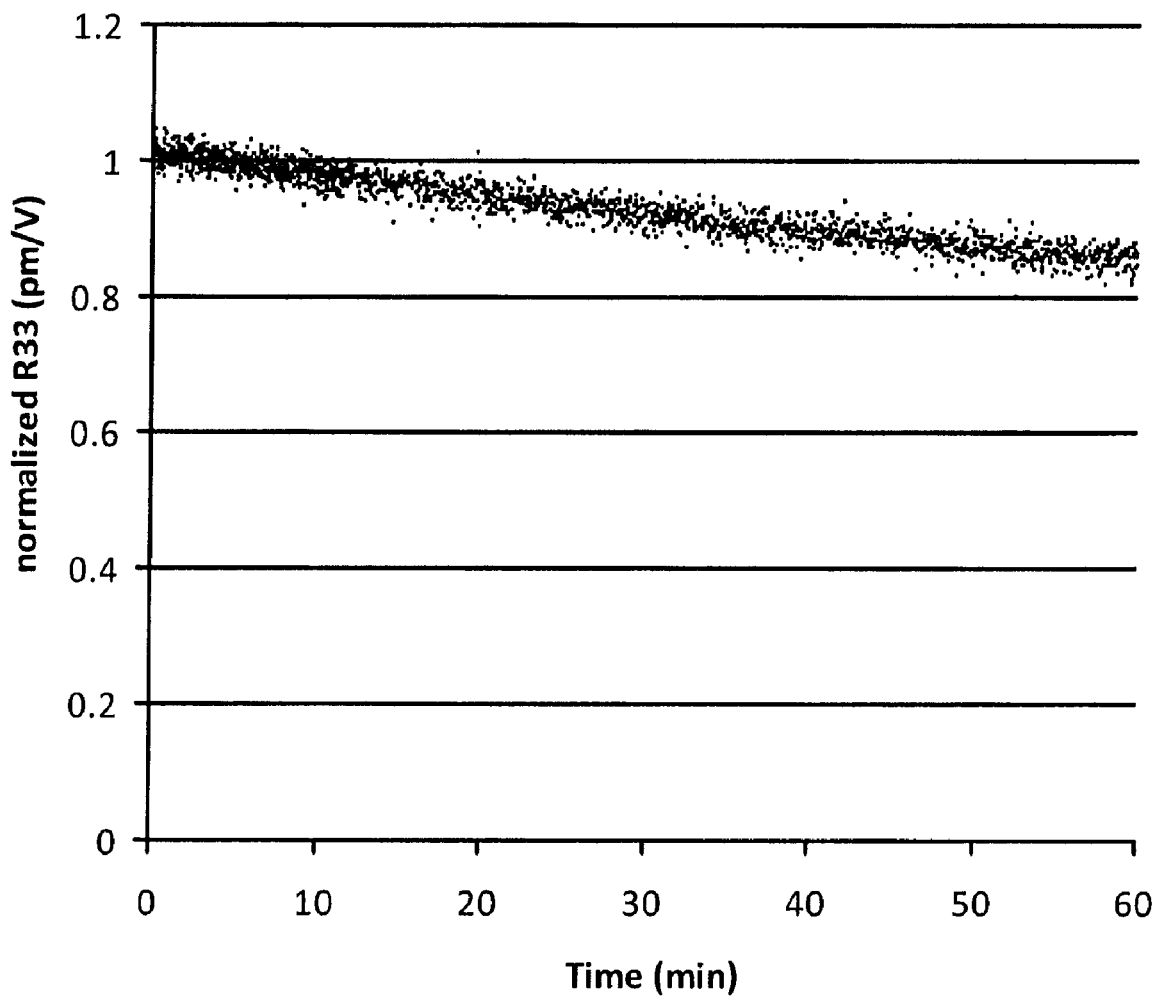
FIG. 5 illustrates the normalized EO response of the DR1/PMMACaF$_2$ sample in Example 15.

Comparison of the EO response of this example with that of Example 25 shows that the inclusion of the filler dramatically decreased the decay of the EO response. This effect is even more apparent in the following graph, where the normalized EO response of the DR1/PMMA system is shown in FIG. 5.

Example 16

EO Response of EO Active Polymer Sample

Figure 6:
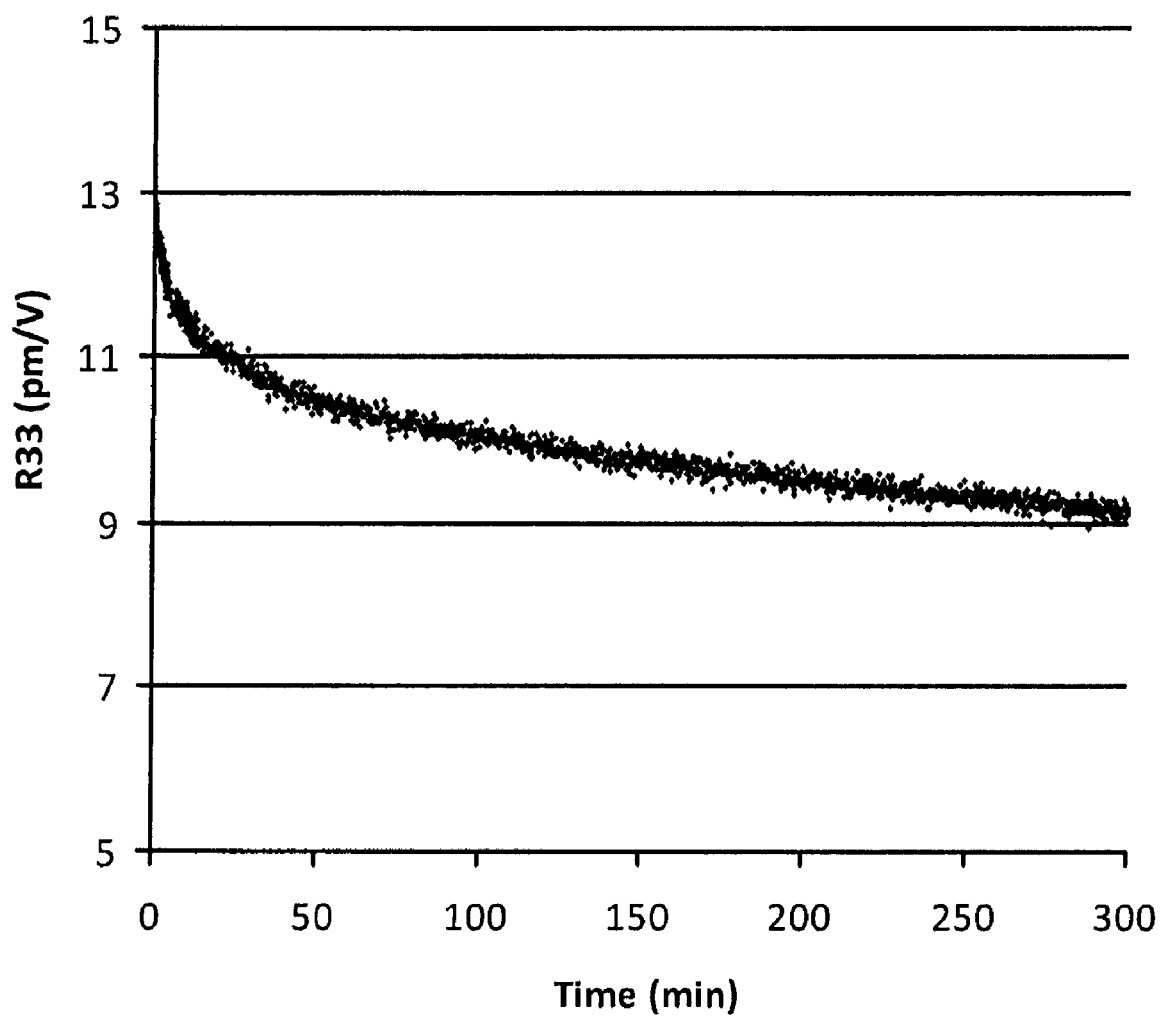
FIG. 6 illustrates the EO response of the EO Active Polymer sample in Example 16.
Figure 7:
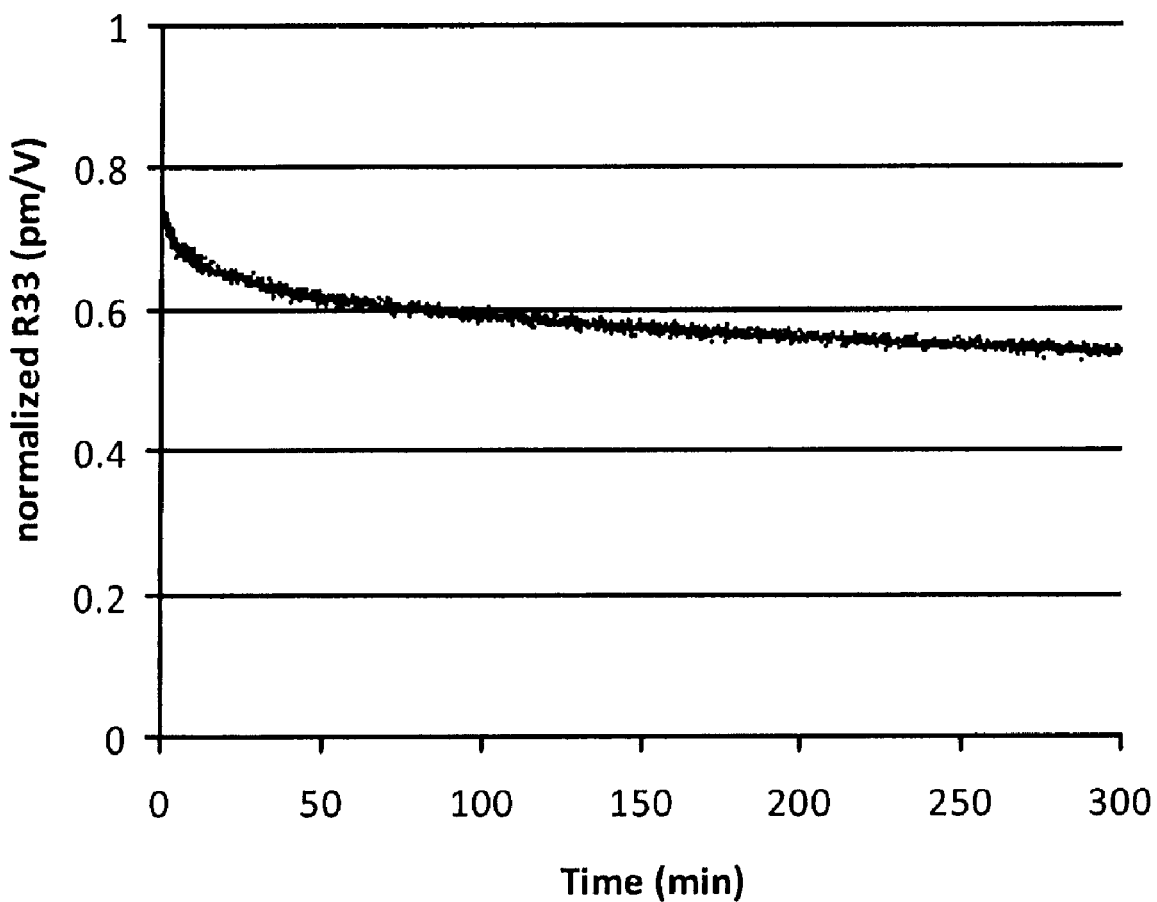
FIG. 7 illustrates the normalized EO response of the EO Active Polymer sample in Example 16.

A sample of polymer with a chromophore of this invention copolymerized into the backbone (Example 27) in dioxane was prepared, spun down onto an ITO coated quartz slide. The film was then poled at 86° C. for .about.15 minutes with a voltage of 200 V applied. The film then was allowed to cool to room temperature with the voltage applied. The EO response of the film was then measured as a function of time. FIGS. 6 and 7 show the EO response of the film as a function of time.

Example 17

EO Response of EO Active Polymer Sample with CaF$_2$ Stabilizer

Figure 8:
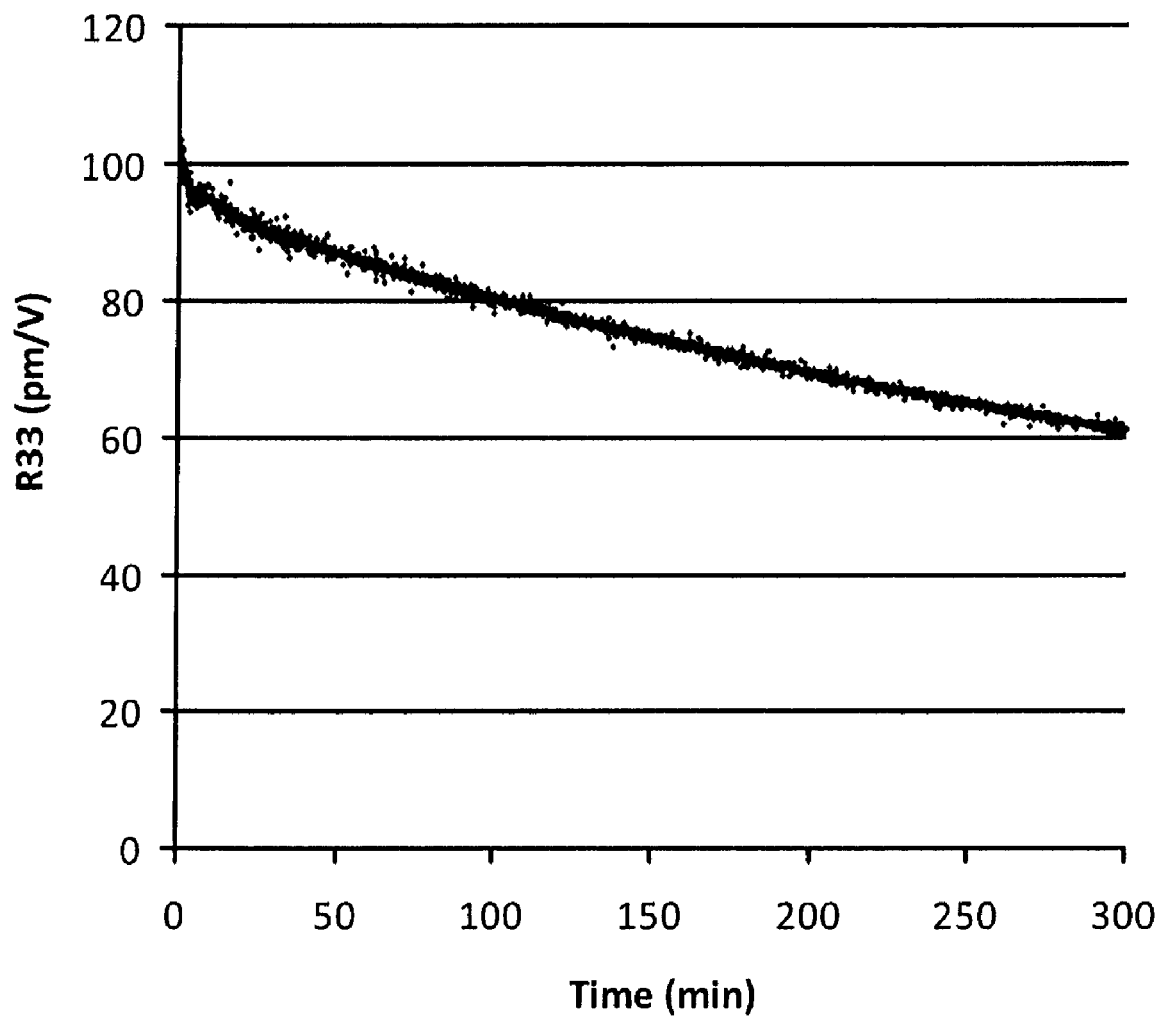
FIG. 8 illustrates the EO response of the EO Active Polymer sample with CaF$_2$ in Example 17.

A sample of polymer with a chromophore of this invention copolymerized into the backbone (Example 27) with 10% filtered CaF$_2$ in dioxane was prepared, spun down onto an ITO coated quartz slide, with the resulting film thickness approximately 10 μm. The film was then poled at 70° C. for .about.15 minutes with a voltage of 2000 V applied. The film was then allowed to cool to room temperature with 300 V applied. The EO response of the film was then measured as a function of time. FIG. 8 shows the EO response of the film as a function of time.

Figure 9:
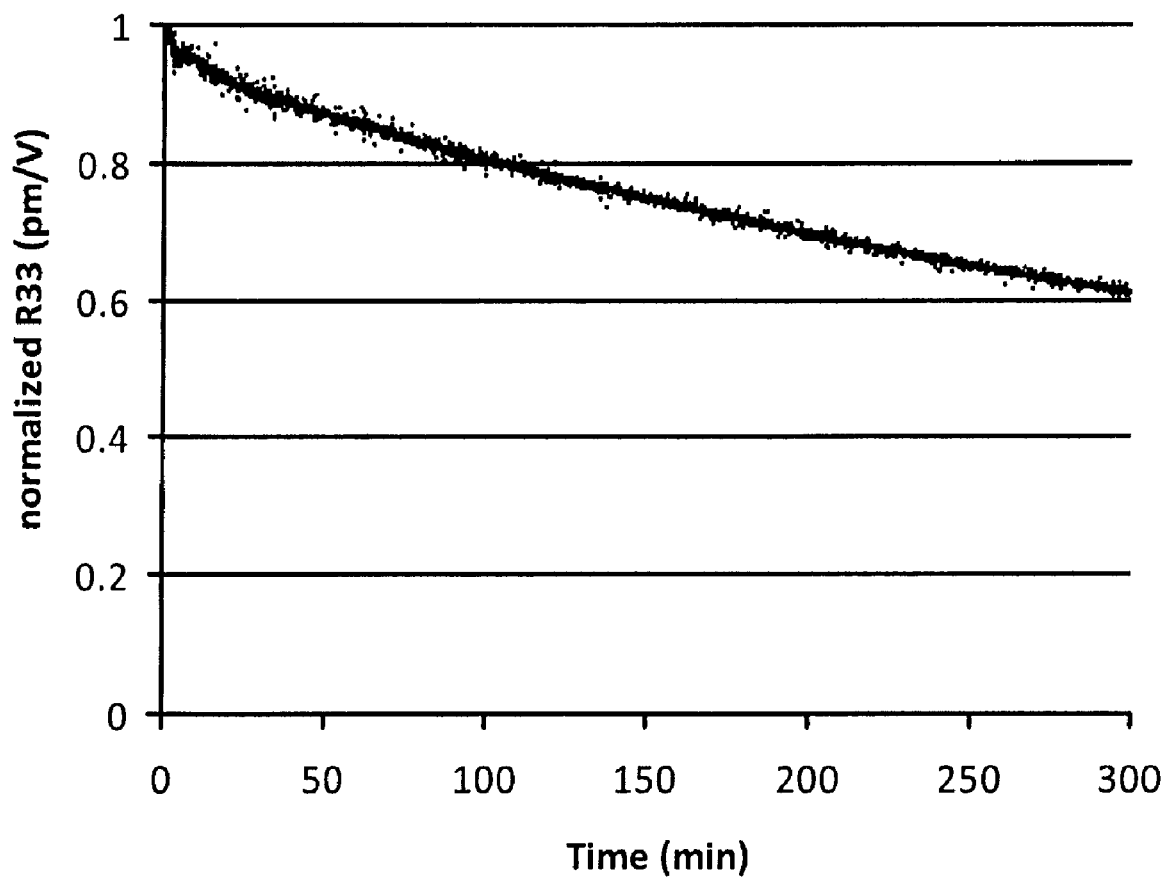
FIG. 9 illustrates the normalized EO response of the EO Active Polymer sample with CaF$_2$ in Example 17.

Again, because the magnitude of the EO response is different for the samples with or without the CaF$_2$ stabilizing component, it is more fruitful to examine the normalized EO response, which is shown in FIG. 9.

Here again, comparison to Example 16 shows that inclusion of the CaF$_2$ leads to slower decay of the EO response.

Fitting the data shown in Examples 16 and 17 to double exponential curves allows for determination of the two time constants that describe the decay. The data from Example 16 is fit by:

$$EO=2.223 \exp[-t/10.04]+10.607 \exp[-t/2002.6]$$

while the data of this Example is best fit by $$EO=50.45 \exp[-t/365.6]+45.207 \exp[-t/2002.2]$$

These curve fits show two distinct features of adding the CaF$_2$ for stabilization. One is that there is substantial stabilization of the first component of the decay, with the time constant going from 10.04 minutes to 365.5 minutes, while the second component of the decay is unaffected by the stabilizer. The second feature is the change in the relative contribution of the two components.

Example 18

Inclusion of Stabilizers with Additional Functionality

The previous examples have discussed the use of inert stabilizers. In this example, the utility of including stabilizer particles that perform a second function in the system is demonstrated. These stabilizer particles also have the properties shown to be important previously, i.e., size smaller than the wavelength of the incident radiation and surface chemistry compatible with the host polymer.

For example, nanoparticles have been shown to have interesting optical properties, including absorption at wavelengths determined by the size and composition of the nanoparticles (most common are CdSe nanoparticles, often with a CdS outer shell), and also by their degree of aggregation. For visible and infrared wavelengths, these nanoparticles typically are much smaller than the wavelength of the radiation. Proper selection of the composition of the nanoparticle can lead to a small refractive index mismatch with the host polymer. Satisfying these conditions will lead to nanoparticles with small light scattering cross section. The surface chemistry of the outer surface of nanoparticles typically can be chemically modified without altering the optical properties of the nanoparticles. By this modification, the nanoparticles can be made compatible with the host polymer, leading to reduced aggregation. The composite material now has enhanced properties over that of the components, in that the poling of the host polymer matrix is stabilized, and a second functional optical material is in the system. Possible uses for the optical function of the nanoparticles would be wavelength conversion, sensors, etc.

A second example is the inclusion of a stabilizer that also would function as an amplifying medium. It is well known that many inorganic materials are capable of amplifying light of specific wavelengths, when a second pump source is used to activate the material. In particular, rare earth-containing inorganic compounds commonly have been used in glass fibers to form amplifiers. However, creation of polymer fiber amplifiers has not been as successful. The high intensity of pump radiation can lead to degradation of the host matrix, and prevents the inclusion of the amplifying medium in an optically active polymer system. Use of the proper rare earth inorganic compound as a stabilizer could allow for development of polymer fiber amplifiers. The inorganic compound is commonly much smaller than the wavelength of the light. By properly altering the surface chemistry of the rare-earth compound, it will be possible to make it compatible with the optically active polymer medium. The small size and compatibility also will allow the rare-earth compound to function as a stabilizer, slowing the degradation of the polymer host. This will allow for longer operational life of the system.

Example 19

Inclusion of Stabilizers with Spatial Ordering

Optical band gap materials are formed by arranging a series of inclusions or voids (with optical properties different from that of the host) in a specified geometrical pattern. Based on the spacing between the inclusions, and the difference in the optical properties between the host and inclusion, radiation of specific wavelengths can be prevented from propagating through the medium in specific directions.

For this example, an optically active optical band gap material can be formed by using a stabilizing material as the inclusion in a host optically active polymer matrix. The refractive index mismatch between the stabilizer and the host, and the spatial arrangement of the stabilizers is used to define the excluded wavelength and propagation direction. The ability of the optically-active host to change its optical properties can be used to alter the band-gap properties of the system, while the stabilizing properties of the inclusions allows for longer operational life of the system.

Example 20

Inclusion of Stabilizers with Suitable Surface Chemistry

This example shows the range of materials suitable for use as stabilizing agents for a given chromophore/polymer system. The primary requirements for determining a suitable stabilizing agent are: (1) small refractive index mismatch between the stabilizer and the chromophore/polymer system, (2) size of the stabilizing agent smaller than the wavelength of radiation of interest, and (3) compatible surface chemistry of the stabilizing agent. A material that satisfies these three requirements should both reduce the depoling of a chromophore polymer system, and also to reduce the photodegradation of the chromophore. This stabilizing agent should only slightly degrade, or may even enhance, other physical properties (glass transition temperature, optical loss, adhesion to substrate, water uptake) needed to provide a commercially viable electrooptical system.

TABLE 22

Possible Stabilizers for Low Refractive Index Polymers

| Stabilizer | Polymer Matrix or Gel | Refractive Index Match | Surface Chemistry Match |
|---|---|---|---|
| Silica | PMMA | Good | Good |
| Silica | Other organic polymers | Fair-Good | Fair-Good |
| Silica | Fluoropolymers | Fair | Fair |
| $CaF_2$ | PMMA | Fair | Fair |
| $CaF_2$ | Other organic polymers | Fair | Fair |
| $CaF_2$ | Fluoropolymers | Good-Excellent | Good-Excellent |
| CdSe | PMMA | Poor | Poor |
| CdSe | Other organic polymers | Poor | Poor |
| CdSe | Fluoropolymers | Poor | Good |
| Glass | PMMA | Fair-Good | Fair-Good |
| Glass | Other organic polymers | Fair-Good | Fair-Good |
| Glass | Fluoropolymers | Fair-Good | Good-Excellent |
| Silica | Gel (PMMA with Propylene carbonate | Good | Good |

Examples of other polymer/gel fillers that can be used in this invention
- Crosslinked polymers or microdispersions of polymers that are insoluble or incompatible with the host polymer or gel
- Organometallic compounds or metal chelates and metal salts of organic/inorganic acids
- Semiconductors, metal oxides, and conductors (metal; conducting polymers)
- Silicates, aluminates, and minerals or pigments and glasses.

VI. Electrooptical Chromophores

Another aspect of this invention broadly provides for the creation of chromophores for application in $\chi^{(2)}$ and $\chi^{(3)}$ based applications. More specifically, this invention provides for chromophores that are more compatible with the low refractive index polymers of this invention, although the chromophores are also suitable for use in high index and prior art polymers. It should be understood that the low refractive index chromophores of this invention contain some manner of fluorine modification. High index chromophores are classified as being all hydrocarbon in nature (prior art). Chromophores of this invention can be $\chi^{(2)}$ (second order) or $\chi^{(3)}$ (third order) nonlinear optical molecules.

For methods preferred in the preparation of the electrooptical materials of this invention, see generally, Roy T. Holm, *Journal of Paint Technology, Vol.* 39, No 509, June 1967 pages 385-388; and J. March, *Advanced Organic Chemistry Reaction Mechanisms and Structures* McGraw Hill Book Co. New York 1968.

The following reactions are representative of the general chemistry of the preferred electrooptical materials of this invention.

First Representative Reaction

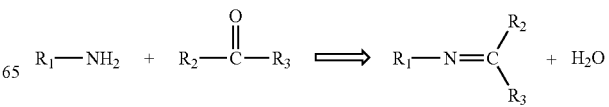

-continued

Aromatic amines + fluorinated ketones or aldehydes or aromatic aldehydes ⟹ imines (ketimine or aldemine)

Second Representative Reaction

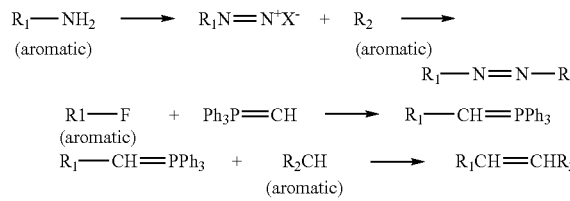

Where X = Cl, Br

Third Representative Reaction

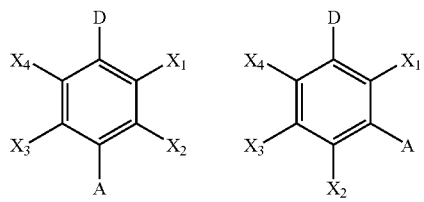

Typical electrooptic (EO) chromophores useful with the present invention are substituted anilines, substituted azobenzenes, substituted stilbenes, or substituted imines as illustrated by the general structures shown below:

A. Substituted Anilines

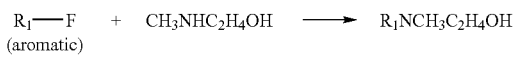

Conventional Substituted Aniline EO Chromophores
Wherein D=donor=_$NH_2$, _$N(CH_3)_2$, _$N(CH_2CH_3)_2$, or —$N(Y)_2$ where Y=alkyl alcohols, alkyl (hydrocarbon fluorocarbon) esters, or alkyl silane derivatives;
A=acceptor=_$NO_2$, or _C(CN)C(CN)$_2$, and
wherein $X_1$, $X_2$, $X_3$, $X_4$ are each —H.

Substituted Aniline EO Chromophores According to this Invention
Wherein D=donor=_$NH_2$, _$N(CH_3)_2$, _$N(CH_2CH_3)_2$, or —$N(Y_1)(Y_2)$ where $Y_i$=alkyl, alkyl alcohols, alkyl (hydrocarbon fluorocarbon) esters, or alkyl silane derivatives;
A=acceptor=_$NO_2$, _C(CN)=C(CN)$_2$, _C($R_1$)=C(CN)$_2$, _C($R_1$)=C($R_2$)($R_3$), or _N=C($R_2$)($R_3$), wherein $R_1$=CF$_3$, C$_2$F$_5$, $C_nF_{2n+1}$, $R_2$=H, CH$_3$, CF$_3$, C$_2$F$_5$, $C_nF_{2n+1}$, $R_3$=H, CH$_3$, CF$_3$, C$_2$F$_5$
wherein when A=_$NO_2$, or _C(CN)C(CN)$_2$, then $X_1$, $X_2$, $X_3$, $X_4$ are each independently selected from the group —F and —H, and at least one —F is selected, and
when A=_C($R_1$)=C(CN)$_2$, wherein $R_1$=CF$_3$, C$_2$F$_5$, $C_nF_{2n+1}$, then $X_1$, $X_2$, $X_3$, $X_4$ are each independently selected from the group —F and —H, and
when A=_C($R_1$)=C($R_2$)($R_3$), wherein $R_1$=CF$_3$, C$_2$F$_5$, $C_nF_{2n+1}$, $R_2$=CF$_3$, C$_2$F$_5$, $C_nF_{2n+1}$, $R_3$=H, CH$_3$, CF$_3$, C$_2$F$_5$, then $X_1$, $X_2$, $X_3$, $X_4$ are each independently selected from the group —F and —H, and
when A=_N=C($R_2$)($R_3$), wherein $R_2$=CF$_3$, C$_2$F$_5$, $C_nF_{2n+1}$, $R_3$=H, CH$_3$, CF$_3$, C$_2$F$_5$, then $X_1$, $X_2$, $X_3$, $X_4$ are each independently selected from the group —F and —H Additional Substituted Aniline EO Chromophores According to this Invention

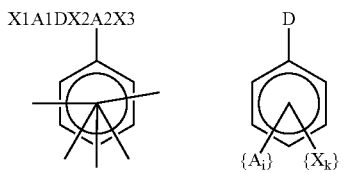

i + k = 5

Wherein D=donor=_$NH_2$, _$N(CH_3)_2$, _$N(CH_2CH_3)_2$, or —$N(Y_1)(Y_2)$ where $Y_i$=alkyl, alkyl alcohols, alkyl (hydrocarbon or fluorocarbon) esters, or alkyl silane derivatives;
primary acceptor=_$NO_2$, _C(CN)=C(CN)$_2$, _C($R_1$)=C(CN)$_2$, _C($R_1$)=C($R_2$)($R_3$), or _N=C($R_2$)($R_3$), $R_1$=CF$_3$, C$_2$F$_5$, $C_nF_{2n+1}$, $R_2$=H, CH$_3$, CF$_3$, C$_2$F$_5$, $C_nF_{2n+1}$, $R_3$=H, CH$_3$, CF$_3$, C$_2$F$_5$
secondary acceptor=_CN, or _CF$_3$, or —COOH, or —OH, or —$C_nH_{2n}$OH
wherein if there are exactly two acceptors, and $A_1$ and $A_2$ are both primary acceptors selected from _$NO_2$, or _C(CN)C(CN)$_2$, then the set of $\{X_k\}$ are each independently selected from —F and —H, but at least one —F must be selected;
wherein if there are exactly two acceptors, and $A_1$ and $A_2$ are both secondary acceptors selected from _CN, or _CF$_3$, or —COOH, or —OH, or —$C_nH_{2n}$OH, then the set of $\{X_k\}$ are each independently selected from —F and —H, but at least one —F must be selected;
wherein if there are exactly two acceptors, and $A_1$ and/or $A_2$ are selected from the primary acceptor _C($R_1$)=C(CN)$_2$, _C($R_1$)=C($R_2$)($R_3$), or _N=C($R_2$)($R_3$), where $R_1$=CF$_3$, C$_2$F$_5$, $C_nF_{2n+1}$, $R_2$=H, CH$_3$, CF$_3$, C$_2$F$_5$, $C_nF_{2n+1}$, $R_3$=H, CH$_3$, CF$_3$, C$_2$F$_5$, then the set of $\{X_k\}$ are each independently selected from —F and —H; and
wherein if there are exactly two acceptors and $A_1$ is selected from any primary acceptor and $A_2$ is selected from any secondary acceptor, then $X_1$, $X_2$, $X_3$ are each independently selected from —F and —H.
wherein if there are three or more acceptors acceptors, then $X_1$, $X_2$, $X_3$ are each independently selected from —F and —H.

B. Substituted Azobenzenes

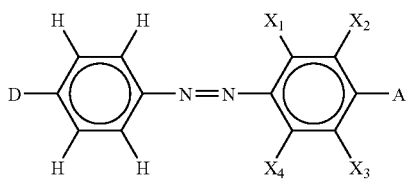

-continued

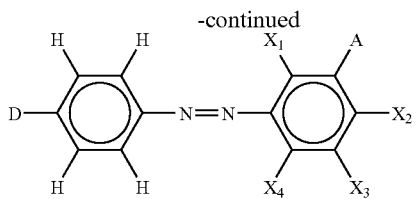

Conventional Substituted Azobenzene EO Chromophores
Wherein D=donor=_NH$_2$, _N(CH$_3$)$_2$, _N(CH$_2$CH$_3$)$_2$, or —N(Y)$_2$ where Y=alkyl alcohols, alkyl (hydrocarbon fluorocarbon) esters, or alkyl silane derivatives;
A=acceptor=_NO$_2$, or _C(CN)C(CN)$_2$, and
wherein X$_1$, X$_2$, X$_3$, X$_4$ are each —H.

Substituted Azobenzene EO Chromophores According to this Invention
Wherein D=donor=_NH$_2$, _N(CH$_3$)$_2$, _N(CH$_2$CH$_3$)$_2$, or —N(Y$_1$)(Y$_2$) where Y$_i$=alkyl, alkyl alcohols, alkyl (hydrocarbon fluorocarbon) esters, or alkyl silane derivatives;
A=acceptor=_NO$_2$, _C(CN)=C(CN)$_2$, _C(R$_1$)=C(CN)$_2$, _C(R$_1$)=C(R$_2$)(R$_3$), or _N=C(R$_2$)(R$_3$), wherein R$_1$=CF$_3$, C$_2$F$_5$, C$_n$F$_{2n+1}$, R$_2$=H, CH$_3$, CF$_3$, C$_2$F$_5$, C$_n$F$_{2n+1}$, R$_3$=H, CH$_3$, CF$_3$, C$_2$F$_5$
wherein when A=_NO$_2$, or _C(CN)C(CN)$_2$, then X$_1$, X$_2$, X$_3$, X$_4$ are each independently selected from the group —F and —H, and at least one —F is selected, and
when A=_C(R$_1$)=C(CN)$_2$, wherein R$_1$=CF$_3$, C$_2$F$_5$, C$_n$F$_{2n+1}$, then X$_1$, X$_2$, X$_3$, X$_4$ are each independently selected from the group —F and —H, and
when A=_C(R$_1$)=C(R$_2$)(R$_3$), wherein R$_1$=CF$_3$, C$_2$F$_5$, C$_n$F$_{2n+1}$, R$_2$=CF$_3$, C$_2$F$_5$, C$_n$F$_{2n+1}$, R$_3$=H, CH$_3$, CF$_3$, C$_2$F$_5$, then X$_1$, X$_2$, X$_3$, X$_4$ are each independently selected from the group —F and —H, and
when A=_N=C(R$_2$)(R$_3$), wherein R$_2$=CF$_3$, C$_2$F$_5$, C$_n$F$_{2n+1}$, R$_3$=H, CH$_3$, CF$_3$, C$_2$F$_5$, then X$_1$, X$_2$, X$_3$, X$_4$ are each independently selected from the group —F and —H Additional Substituted Azobenzene EO Chromophores According to this Invention

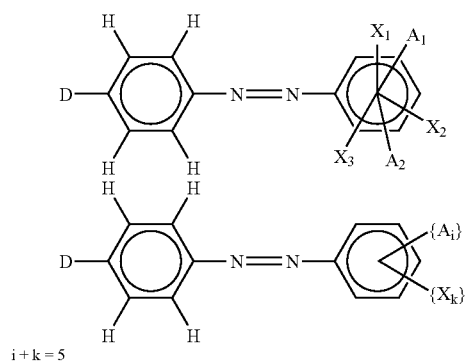

i+k=5

Wherein D=donor=_NH$_2$, _N(CH$_3$)$_2$, _N(CH$_2$CH$_3$)$_2$, or —N(Y$_1$)(Y$_2$) where Y$_i$=alkyl, alkyl alcohols, alkyl (hydrocarbon or fluorocarbon) esters, or alkyl silane derivatives;
primary acceptor=_NO$_2$, _C(CN)=C(CN)$_2$, _C(R$_1$)=C(CN)$_2$, _C(R$_1$)=C(R$_2$)(R$_3$), or _N=C(R$_2$)(R$_3$), R$_1$=CF$_3$, C$_2$F$_5$, C$_n$F$_{2n+1}$, R$_2$=H, CH$_3$, CF$_3$, C$_2$F$_5$, C$_n$F$_{2n+1}$, R$_3$=H, CH$_3$, CF$_3$, C$_2$F$_5$ secondary acceptor=_CN, or _CF$_3$, or —COOH, or —OH, or —C$_n$H$_{2n}$OH
wherein if there are exactly two acceptors, and A$_1$ and A$_2$ are both primary acceptors selected from _NO$_2$, or _C(CN)C(CN)$_2$, then the set of {X$_k$} are each independently selected from —F and —H, but at least one —F must be selected;
wherein if there are exactly two acceptors, and A$_1$ and A$_2$ are both secondary acceptors selected from _CN, or _CF$_3$, or —COOH, or —OH, or —C$_n$H$_{2n}$OH, then the set of {X$_k$} are each independently selected from —F and —H, but at least one —F must be selected;
wherein if there are exactly two acceptors, and A$_1$ and/or A$_2$ are selected from the primary acceptor _C(R$_1$)=C(CN)$_2$, _C(R$_1$)=C(R$_2$)(R$_3$), or _N=C(R$_2$)(R$_3$), where R$_1$=CF$_3$, C$_2$F$_5$, C$_n$F$_{2n+1}$, R$_2$=H, CH$_3$, CF$_3$, C$_2$F$_5$, C$_n$F$_{2n+1}$, R$_3$=H, CH$_3$, CF$_3$, C$_2$F$_5$, then the set of {X$_k$} are each independently selected from —F and —H; and
wherein if there are exactly two acceptors and A$_1$ is selected from any primary acceptor and A$_2$ is selected from any secondary acceptor, then X$_1$, X$_2$, X$_3$ are each independently selected from —F and —H.
wherein if there are three or more acceptors, then X$_1$, X$_2$, X$_3$ are each independently selected from —F and —H.

C. Substituted Stilbenes

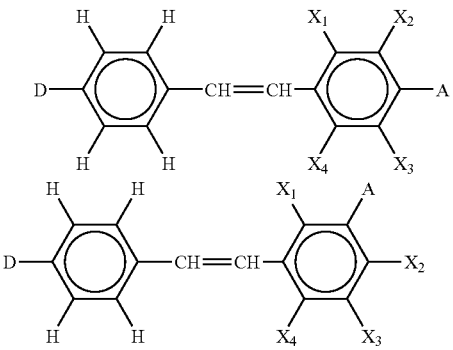

Conventional Substituted Stilbene EO Chromophores
Wherein D=donor=_NH$_2$, _N(CH$_3$)$_2$, _N(CH$_2$CH$_3$)$_2$, or —N(Y)$_2$ where Y=alkyl alcohols, alkyl (hydrocarbon fluorocarbon) esters, or alkyl silane derivatives;
A=acceptor=_NO$_2$, or _C(CN)C(CN)$_2$, and
wherein X$_1$, X$_2$, X$_3$, X$_4$ are each —H.

Substituted Stilbene EO Chromophores According to this Invention
Wherein D=donor=_NH$_2$, _N(CH$_3$)$_2$, _N(CH$_2$CH$_3$)$_2$, or —N(Y$_1$)(Y$_2$) where Y$_i$=alkyl, alkyl alcohols, alkyl (hydrocarbon fluorocarbon) esters, or alkyl silane derivatives;
A=acceptor=NO$_2$, _C(CN)=C(CN)$_2$, _C(R$_1$)=C(CN)$_2$, _C(R$_1$)=C(R$_2$)(R$_3$), or _N=C(R$_2$)(R$_3$), wherein R$_1$=CF$_3$, C$_2$F$_5$, C$_n$F$_{2n+1}$, R$_2$=H, CH$_3$, CF$_3$, C$_2$F$_5$, C$_n$F$_{2n+1}$, R$_3$=H, CH$_3$, CF$_3$, C$_2$F$_5$
wherein when A=_NO$_2$, or _C(CN)C(CN)$_2$, then X$_1$, X$_2$, X$_3$, X$_4$ are each independently selected from the group —F and —H, and at least one —F is selected, and
when A=_C(R$_1$)=C(CN)$_2$, wherein R$_1$=CF$_3$, C$_2$F$_5$, C$_n$F$_{2n+1}$, then X$_1$, X$_2$, X$_3$, X$_4$ are each independently selected from the group —F and —H, and
when A=_C(R$_1$)=C(R$_2$)(R$_3$), wherein R$_1$=CF$_3$, C$_2$F$_5$, C$_n$F$_{2n+1}$, R$_2$=CF$_3$, C$_2$F$_5$, C$_n$F$_{2n+1}$, R$_3$=H, CH$_3$, CF$_3$, C$_2$F$_5$, then X$_1$, X$_2$, X$_3$, X$_4$ are each independently selected from the group —F and —H, and when A=_N═C($R_2$)($R_3$), wherein $R_2$=$CF_3$, $C_2F_5$, $C_nF_{2n+1}$, $R_3$=H, $CH_3$, $CF_3$, $C_2F_5$, then $X_1$, $X_2$, $X_3$, $X_4$ are each independently selected from the group —F and —H Additional Substituted Stilbene EO Chromophores According to this Invention

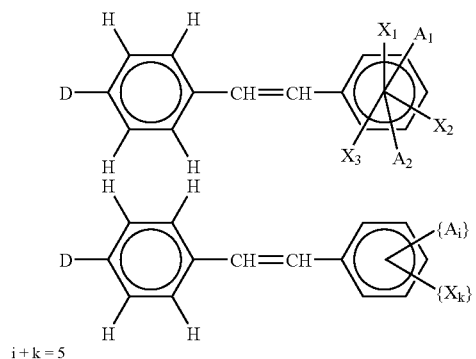

i + k = 5

Wherein D=donor=_$NH_2$, _$N(CH_3)_2$, _$N(CH_2CH_3)_2$, or —N($Y_1$)($Y_2$) where $Y_i$=alkyl, alkyl alcohols, alkyl (hydrocarbon or fluorocarbon) esters, or alkyl silane derivatives;

primary acceptor=_$NO_2$, _C(CN)═C(CN)$_2$, _C($R_1$)═C(CN)$_2$, _C($R_1$)═C($R_2$)($R_3$), or _N═C($R_2$)($R_3$), $R_1$=$CF_3$, $C_2F_5$, $C_nF_{2n+1}$, $R_2$=H, $CH_3$, $CF_3$, $C_2F_5$, $C_nF_{2n+1}$, $R_3$=H, $CH_3$, $CF_3$, $C_2F_5$ secondary acceptor=_CN, or _$CF_3$, or —COOH, or —OH, or —$C_nH_{2n}$OH wherein if there are exactly two acceptors, and $A_1$ and $A_2$ are both primary acceptors selected from _$NO_2$, or _C(CN)C(CN)$_2$, then the set of {$X_k$} are each independently selected from —F and —H, but at least one —F must be selected;

wherein if there are exactly two acceptors, and $A_1$ and $A_2$ are both secondary acceptors selected from _CN, or _$CF_3$, or —COOH, or —OH, or —$C_nH_{2n}$OH, then the set of {$X_k$} are each independently selected from —F and —H, but at least one —F must be selected;

wherein if there are exactly two acceptors, and $A_1$ and/or $A_2$ are selected from the primary acceptor _C($R_1$)═C(CN)$_2$, _C($R_1$)═C($R_2$)($R_3$), or _N═C($R_2$)($R_3$), where $R_1$=$CF_3$, $C_2F_5$, $C_nF_{2n+1}$, $R_2$=H, $CH_3$, $CF_3$, $C_2F_5$, $C_nF_{2n+1}$, $R_3$=H, $CH_3$, $CF_3$, $C_2F_5$, then the set of {$X_k$} are each independently selected from —F and —H; and wherein if there are exactly two acceptors and $A_1$ is selected from any primary acceptor and $A_2$ is selected from any secondary acceptor, then $X_1$, $X_2$, $X_3$ are each independently selected from —F and —H.

wherein if there are three or more acceptors, then $X_1$, $X_2$, $X_3$ are each independently selected from —F and —H.

D. Substituted Imines

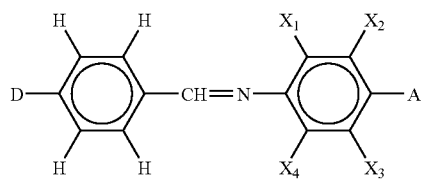

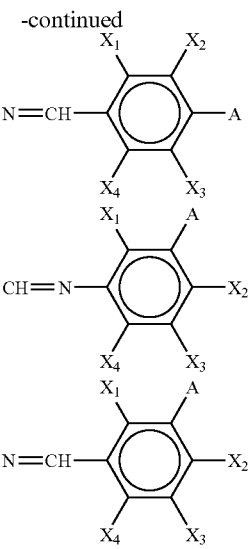

Conventional Substituted Imine EO Chromophores

Wherein D=donor=_$NH_2$, _$N(CH_3)_2$, _$N(CH_2CH_3)_2$, or —N(Y)$_2$ where Y=alkyl alcohols, alkyl (hydrocarbon fluorocarbon) esters, or alkyl silane derivatives;

A=acceptor=_$NO_2$, or _C(CN)C(CN)$_2$, and wherein $X_1$, $X_2$, $X_3$, $X_4$ are each —H.

Substituted Imine EO Chromophores According to this Invention

Wherein D=donor=_$NH_2$, _$N(CH_3)_2$, _$N(CH_2CH_3)_2$, or —N($Y_1$)($Y_2$) where $Y_i$=alkyl, alkyl alcohols, alkyl (hydrocarbon fluorocarbon) esters, or alkyl silane derivatives;

A=acceptor=_$NO_2$, _C(CN)═C(CN)$_2$, _C($R_1$)═C(CN)$_2$, _C($R_1$)═C($R_2$)($R_3$), or _N═C($R_2$)($R_3$), wherein $R_1$=$CF_3$, $C_2F_5$, $C_nF_{2n+1}$, $R_2$=H, $CH_3$, $CF_3$, $C_2F_5$, $C_nF_{2n+1}$, $R_3$=H, $CH_3$, $CF_3$, $C_2F_5$ wherein when A=_$NO_2$, or _C(CN)C(CN)$_2$, then $X_1$, $X_2$, $X_3$, $X_4$ are each independently selected from the group —F and —H, and at least one —F is selected, and when A=_C($R_1$)═C(CN)$_2$, wherein $R_1$=$CF_3$, $C_2F_5$, $C_nF_{2n+1}$, then $X_1$, $X_2$, $X_3$, $X_4$ are each independently selected from the group —F and —H, and when A=_C($R_1$)═C($R_2$)($R_3$), wherein $R_1$=$CF_3$, $C_2F_5$, $C_nF_{2n+1}$, $R_2$=$CF_3$, $C_2F_5$, $C_nF_{2n+1}$, $R_3$=H, $CH_3$, $CF_3$, $C_2F_5$, then $X_1$, $X_2$, $X_3$, $X_4$ are each independently selected from the group —F and —H, and when A=_N═C($R_2$)($R_3$), wherein $R_2$=$CF_3$, $C_2F_5$, $C_nF_{2n+1}$, $R_3$=H, $CH_3$, $CF_3$, $C_2F_5$, then $X_1$, $X_2$, $X_3$, $X_4$ are each independently selected from the group —F and —H Additional Substituted Imine EO Chromophores According to this Invention

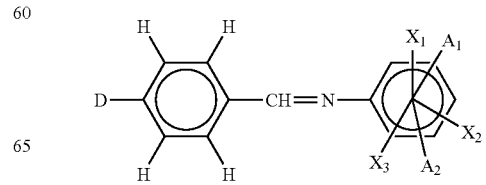

-continued

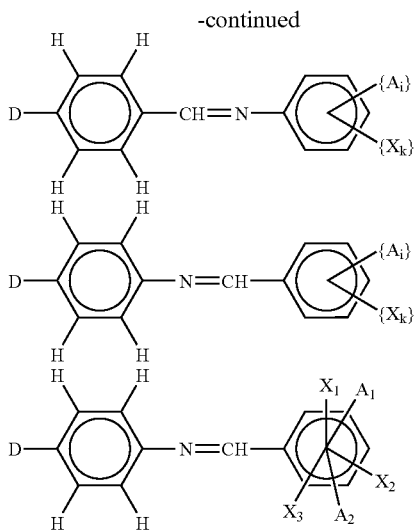

Wherein D donor=_NH$_2$, _N(CH$_3$)$_2$, _N(CH$_2$CH$_3$)$_2$, or —N(Y$_1$)(Y$_2$) where Y$_i$=alkyl, alkyl alcohols, alkyl (hydrocarbon or fluorocarbon) esters, or alkyl silane derivatives;

primary acceptor=_NO$_2$, _C(CN)=C(CN)$_2$, _C(R$_1$)=C(CN)$_2$, _C(R$_1$)=C(R$_2$)(R$_3$), or _N=C(R$_2$)(R$_3$), R$_1$=CF$_3$, C$_2$F$_5$, C$_n$F$_{2n+1}$, R$_2$=H, CH$_3$, CF$_3$, C$_2$F$_5$, C$_n$F$_{2n+1}$, R$_3$=H, CH$_3$, CF$_3$, C$_2$F$_5$ secondary acceptor=_CN, or _CF$_3$, or —COOH, or —OH, or —C$_n$H$_{2n}$OH wherein if there are exactly two acceptors, and A$_1$ and A$_2$ are both primary acceptors selected from _NO$_2$, or _C(CN)C(CN)$_2$, then the set of {X$_k$} are each independently selected from —F and —H, but at least one —F must be selected;

wherein if there are exactly two acceptors, and A$_1$ and A$_2$ are both secondary acceptors selected from _CN, or _CF$_3$, or —COOH, or —OH, or —C$_n$H$_{2n}$OH, then the set of {X$_k$} are each independently selected from —F and —H, but at least one —F must be selected;

wherein if there are exactly two acceptors, and A$_1$ and/or A$_2$ are selected from the primary acceptor _C(R$_1$)=C(CN)$_2$, _C(R$_1$)=C(R$_2$)(R$_3$), or _N=C(R$_2$)(R$_3$), where R$_1$=CF$_3$, C$_2$F$_5$, C$_n$F$_{2n+1}$, R$_2$=H, CH$_3$, CF$_3$, C$_2$F$_5$, C$_n$F$_{2n+1}$, R$_3$=H, CH$_3$, CF$_3$, C$_2$F$_5$, then the set of {X$_k$} are each independently selected from —F and —H; and wherein if there are exactly two acceptors and A$_1$ is selected from any primary acceptor and A$_2$ is selected from any secondary acceptor, then X$_1$, X$_2$, X$_3$ are each independently selected from —F and —H.

wherein if there are three or more acceptors, then X$_1$, X$_2$, X$_3$ are each independently selected from —F and —H.

EO Chromophore Example 21

Substituted Anilines

The following chemical structures in Table 14 are a comparison of the conventional to the electrooptical materials of the present invention and further aid in illustrating the invention. These EO materials are substituted anilines and are simplified versions of the general formulas illustrated above.

TABLE 23

Comparison of the Conventional and the Present Invention Electrooptic Materials

| | |
|---|---|
| D—⬡—primary D—⬡—secondary | Conventional |
| F-D—⬡—primary F-D—⬡—secondary | This invention |
| D—⬡(primary)—primary D—⬡(secondary)—secondary | Conventional |
| F-D—⬡(primary)—primary F-D—⬡(secondary)—secondary | This invention |
| D—⬡(secondary)—primary F-D—⬡(secondary)—primary | This invention |

Note:
Primary = _NO$_2$, _C(CN)=C(CN)$_2$, _C(R1)=C(N)$_2$, _N=C(R2)(R3), _C(R1)=C(R2)(R3), where R$_1$ = CF$_3$, C$_2$F$_5$, C$_n$F$_{2n+1}$, R$_2$ = H, CH$_3$, CF$_3$, C$_2$F$_5$, C$_n$F$_{2n+1}$, R$_3$ = H, CH$_3$, CF$_3$, C$_2$F$_5$, C$_n$F$_{2n+1}$
Secondary = _CN, or _CF$_3$, or —COOH, or —OH, or —C$_n$H$_{2n}$OH
D = _NH$_2$, _N(CH$_3$)$_2$, _N(CH$_2$CH$_3$)$_2$, or —N(Y$_1$)(Y$_2$) where Y$_1$ = alkyl, alkyl alcohols, alkyl (hydrocarbon or fluorocarbon) esters, or alkyl silane derivatives;

Table 23 shows the presence and location of primary and secondary electron withdrawing groups as well as fluorine atoms for substituted anilines. This embodiment of the invention has two typical types of EO chromophores as illustrated by the chemical structures. A first type of EO chromophore of the invention includes a substituted aniline having at least one primary or at least one secondary electron withdrawing group, and at least one fluorine group on the aromatic ring. A second type of EO chromophore of the invention includes a substituted aniline having at least one primary and at least one secondary electron withdrawing group on the aromatic ring. A third type of EO chromophore of the invention includes a substituted aniline having at least one primary and at least one secondary electron withdrawing group on the aromatic ring, and at least one fluorine atom on the on the aromatic ring. The primary electron withdrawing groups are typically selected from the group consisting of NO$_2$, _C(CN)=C(CN)$_2$, and _C(R$_1$)=C(CN)$_2$. The secondary electron withdrawing groups are typically selected from the group consisting of _CN, _CF$_3$, and —COOH. These and other groups are illustrated in more detail elsewhere herein. The location of the electron withdrawing groups and the fluorine atoms may be in any position of the aromatic ring; however, sites for obtaining or maintaining selected properties are determined by procedures described in more detail below.

EO Chromophore Example 22

Substituted Stilbenes, Imines, and Azobenzenes

The following chemical structures in Table 24 are a comparison of the conventional to the electrooptical materials of the present invention. These EO materials are substituted stilbenes, substituted imines, and substituted azobenzenes.

TABLE 24

Comparison of the Conventional and the Present Invention Electrooptic Materials

| Structure | Type |
|---|---|
| D—⬡—S—⬡—primary | Conventional |
| D—⬡—S—⬡—secondary | Conventional |
| D—⬡—S—⬡(F)—primary | This invention |
| D—⬡—S—⬡(F)—secondary | This invention |
| D—⬡—S—⬡(primary, primary) | Conventional |
| D—⬡—S—⬡(secondary, secondary) | Conventional |
| D—⬡—S—⬡(F, primary, primary) | This invention |
| D—⬡—S—⬡(F, secondary, secondary) | This invention |
| D—⬡—S—⬡(secondary, primary) | This invention |

TABLE 24-continued

Comparison of the Conventional and the Present Invention Electrooptic Materials

| Structure | Type |
|---|---|
| D—⬡—S—⬡(F, secondary, primary) | This invention |

Note:
S = spacer = _CH=CH_, _N=CH_, _CH=N_, _N=N—
  (stilbene)    (imine)    (imine)    (azo)
Primary = _NO$_2$, _C(CN)=C(CN)$_2$, _C(R1)=C(CN)$_2$, _N=C(R2)(R3), _C(R1)=C(R2)(R3), where R$_1$ = CF$_3$, C$_2$F$_5$, C$_n$F$_{2n+1}$, R$_2$ = H, CH$_3$, CF$_3$, C$_2$F$_5$, C$_n$F$_{2n+1}$, R$_3$ = H, CH$_3$, CF$_3$, C$_2$F$_5$, C$_n$F$_{2n+1}$
Secondary = _CN, or _CF$_3$, or —COOH, or —OH, or —C$_n$H$_{2n}$OH
D = _NH$_2$, _N(CH$_3$)$_2$, _N(CH$_2$CH$_3$)$_2$, or —N(Y$_1$)(Y$_2$) where Y$_1$ = alkyl, alkyl alcohols, alkyl (hydrocarbon or fluorocarbon) esters, or alkyl silane derivatives;

EO Chromophore Example 23

Substituted Anilines, Stilbenes, Imines, and Azobenzenes

The fundamental structures for conventional optically active chromophores and optically active chromophores of the present invention have been given in detail herein. In EO chromophores of the present invention, fluorine atoms are typically strategically placed on the aromatic ring so that the EO coefficient, which is directly related to μβ (vector product of the dipole moment times the first hyperpolarizability of the molecule), is increased or is not substantially reduced. The dipole moments and first hyperpolarizabilities were calculated using ab initio electronic structure methods as implemented in JAGUAR™ (Jaguar 4.0, Schrodinger Inc., Portland, Oreg., 1991-2000). Ab initio methods have been shown to provide accurate descriptions of the hyperpolarizabilities in aromatic molecules. Direct comparison of experimental and calculated μβ values for a trial set of 54 organic molecules has shown this method to accurately determine the μβ product for organic molecules of the general type considered in this invention. The tensor components of the first hyperpolarizability were determined by the coupled-perturbed Hartree-Fock method implemented in JAGUAR™. Only the vector product of the hyperpolarizability with the intrinsic dipole (μβ) is reported and noted in the tables, as this is the quantity of direct relevance to the EO coefficient of a chromophore. A description of how this critical placement of fluorine atoms influences the μβ (μβ is proportional to the EO coefficient) is shown in Table 25. All the reported μβ values are in units of $10^{-48}$ esu. The relative rankings for these EO materials are calculated as follows:

Relative Ranking

R=μβ (all —H or —F substituted EO molecule)/μβ (all —H EO molecule)

Thus for paranitroaniline (Table 25)

$$R = \frac{54.7}{54.7} = 1.00$$

For 2,6-difluoro4-nitroaniline

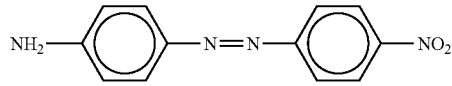

In some cases a fluorine-substituted EO molecule may have a lower μβ coefficient than the all hydrogen EO chromophore. The all hydrogen EO chromophore, however, increases the overall total refractive index of the system (which is undesirable when low refractive indexes are required) as well as introduces a higher level of optical loss (C—H bonds, N—H bonds, O—H bonds) to the total systems than its fluorinated counterpart. Thus, in selecting which EO chromophore structure to use one can trade-off the EO coefficient property of a molecule with its ability to enhance the total properties of the entire system.

Analysis of Fluorine Atom Substitution Effects on Structures Shown in Table 25 for Selected Properties Para (4)—Nitroaniline Two fluorine atoms on the 3, 5 positions (46.0) are slightly better than on the 2, 6 positions (45.9). Four fluorine atoms on the 2, 3, 5, 6 position are less desirable (45.6) than other combinations.

Meta (3)—Nitroaniline

One fluorine atom on the 6 position (18.7) is better than one fluorine atom on the 2 position (9.84). Four fluorine atoms on the 2, 4, 5, 6 positions are less desirable (15.9) than substitution at the 6 position.

4-(4-nitrophenylazo)phenylamine

One fluorine atom on the 2 position of the 4-nitrophenylazo group is less desirable (242.1) than a fluorine atom on the 3 position (458.1) of the 4-nitrophenylazo group.

Four fluorine atoms on the 2, 3, 5, 6 position of the 4-nitrophenylazo group is better (350.6) than four fluorine atoms on both the 4-nitrophenylazo group and the phenylamine group (a total of 8 fluorine atoms resulting in a value of 216.0).

4-Nitrophenyl, 4-aminophenyl stilbene

One fluorine atom on the 2 position of the 4-nitrophenyl group is less desirable (325.6) than one fluorine atom on the 3 position of the 4-nitrophenyl group (355.0).

Four fluorine atoms on the 2, 3, 5, 6 position of the 4-nitrophenyl group is more desirable (520.8) than four fluorine atoms both on the 4-nitrophenly group and the phenylamine group (a total of 8 fluorine atoms resulting in a value of 209.1).

Similar results were observed for stilbene having the following structure.

TABLE 25

| Effect of Fluorination on Various EO Chromophore | | | |
|---|---|---|---|
| Structure | μβ | Relative Ranking | Comments |
| (H₂N-phenyl(H,H,H,H)-NO₂) | 54.7 | 1.00 | Conventional |
| (H₂N-phenyl(H,F,H,F)-NO₂) | 46.0 | 0.84 | This invention |

TABLE 25-continued

Effect of Fluorination on Various EO Chromophore

| Structure | μβ | Relative Ranking | Comments |
|---|---|---|---|
| 2,6-difluoro-4-nitroaniline | 45.9 | 0.84 | This invention |
| 2,3,5,6-tetrafluoro-4-nitroaniline | 45.6 | 0.83 | This invention |
| 4-nitroaniline | 14.3 | 1.00 | Conventional |
| 3-fluoro-4-nitroaniline | 18.7 | 1.31 | This invention |
| 2-fluoro-4-nitroaniline | 9.84 | 0.69 | This invention |
| 2,3,5-trifluoro-4-nitroaniline | 15.9 | 1.11 | This invention |
| 4-((4-nitrophenyl)diazenyl)aniline | 287.2 | 1.00 | Conventional |
| 4-((2-fluoro-4-nitrophenyl)diazenyl)aniline | 242.1 | 0.84 | This invention |

TABLE 25-continued
Effect of Fluorination on Various EO Chromophore
| Structure | μβ | Relative Ranking | Comments |
|---|---|---|---|
| 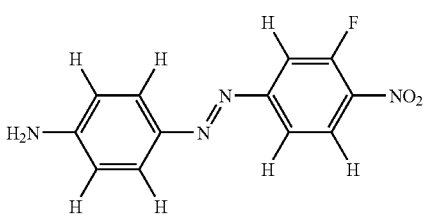 | 458.1 | 1.60 | This invention |
| 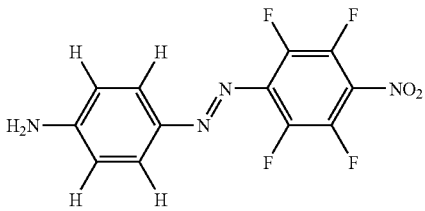 | 350.6 | 1.22 | This invention |
| 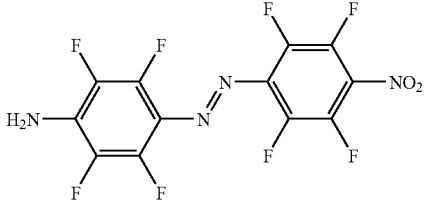 | 216.9 | 0.76 | This invention |
| 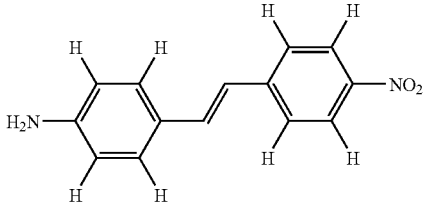 | 381.1 | 1.00 | Conventional |
| 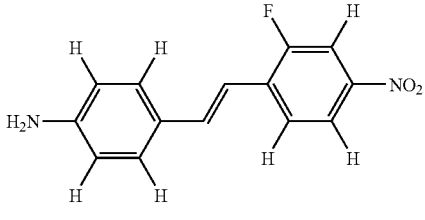 | 325.6 | 0.85 | This invention |
| 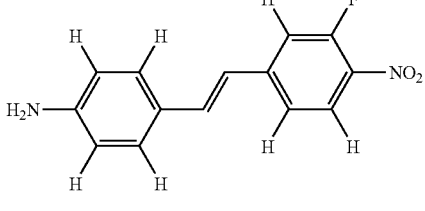 | 355.0 | 0.93 | This invention |

TABLE 25-continued
Effect of Fluorination on Various EO Chromophore
| Structure | μβ | Relative Ranking | Comments |
|---|---|---|---|
| 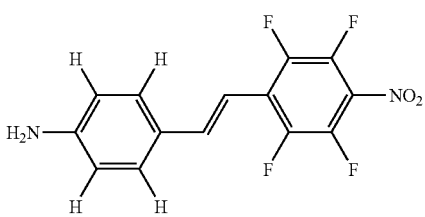 | 520.8 | 1.37 | This invention |
| 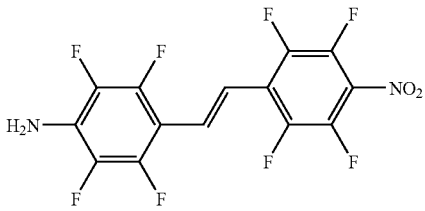 | 209.1 | 0.55 | This invention |
| 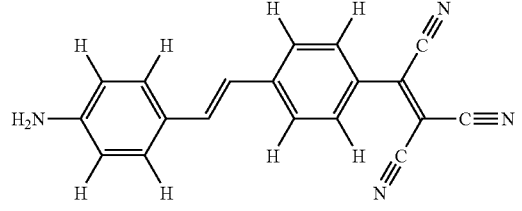 | 737.9 | 1.00 | Conventional |
| 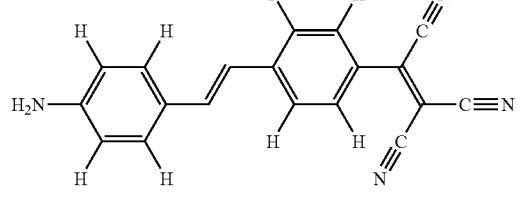 | 666.0 | 0.90 | This invention |
| 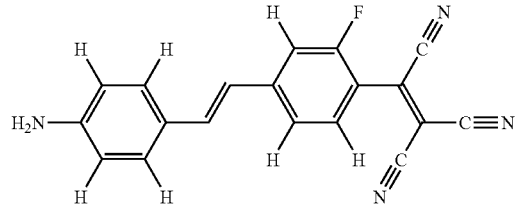 | 830.0 | 1.12 | This invention |
| 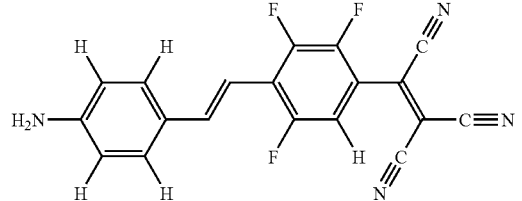 | 640.1 | 0.87 | This invention |

TABLE 25-continued

Effect of Fluorination on Various EO Chromophore

| Structure | μβ | Relative Ranking | Comments |
|---|---|---|---|
| 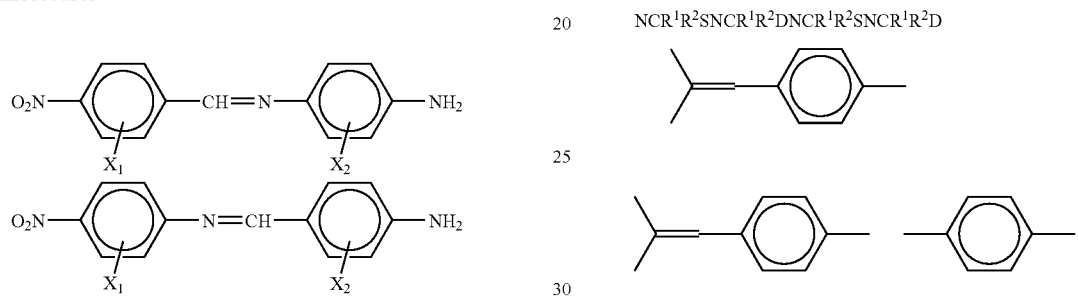 | 356.5 | 0.48 | This invention |

Similar μβ and rankings can be generated for the following EO molecules.

$O_2N$—⌬—CH=N—⌬—$NH_2$
        $X_1$              $X_2$ $O_2N$—⌬—N=CH—⌬—$NH_2$
        $X_1$              $X_2$

Where $X_1$ and $X_2$ can be independently selected to be an H or F atom.

Critical Parameters for EO Chromophores with Low Index Applications

The critical parameters for an EO molecule are its overall refractive index, number of C—H or O—H bonds (optical loss), EO coefficient and compatibility with the rest of the system. These parameters are controlled by the core molecular structure and the spatial or geometric placement of donor/acceptor and other functional groups in its molecular structure. In the present invention, it is demonstrated herein that the EO chromophore for the polymers used in silica optical applications have to be selected to be "compatible" with the low refractive index polymers, contribute to the reduction of the total refractive index of the total system and still maintain a high EO coefficient. Typically, the EO chromophores for use in silica optical applications have at least one —F group at an appropriate site or a fluorine-containing electron acceptor or functional group. This invention has shown that the EO response of the chromophore is very sensitive to the location of the fluorine atoms or fluorine-containing groups. The refractive index of the chromophore is much less sensitive to this placement, while the compatibility between the chromophore and polymer is somewhat sensitive to this placement. Thus, overall EO design is a function of {polymer compatibility; low overall contribution to the total refractive index of the system, high EO efficiency, optical loss}.

EO Chromophore Example 24

Perfluorinated Alkyl-Imines

A further embodiment of this invention is also based on the following novel structures:

$NCR^1R^2SNCR^1R^2DNCR^1R^2SNCR^1R^2D$

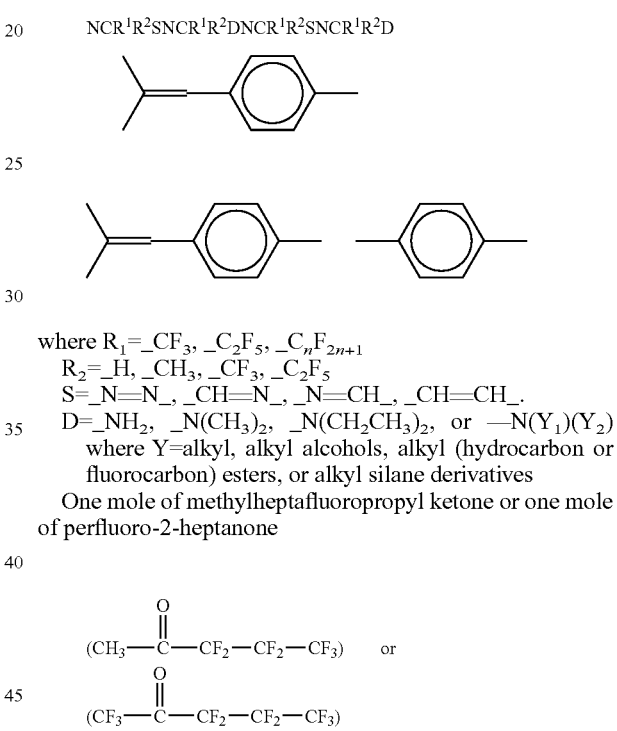

where $R_1$=—$CF_3$, —$C_2F_5$, —$C_nF_{2n+1}$
$R_2$=—H, —$CH_3$, —$CF_3$, —$C_2F_5$
S=—N=N—, —CH=N—, —N=CH—, —CH=CH—.
D=—$NH_2$, —$N(CH_3)_2$, —$N(CH_2CH_3)_2$, or —$N(Y_1)(Y_2)$
where Y=alkyl, alkyl alcohols, alkyl (hydrocarbon or fluorocarbon) esters, or alkyl silane derivatives One mole of methylheptafluoropropyl ketone or one mole of perfluoro-2-heptanone $(CH_3-\overset{O}{\underset{\|}{C}}-CF_2-CF_2-CF_3)$ or $(CF_3-\overset{O}{\underset{\|}{C}}-CF_2-CF_2-CF_3)$ was mixed with excess (1.5 moles) of paraphenylenediamine

in toluene and reacted (thermal stripping of water) to produce the following new classes of EO materials.

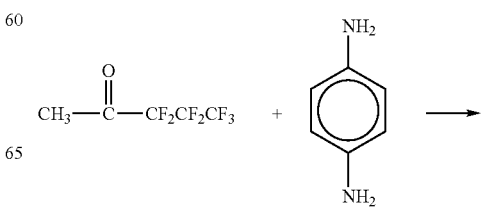

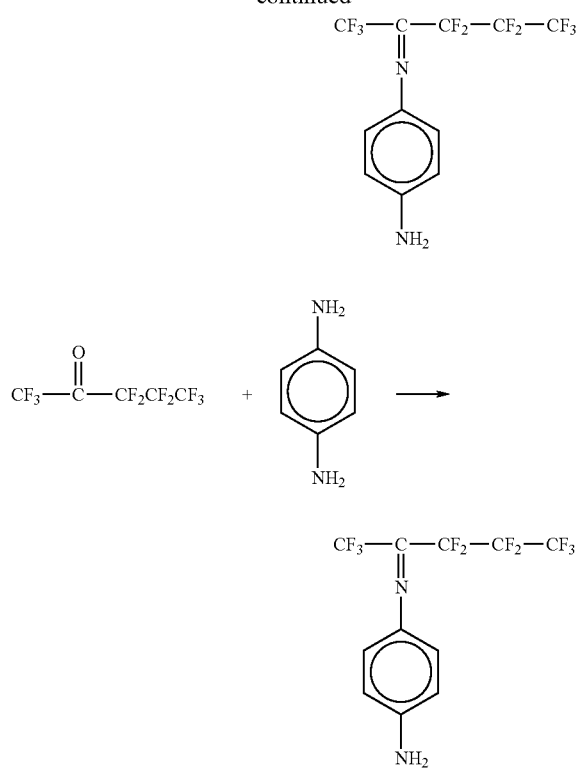

The predicted EO efficiencies (μβ) for these two compounds are 18.5 and 60.3. For further details as to production of these compounds, see the J. March reference noted earlier.

EO Chromophore Example 25

Primary and Secondary Electron Withdrawing Groups on EO Chromophores

The present invention is also based on the concept of combining a primary electron-withdrawing group (acceptor) with what is defined as a secondary electron withdrawing molecule. The primary electron withdrawing groups (acceptors) are as follows:

Primary=_$NO_2$, _$C(CN)$=$C(CN)_2$, _$C(R1)$=$C(CN)_2$, _$N$=$C(R2)(R3)$, _$C(R1)$=$C(R2)(R3)$, where $R_1$=$CF_3$, $C_2F_5$, $C_nF_{2n+1}$, $R_2$=H, $CH_3$, $CF_3$, $C_2F_5$, $C_nF_{2n+1}$, $R_3$=H, $CH_3$, $CF_3$, $C_2F_5$, $C_nF_{2n+1}$ Secondary=_CN, or _$CF_3$, or —COOH, or —OH, or —$C_nH_{2n}OH$ This embodiment of the invention illustrates the importance of selecting an EO chromophore with the primary and secondary electron withdrawing group in the correct positions in order to maximize the EO effect (μβ). The conventional appears to deal with one primary, one secondary, two primary, or two secondary electron withdrawing groups, but not a combination of at least one primary and at least one secondary electron withdrawing groups. The advantage to selecting both primary and secondary electron withdrawing groups lies in the additional functionality this choice imparts to the chromophore. The secondary acceptor can also enhance the compatibility of the chromophore with the polymer, lower the refractive index of the chromophore, and/or provide a crosslinking site for the chromophore, in addition to enhancing the EO response if properly located.

Table 26 illustrates the effect of multiple substitutions of primary and secondary electron withdrawing groups on specific sites of an aniline molecule and an azobenzene molecule. This embodiment is also illustrated in Tables 23 and 24 for substituted anilines, substituted stilbenes, substituted imines, and substituted azobenzenes.

TABLE 26

| EO Chromophores of this invention | | | |
|---|---|---|---|
| Structure | μβ | Relative Ranking | Comments |
| $H_2N$-⬡-$NO_2$ | 54.7 | 1.00 | Conventional |
| $H_2N$-⬡-C≡N | 27.3 | 0.50 | Conventional |

TABLE 26-continued

| EO Chromophores of this invention | | | |
|---|---|---|---|
| Structure | μβ | Relative Ranking | Comments |
| 3-amino-2-nitrobenzonitrile (H₂N, C≡N, NO₂ on benzene) | 57.7 | 1.05 | This invention |
| 3-amino-4-nitrobenzonitrile isomer | 30.6 | 0.56 | This invention |
| 4-amino-trifluoromethylbenzene (H₂N—C₆H₄—CF₃) | 10.3 | 0.19 | Conventional |
| amino-nitro-trifluoromethylbenzene | 51.9 | 0.95 | This invention |
| amino-nitro-trifluoromethylbenzene isomer | 38.0 | 0.69 | This invention |
| 2,4-dinitroaniline (O₂N, H₂N, NO₂ on benzene) | 29.0 | 0.53 | Conventional |
| 3,4-dinitroaniline isomer | 37.4 | 0.68 | Conventional |

TABLE 26-continued

EO Chromophores of this invention

| Structure | μβ | Relative Ranking | Comments |
|---|---|---|---|
| 3-amino-5-nitro-2-(trifluoromethyl)benzonitrile | 37.2 | 0.68 | This invention |
| 4-amino-2-nitro-6-(trifluoromethyl)benzonitrile | 45.5 | 0.83 | This invention |
| 3-amino-5-nitro-4-(trifluoromethyl)benzonitrile | 31.8 | 0.58 | This invention |
| 3-amino-5-nitro-2-(trifluoromethyl)benzonitrile isomer | 17.8 | 0.33 | This invention |
| 4-((4-aminophenyl)diazenyl)nitrobenzene | 287.2 | 1.00 | Conventianal |
| 3-((4-aminophenyl)diazenyl)-5-nitrobenzoic acid | 236.2 | 0.82 | This invention |
| 3-((4-aminophenyl)diazenyl)-5-nitrobenzoic acid isomer | 322.7 | 1.12 | This invention |

TABLE 26-continued

EO Chromophores of this invention

| Structure | µβ | Relative Ranking | Comments |
|---|---|---|---|
| (4-aminophenyl)azo-3,2-dicarboxy-4-nitrobenzene | 242.9 | 0.85 | This invention |
| (4-aminophenyl)azo-3,5-dicarboxy-4-nitrobenzene | 230.9 | 0.80 | This invention |
| (4-aminophenyl)azo-5-carboxy-2-nitro... | 286.4 | 1.00 | This invention |
| (4-aminophenyl)azo-3-trifluoromethyl-4-nitrobenzene | 266.8 | 0.93 | This invention |
| (4-aminophenyl)azo-3-trifluoromethyl-4-nitro-6-carboxybenzene | 267.2 | 0.93 | This invention |
| (4-aminophenyl)azo-2-carboxy-4-nitro-5-trifluoromethylbenzene | 312.1 | 1.09 | This invention |

TABLE 26-continued

EO Chromophores of this invention

| Structure | μβ | Relative Ranking | Comments |
|---|---|---|---|
| H₂N–C₆H₄–N=N–C₆H₂(COOH)(CF₃)(NO₂) | 326.7 | 1.14 | This invention |
| H₂N–C₆H₄–N=N–C₆H₃(CF₃)(NO₂) | 323.8 | 1.13 | This invention |
| H₂N–C₆H₄–N=N–C₆H₂(CF₃)(NO₂)(COOH) | 238.3 | 0.83 | This invention |
| H₂N–C₆H₄–N=N–C₆H₂(HOOC)(CF₃)(NO₂) | 342.2 | 1.19 | This invention |
| H₂N–C₆H₄–N=N–C₆H₂(CF₃)(COOH)(NO₂) | 339.9 | 1.18 | This invention |

Example 25

Synthesis of a Chromophore Containing Primary and Secondary Acceptors

A further embodiment of this invention is also based on the following chromophore, synthesized as illustrated:

A further embodiment of this invention is also based on the following chromophore, synthesized as illustrated:

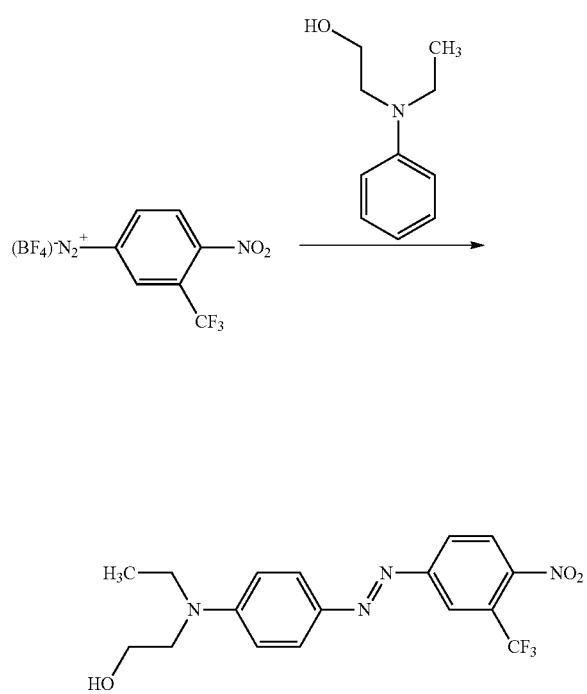

The starting material, nitro(trifluoromethyl)benzenediazonium, was synthesized as follows:

Nitro(trifluoromethyl)aniline (14.56 mmol) was dissolved in an aqueous solution of tetrafluoroboric acid (70%) and chilled to 0° C. To this was added a solution of sodium nitrite (14.40 mmol) dissolved in water (10 mL). Immediately, a precipitate formed. After warming to room temperature, the precipitate was filtered and washed thoroughly with diethyl-ether to afford a pale yellow, crystalline product. This material was then coupled to form the arylazo derivative as follows:

2-(N-ethylanilino)ethanol (9.36 mmol) was dissolved in acetonitrile (35 mL.) To this solution was added the diazonium tetrafluoroborate (9.18 mmol) dissolved in 15 mL acetonitrile. The reaction was stirred overnight at room temperature. The solvent was removed in vacuo and the residual solid was purified via column chromatography (65:35 hexane/ethyl acetate) to yield the desired arylazo derivative.

Example 26

Synthesis of a Chromophore Containing Primary and Secondary Acceptors

A further embodiment of this invention is also based on the following chromophore, synthesized as illustrated:

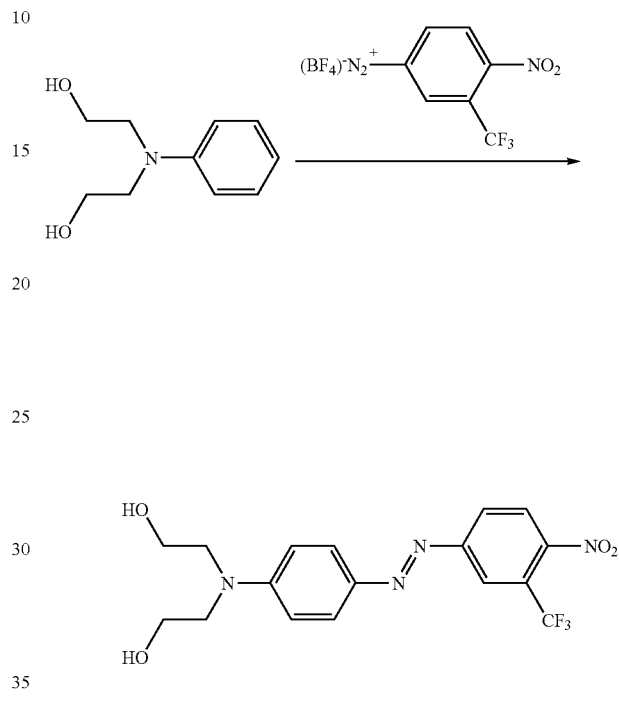

The starting material, nitro(trifluoromethyl)benzenediazonium, was synthesized as follows:

Nitro(trifluoromethyl)aniline (14.56 mmol) was dissolved in an aqueous solution of tetrafluoroboric acid (70%) and chilled to 0° C. To this was added a solution of sodium nitrite (14.40 mmol) dissolved in water (10 mL). Immediately, a precipitate formed. After warming to room temperature, the precipitate was filtered and washed thoroughly with diethyl-ether to afford a pale yellow, crystalline product. This material was then coupled to form the arylazo derivative as follows:

N-phenyldiethanolamine (9.36 mmol) was dissolved in acetonitrile (35 mL.) To this solution was added the diazonium tetrafluoroborate (9.18 mmol) dissolved in 15 mL acetonitrile. The reaction was stirred overnight at room temperature. The solvent was removed in vacuo and the residual solid was purified via column chromatography (10:90 hexane/ethyl acetate) to yield the desired arylazo derivative.

Example 27

Synthesis of a Chromophore and Polymer Containing Primary and Secondary Acceptors A further embodiment of this invention is also based on the following chromophore, synthesized as illustrated:

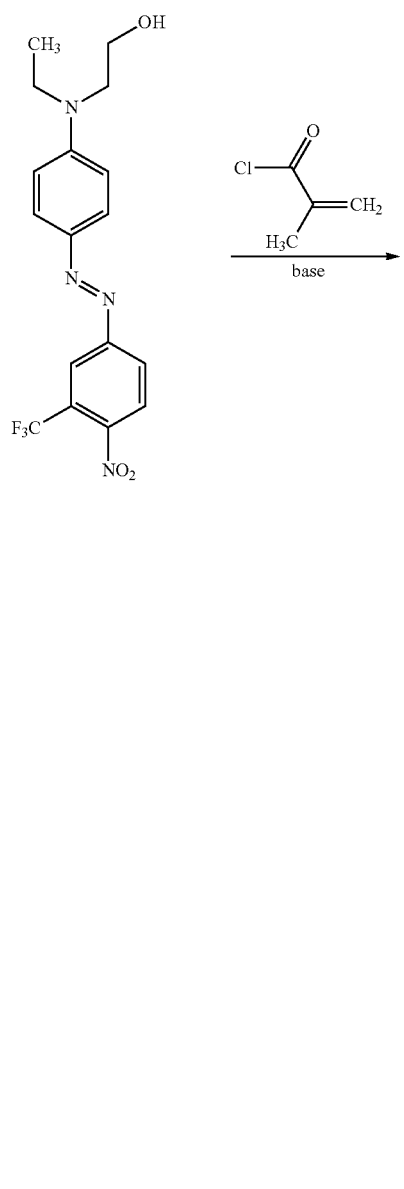

The alcohol functional azo chromophore (1 mole) was added to 1.2 moles of triethylamine (base) in chloroform. To this was added 1.2 moles of methacryloyl chloride while keeping the temperature at 0° C. The reaction was then allowed to stir for 17 hours at 40° C. followed by cooling at room temperature and washing with water. The organic layer was dried and evaporated to give the product. The product can be recrystallized from methanol or purified via column chromatography (7:3 V:V dichloromethane/pentane).

To make the polymer, the fluorinated diazochromophore monomer was then dissolved in dioxane in an 8 oz bottle along with trifluoroethyl methacrylate and hexafluorobutyl methacrylate (10, 45, 45 weight-%). To this mixture (20% solids) was added 0.1% of a free radical thermal initiator (azobisisobutyrolnitrile) and the bottle containing all the ingredients was placed in an oven at 45° C. for 24 hours. The resulting polymeric solution was precipitated into methanol, dried and used directly as an electrooptic side chain system.

Example 28

Synthesis of a Chromophore Containing Primary and Secondary Acceptors

A further embodiment of this invention is also based on the following chromophore, synthesized as illustrated, using the same procedure as described in the preceding example:

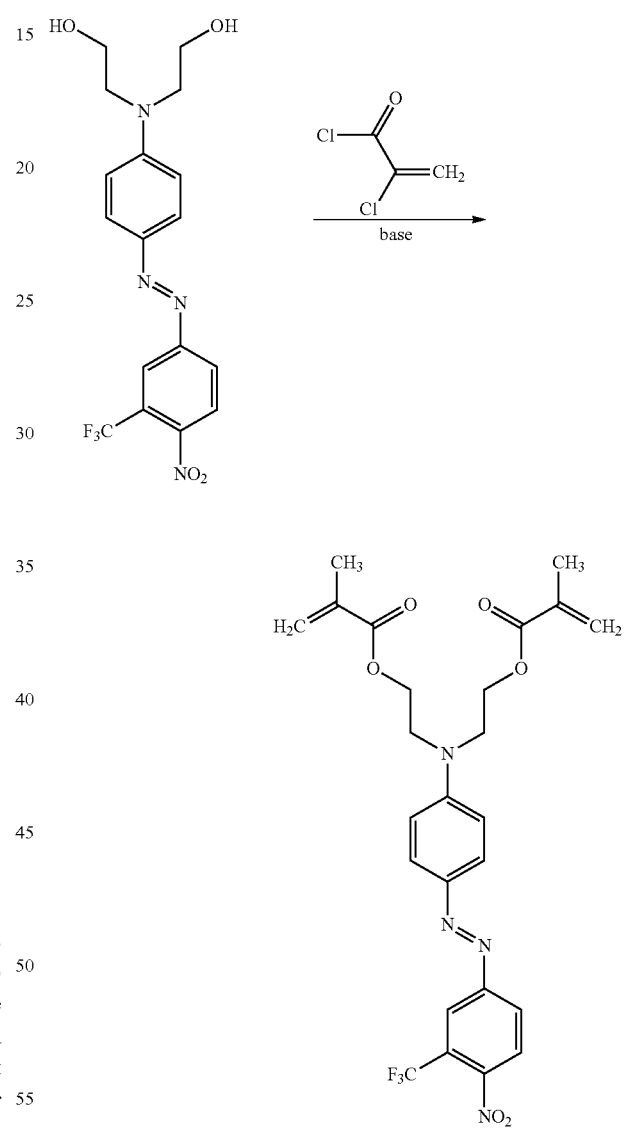

Example 29

Synthesis of a Chromophore Containing Primary and Secondary Acceptors

A further embodiment of this invention is also based on the following chromophore, synthesized using the same procedure as described in the preceding example:

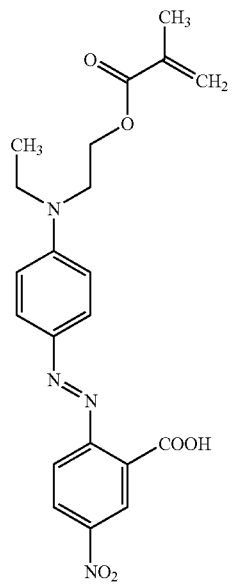

VII. Synthesis of a Chromophore Containing Primary and Secondary Acceptors: Novel Chromophores with Large Electrooptic Response Another aspect of this invention broadly provides for the creation of chromophores for application in $\chi^{(2)}$ and $\chi^{(3)}$ based applications. More specifically, this invention provides for chromophores that are more compatible with the low refractive index polymers of this invention, although the chromophores are also suitable for use in high index and prior art polymers. It should be understood that the low refractive index chromophores of this invention contain some manner of fluorine modification. High index chromophores are classified as being all hydrocarbon in nature (prior art). Chromophores of this invention can be $\chi^{(2)}$ (second order) or $\chi^{(3)}$ (third order) nonlinear optical molecules. Malononitrile was purchased from Pfaltz & Bauer. For methods preferred in the preparation of the electrooptical materials of this invention, see generally, Roy T. Holm, *Journal of Paint Technology*, Vol. 39, No 509, June 1967 pages 385-388; and J. March, *Advanced Organic Chemistry Reaction Mechanisms and Structures*, McGraw Hill Book Co. New York 1968.

The general form of these electrooptic chromophores is:

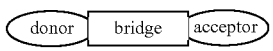

donor=—$NH_2$, —$N(CH_3)_2$, —$N(CH_2CH_3)_2$, or —$N(Y_1)$ $(Y_2)$, where Y=alkyl, alkyl alcohols, alkyl (hydrocarbon or fluorocarbon) esters, or alkyl silane derivatives;

the bridge is any conjugated, aromatic, or combination of aromatic and conjugated organic structure acceptor=—C(CN)=C(CN)$_2$, —C(R$_1$)=C(CN)$_2$, —C(R$_1$)=C(R$_2$)(R$_3$), —N=C(R$_2$)(R$_3$), R$_1$=CF$_3$, C$_2$F$_5$, C$_n$F$_{2n+1}$, R$_2$=H, CH$_3$, CF$_3$, C$_2$F$_5$, R$_3$=H, CH$_3$, CF$_3$, C$_2$F$_5$, or a hydrocarbon or heteroatomic ring containing these groups. Examples of bridge structures include, but are not limited to:

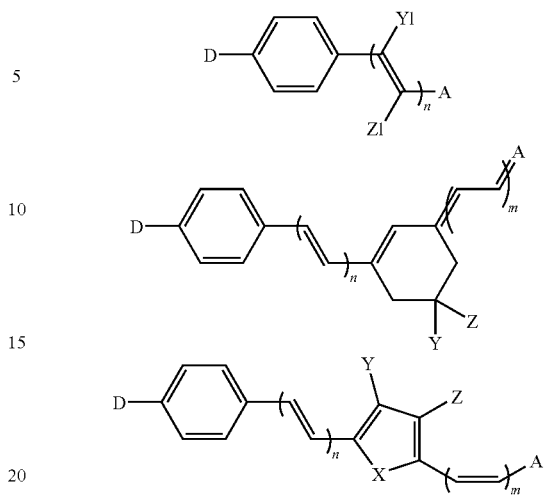

where
D denotes the attachment point of the donor group and A denotes the attachment point of the acceptor group;
X=O, S, Se
Y and Z come from the group H, F, CF$_3$, CH$_2$CF$_3$, C$_6$F$_5$, C$_6$H$_5$, alkyl hydrocarbon or fluorocarbons or alkyl (hydrocarbon or fluorocarbon) Examples of acceptor structures include but are not limited to:

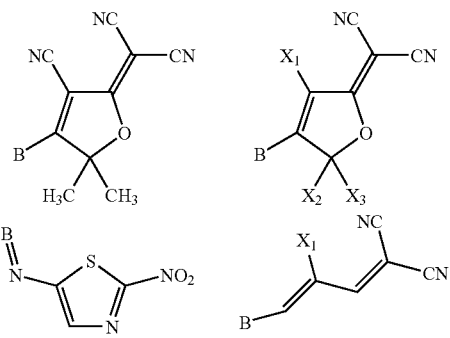

where:
X$_1$=H, F, CN, CF$_3$, CH$_2$CF$_3$, CF$_3$, CH$_2$CF$_3$ alkyl hydrocarbon or fluorocarbons or alkyl (hydrocarbon or fluorocarbon) esters, and B denotes the attachment point of the bridge group.

The critical parameters for an EO molecule are its overall refractive index, number of C—H bonds (optical loss), EO coefficient, and spatial or geometric placement of donor/acceptor and other functional groups in its molecular structure. In the present invention, it is demonstrated herein that the EO chromophore for the polymers used in silica optical applications have to be selected to be "compatible" with the low refractive index polymers either through copolymerization or enhanced solubility, and must still maintain a high EO coefficient, while not excessively raising the refractive index of the system. Inclusion of fluorinated groups is needed to enhance the compatibility between a chromophore and a low refractive index polymer system. It also is vital to fluorinate at the correct sites on the chromophore. Inclusion of fluorine at the incorrect site can greatly diminish the electrooptic response of the chromophore, while also decreasing its compatibility with low refractive index polymers. Thus, overall EO design is a function of {polymer compatibility, low overall contribution to the total refractive index of the system, high EO efficiency}.

Example 30

Substituted Trienes or Multienes

The effect of the location of the fluorination on the electrooptic response of a class of molecules is shown in this example. The core molecular structure is shown in FIG. 19, where A, B, C, D, E are all possible sites for substitution.

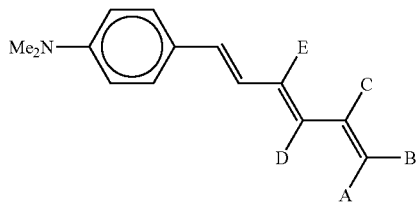

Table 27 summarizes the substitution pattern of the different molecules. Each site (A, B, C, D, and E) can be substituted with H, F, CN, or $CF_3$, subject to the constraint that CN only occurs at sites A and B.

TABLE 27

Substitution Pattern for Fluorination of the Chromophore

| Molecule | A | B | C | D | E |
|---|---|---|---|---|---|
| Control | CN | CN | H | H | H |
| a | CN | CN | F | H | H |
| b | CN | CN | F | F | H |
| c | CN | CN | F | F | F |
| d | CN | CN | $CF_3$ | H | H |
| e | CN | CN | $CF_3$ | F | H |
| f | CN | CN | $CF_3$ | F | F |
| g | CN | CN | $CF_3$ | $CF_3$ | H |
| h | $CF_3$ | CN | H | H | H |
| i | CN | $CF_3$ | H | H | H |
| j | $CF_3$ | $CF_3$ | H | H | H |
| k | $CF_3$ | $CF_3$ | F | H | H |
| l | $CF_3$ | $CF_3$ | F | F | H |
| m | $CF_3$ | $CF_3$ | $CF_3$ | H | H |
| n | $CF_3$ | $CF_3$ | $CF_3$ | F | H |

In EO chromophores of the present invention, fluorine atoms typically are strategically placed so that the EO coefficient, which is directly related to $\mu\beta$/MW (vector product of the dipole moment times the first hyperpolarizability of the molecule divided by the molecular weight), is increased or is not substantially reduced. The dipole moments and first hyperpolarizabilities were calculated as described previously. Table 28 shows how the substitution pattern can greatly alter the electrooptic response of a chromophore. The predicted response can vary by a factor of 5 between the largest response (molecule b) and the weakest response (molecule n). It is also important to note that inclusion of some fluorine can act to enhance the predicted electrooptic response, while at the same time improving the solubility of the chromophore.

TABLE 28

Effect of Fluorination Site on the EO Response of Molecules

| Molecule | $\mu\beta$ (esu) | $\mu\beta$/MW |
|---|---|---|
| Control | 1101.0 | 4.42 |
| a | 1209.5 | 4.53 |
| b | 1374.0 | 4.82 |
| c | 1448.5 | 4.78 |
| d | 1372.3 | 4.33 |
| e | 1609.1 | 4.80 |
| f | 871.1 | 2.47 |
| g | 727.8 | 1.89 |
| h | 864.2 | 2.96 |
| i | 603.7 | 2.07 |
| j | 453.4 | 1.35 |
| k | 538.6 | 1.53 |
| l | 529.9 | 1.43 |
| m | 570.2 | 1.41 |
| n | 398.1 | 0.945 |

Example 31

Fluorinated Chromophores

The effect of fluorination on the electrooptic response of a second class of molecules is shown in this example. In Table 29, the fluorination can take place either on the bridge backbone, or on the acceptor, while Table 30 examines the effect of fluorination on the acceptor in closer detail.

TABLE 29

Effect of Fluorination on the Bridge and Acceptor of High EO Chromophores

| Structure | Comments | $\mu\beta$ |
|---|---|---|
| | Prior art | 2837.8 |

TABLE 29-continued
Effect of Fluorination on the Bridge and Acceptor of High EO Chromophores
| Structure | Comments | µβ |
|---|---|---|
| 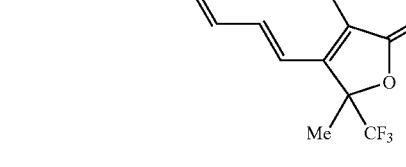 | This invention | 3679.2 |
| 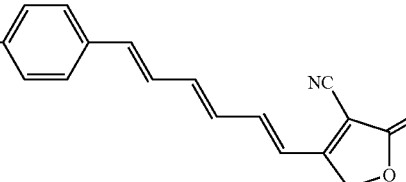 | This invention | 4722.7 |
| 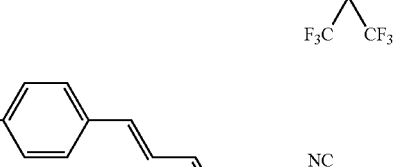 | This invention | 3008.6 |
| 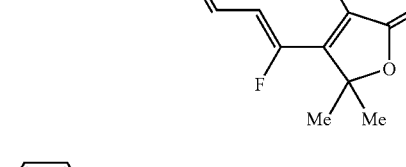 | This invention | 1471.7 |
| 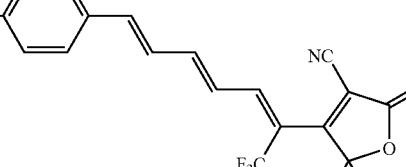 | This invention | 1025.1 |
| 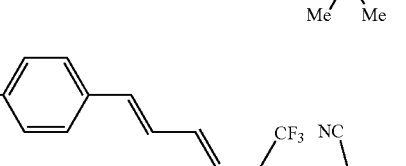 | This invention | 1502.8 |

TABLE 29-continued

Effect of Fluorination on the Bridge and Acceptor of High EO Chromophores

| Structure | Comments | μβ |
|---|---|---|
| (structure) | This invention | 1406.7 |
| (structure) | This invention | 1664.8 |
| (structure) | This invention | 1473.4 |

TABLE 30

The Effect of Fluorination on the Acceptor of A High EO Chromophore

| Structure | Comments | μβ |
|---|---|---|
| (structure) | Prior art | 1977.6 |
| (structure) | This invention | 2104.7 |
| (structure) | This invention | 2371.7 |
| (structure) | This invention | 2352.9 |

General Synthesis Procedure for Reacting Aldehydes and Ketones with Nitrile/Nitro Acceptors (Knoevenagel and Imine Formation Reactions)

The general outline of this type of synthesis is as follows:

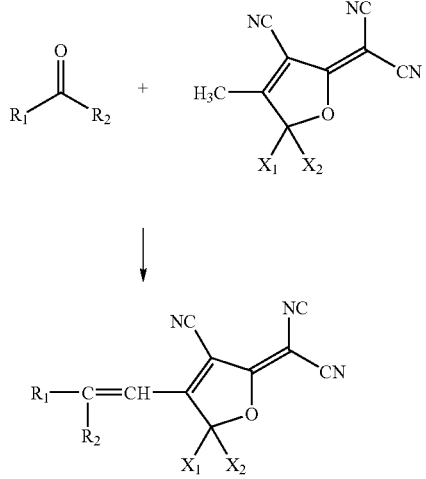

where,

R$_1$=aromatic, vinyl and R$_2$=H or alkyl/aromatic.

X$_1$=H, F, CN, CF$_3$, CH$_2$CF$_3$, CF$_3$, CH$_2$CF$_3$, alkyl hydrocarbon or fluorocarbons or alkyl (hydrocarbon or fluorocarbon).

Into a 3-neck, 100 ml flask fitted with a reflux condenser, thermometer, stirrer (magnetic) and heating mantle is added 0.1 mole of the ketone or aldehyde followed by 0.12 moles of the nitrile acceptor, 0.3 gm of ammonium acetate, 1 ml of acetic acid, and 50 ml of chloroform. The mixture is heated to 60° C. for 2-3 hours, cooled to room temperature, washed with water, dried, and evaporated to produce highly blue-purple products (the color depends on the starting aldehyde/ketone). The crude product is purified using column chromatography (silica gel and 60-40 hexane/ethyl acetate solvent blends). (Reference-*Practical Organic Chemistry*, 3$^{rd}$ edition, A. Vogel, 1962, p 470, 710-719, J. Wiley, New York).

The types of aldehydes and ketones prepared in this invention are shown in Table 31. This table shows only a representative sample of the aldehydes and ketones that are applicable to this invention.

TABLE 31

Samples of Aldehydes and Ketones Used in Synthesis of Chromophores of This Invention

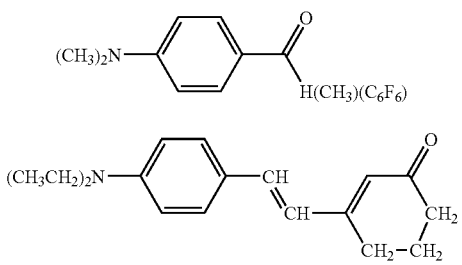

TABLE 31-continued

Samples of Aldehydes and Ketones Used in Synthesis of Chromophores of This Invention

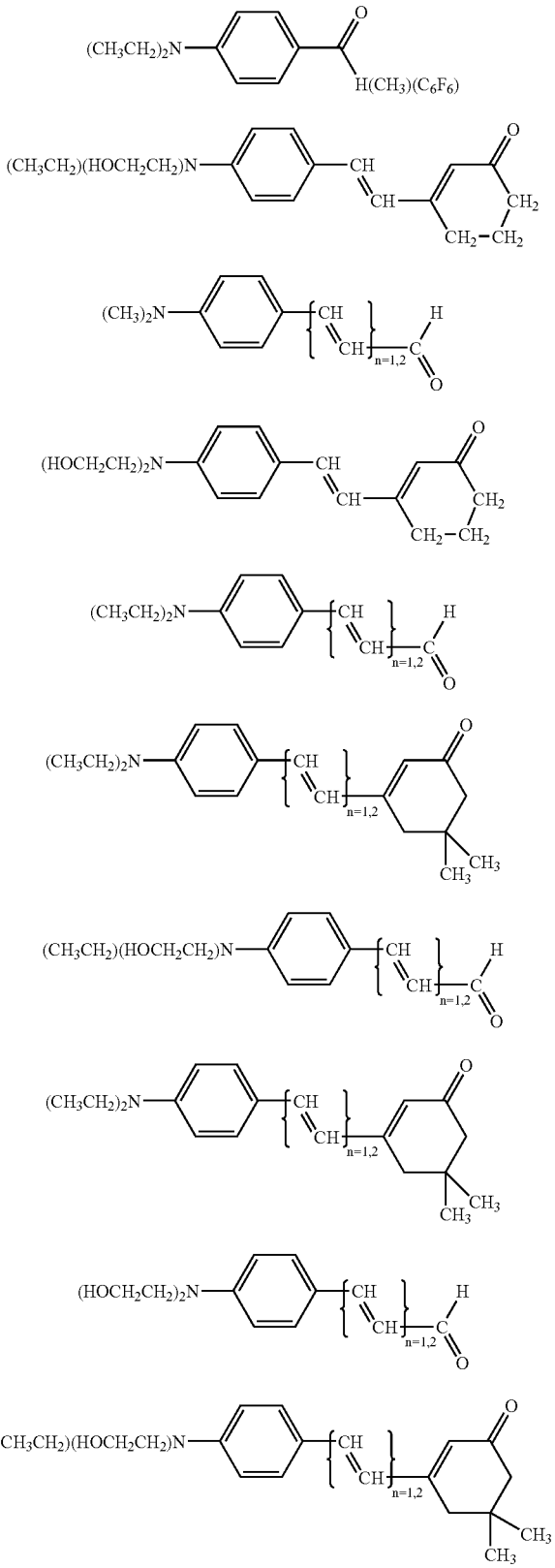

TABLE 31-continued

Samples of Aldehydes and Ketones Used in Synthesis of Chromophores of This Invention

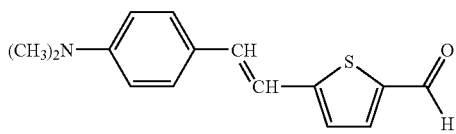

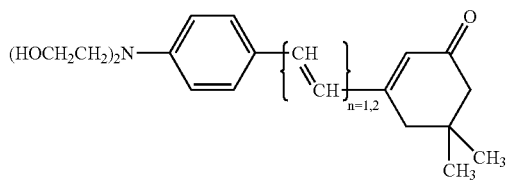

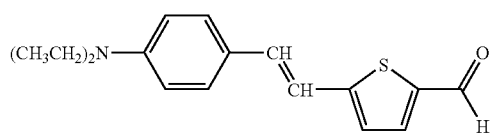

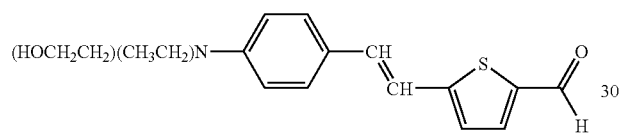

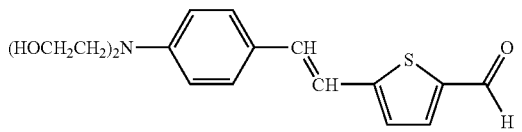

It should be noted that aldehydes can be chain extended with methyl substituted unsaturated ketones, such as, for example, isopherone and methyl-cyclohexanone (this preparation is also a modification of the Knoevenagel reaction).

The same aldehydes and ketones as indicated in Table 31 can also be reacted with an amine functional nitrile or nitro acceptor as shown below.

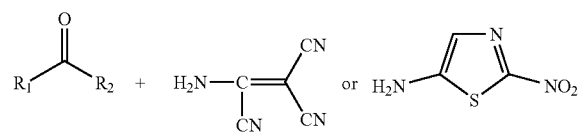

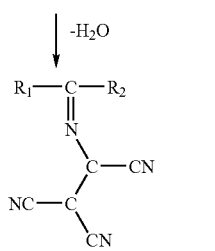 or 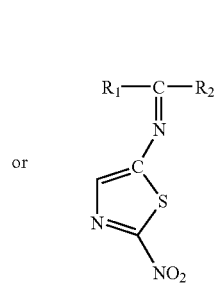

where,
$R_1$=aromatic, vinyl and $R_2$=H or alkyl/aromatic.

In these reactions the aldehyde/ketone is dissolved in toluene, ethyl acetate or other solvents that azetrope off water to complete the reaction.

General Synthesis Procedure for Preparing Polymers of Nitrile/Nitro Acceptor Chromophores The basic reaction sequence for preparing polymers that contain nitrile/nitro acceptor chromophores is as follows:

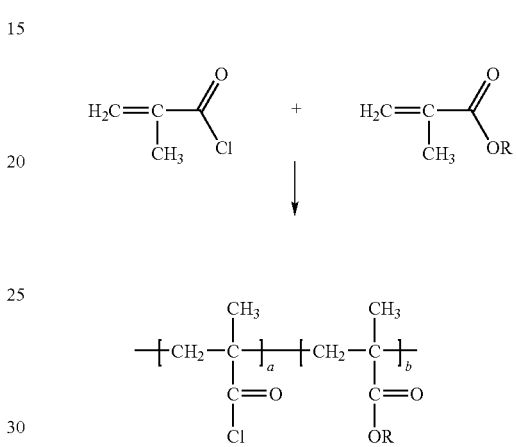

where,
R=one or many different alkyl or fluoroalkyl groups.

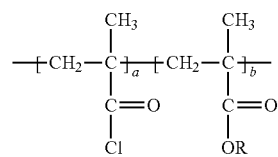

where HO—B—A represents a functionalized chromophore of this Invention

HO—B—A  OH—B represents an hydroxy-functionalized aldehyde or ketone, such as those shown in Table 31

—A represents an acceptor similar to those shown previously

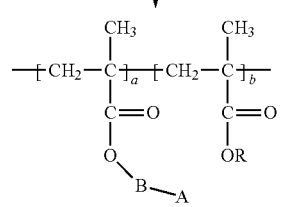

Other ways of preparing polymers that directly incorporate these chromophores can be described as follows:

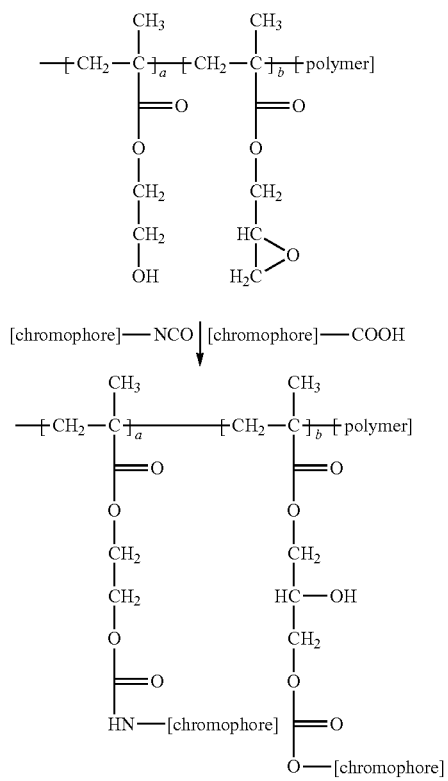

[chromophore]—NCO | [chromophore]—COOH (Reference for this method is Preparative Methods of Polymer Chemistry, W. R. Sorenson and T. W. Campbell, Interscience Publishers, New York, 1961).

Example 32

Fluorinated Acceptors

A new fluorinated acceptor was prepared according to the following general synthetic reaction scheme:

-continued

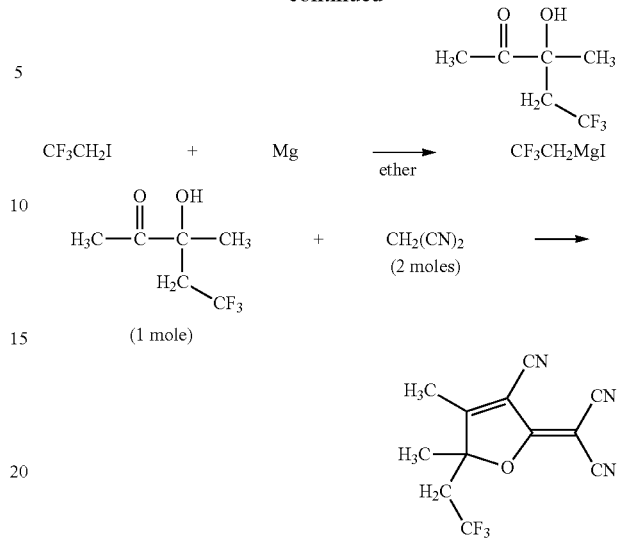

The reference for the Grignard reaction is *Organic Synthesis, Collective Volume II*, pp. 406-407, J. Wiley and Sons, New York, 1967, A. H. Blatt (ed.). The reference for the dicyanomethane reaction with a ketone is *Org. React.*, Vol. 15, p 204 (1967). See also *Chem. Rev.*, vol. 69, p 591 (1969); *Synthesis*, p 165 and p 241 (1978), and p 925 (1981); *Synthetic Comm.*, Vol. 25, p 3045-3051 (1995).

Example 33

Fluorinated Coupler (Bridge)

A new fluorinated coupler or bridge was prepared according to the following general synthetic outline:

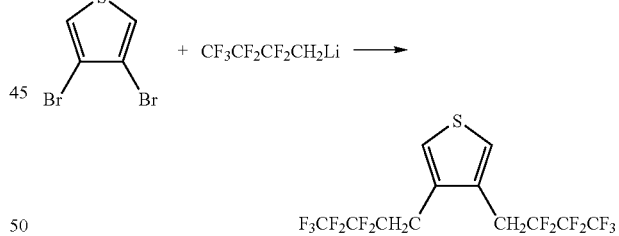

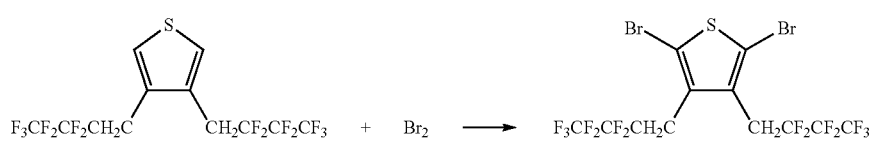

DMF | CF$_3$CF$_2$CF$_2$CH$_2$LI

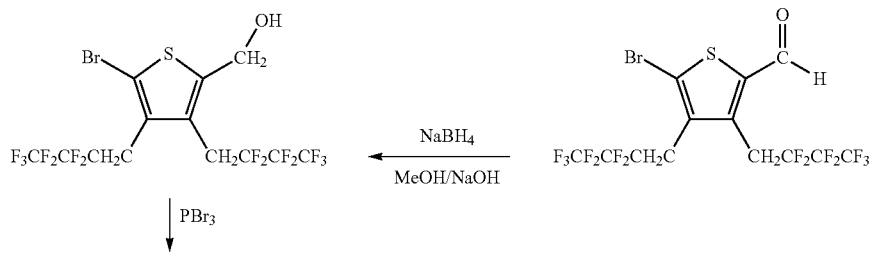

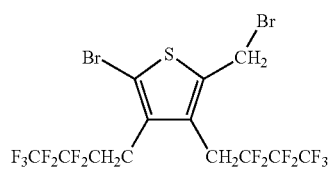

The reference for the above reactions are contained in Fiesler, L. F. and Fieser, M. *Reagent for Organic Synthesis*, pp 95-96, J. Wiley and Sons, New York, 1969; and U.S. Pat. No. 6,067,186 (May 23, 2000).

Example 34

Fluorinated Chromophore

A fluorinated chromophore was prepared as shown in the following reaction scheme:

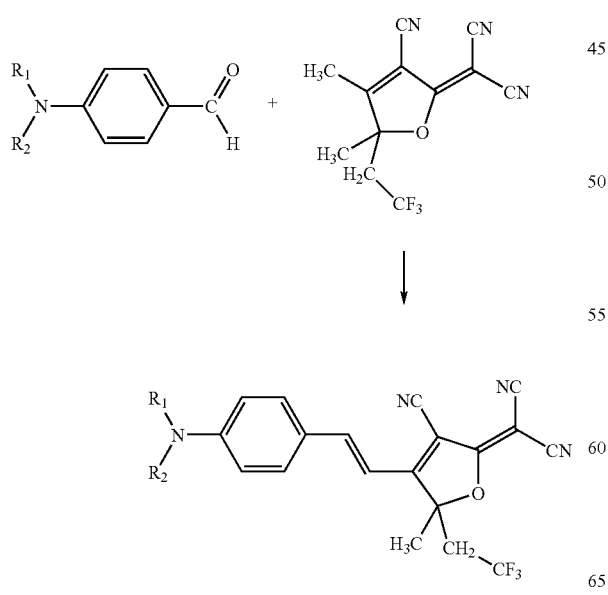

where $R_1$, $R_2$=alkyl, alkyl alcohols, alkyl (hydrocarbon or fluorocarbon) esters, or alkyl silane derivatives.

Similar reactions can also be carried out using the following types of aldehydes:

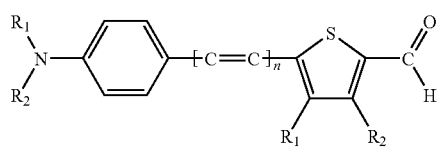

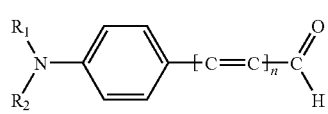

where, n ranges from 0 to 10, and $R_1$ and $R_2$=H, butyl, —$CH_2CF_2CF_2CF_3$ (Example B), or other alkyl, alkyl alcohols, alkyl (hydrocarbon or fluorocarbon) esters, or alkyl silane derivatives.

Example 35

Fluorinated Chromophore

A fluorinated chromophore was prepared as shown in the following reaction scheme, FIG. 30:

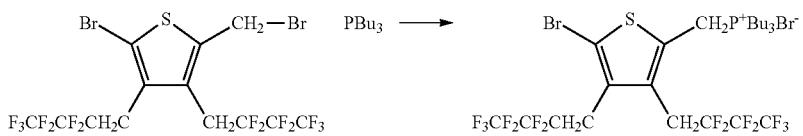

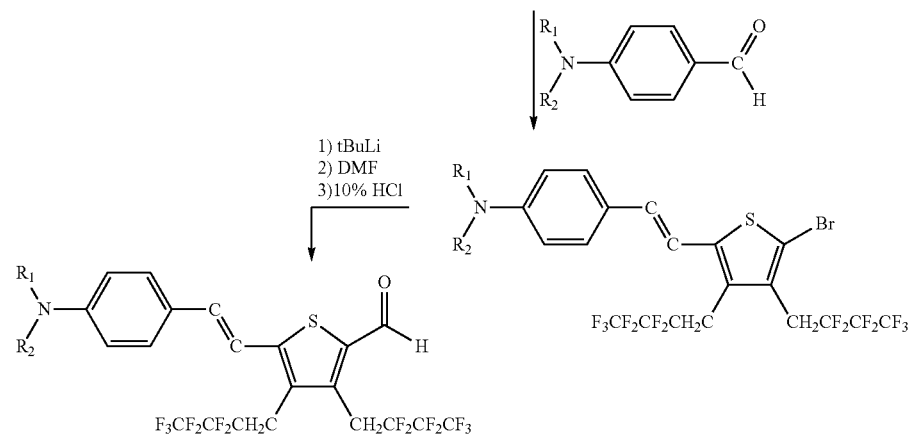

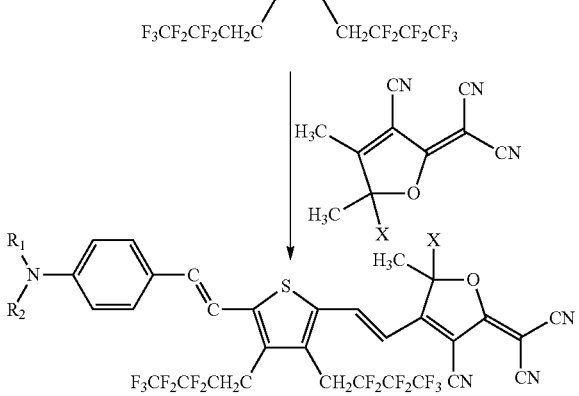

where
$X_1$=H, F, CN, $CF_3$, $CF_2$, $CH,CF_3$, alkyl hydrocarbon or fluorocarbons or alkyl (hydrocarbon or fluorocarbon).

Example 36

Advantage of Fluorinated Chromophores over their All-Hydrocarbon Counterparts

One of the major concerns with EO chromophores is their compatibility and stability/durability in a polymer. All of the EO chromophores of the prior art (e.g., U.S. Pat. No. 6,067, 186) have a high degree of stability in all-hydrocarbon backbone polymer systems. This is not the case, however, with the highly fluorinated polymers of this invention. The following table demonstrates the clear advantage of using fluorinated chromophores (this invention) over non-fluorinated chromophores (prior art) in low refractive index fluorinated polymers of this invention.

TABLE 32

Comparison Between Fluorinated Chromophores of this Invention and Non-fluorinated Chromophores (prior art) in Fluoropolymers of this Invention

| Chromophore | Polymer | Stability |
|---|---|---|
|  (prior art) | Polymethyl-methacrylate (high refractive index) | Good |

TABLE 32-continued

Comparison Between Fluorinated Chromophores of this Invention and
Non-fluorinated Chromophores (prior art) in Fluoropolymers of this Invention

| Chromophore | Polymer | Stability |
|---|---|---|
| 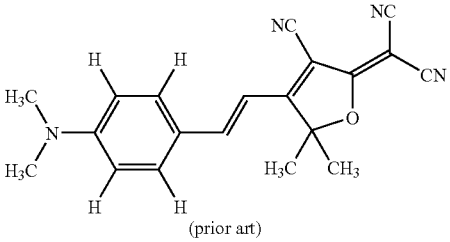 (prior art) | Copolymer of trifluoroethyl methacrylate (90%) and hydroxyethyl-methacrylate (10%) | Poor |
| 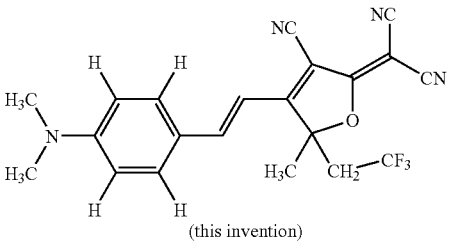 (this invention) | Copolymer of trifluoroethyl methacrylate (90%) and hydroxyethyl-methacrylate (10%) | Good |
| 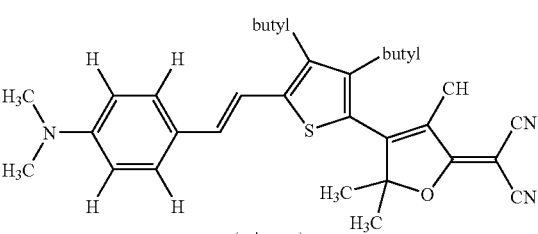 (prior art) | Copolymer of trifluoroethyl methacrylate (90%) and hydroxyethyl-methacrylate (10%) | Poor |
| 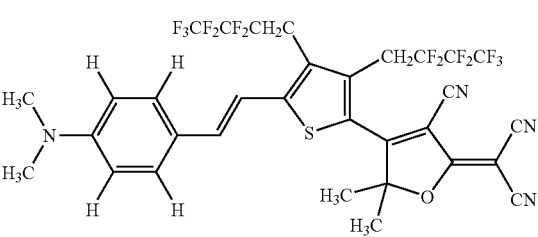 (this invention) | Copolymer of trifluoroethyl methacrylate (90%) and hydroxyethyl-methacrylate (10%) | Good | where,
Poor=phase separation of the chromophore from the polymer and loss of EO response after poling within 24 hours
Good=no phase separation of the chromophore from the polymer and no loss of the EO response after poling within 24 hours.

System Example 37

Formation of Complete System

In a less complex embodiment, the optically active chromophores are physically blended with the polymer, preferably in solvents, spin applied into thin dry films onto appropriate substrates, followed by the application of electrodes, and then poling the films at higher temperatures followed by cooling to produce the final product. In a more complex embodiment, the optically active chromophore has a functional group on the molecule that can be copolymerized into the polymer network in order to create a more durable and stable system.

For example, for crosslinking, the optically active chromophore should contain one or more of the functional groups represented in the chemical structure below (for further details, for modification of optically active (EO) chromophores to contain reactive functional groups, see the J. March reference noted earlier):

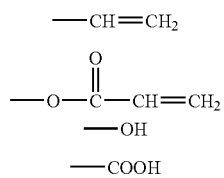

-continued

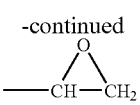

These reactive functional groups may exist as part of the donor, or in the case of —COOH, may also function as a secondary acceptor on the chromophore.

Examples of preferred polymer/electrooptical chromophore systems are represented by the following chemical structures. The structure on the left represents an optically active chromophore suitable for blending with a polymer, while the structure on the right represents a chromophore of this invention suitable for copolymerization with a polymer:

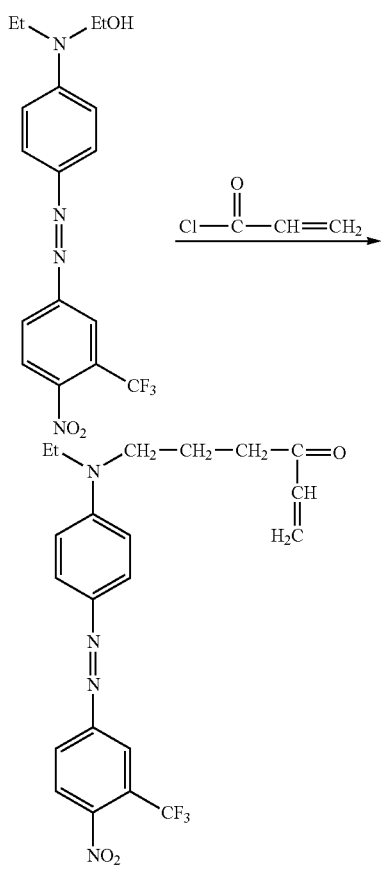

System Example 40 presents several examples of blending chromophores with the polymers of this invention, while Example 27 contains details of the formation of a polymer copolymerized with a chromophore of this invention.

System Example 38

Relationship Between Adhesion, Optically Active Chromophore Compatibility and Optical Loss Quality The use of adhesion promotion agents (silanes, acids, hydroxyls, and other carbon-hydrogen bond materials) does increase the overall durability of the polymer/substrate system. The problem, however, is that using these types of traditional adhesion promotion agents also can decrease the optical quality of the total system and decrease the stability or effectiveness of the optically active chromophore.

The present invention provides a unique combination of a nitrile group (CN) in combination with silane or fluorosilane coupling agents, which not only reduces the amount of silane needed for adhesion but also improves the optical quality and EO efficiency of the total system. Table 33 illustrates this effect.

TABLE 33

Adhesion Promotion

| System | Results |
|---|---|
| No Silane added to the polymer backbone for adhesion | No adhesion, good optical, quality poor EO compatibility |
| Silane added to the polymer backbone for adhesion. | Good adhesion, poor optical quality, poor EO compatibility. |
| Fluorosilane added to the polymer backbone for adhesion. | Good adhesion, good optical quality, poor EO compatibility. |
| Nitrile added to the polymer backbone. | Small amount of adhesion good optical quality, good EO compatibility. |
| Combination of silanes or fluorosilanes added to the polymer backbone along with the nitrile group. | Excellent adhesion, excellent optical quality and EO compatibility. |

System Example 39

Thermooptic Switch

This example illustrates that the functional optical materials of the present invention are useful in thermooptic switches. Referring to the Drawing, a typical plastic optical fiber having a polymethacrylate core, 101, and a fluoropolymer cladding, 102, was treated with tetrahydrofuran solvent to partially remove cladding 102 at a segment, 103, and expose core 101. The plastic optical fiber was ordered from Edmund Scientific, Industrial Optics Division, USA, Stock No. D2531™, and had a core diameter of 240 microns, while the total fiber diameter was 250 microns. Core 101 consisted of polymethyl-methacrylate (refractive index of 1.492) and cladding 102 consisted of a fluorinated polymer (refractive index of 1.402). Core 101 of the fiber at segment 103 then was overcoated with a functional optical material, 105, made from polymers and optically active chromophores of this invention to form a modified fiber, 100. The polymers and optically active chromophores were those illustrated in Polymer Example 2. Both the conventional EO chromophore (metanitroaniline or Disperse Red-1) and the EO chromophores of this invention were used in these tests.

Referring again to the Drawing, modified fiber 100 was placed in a test apparatus, 150, in order to measure the thermooptical properties of functional optical material 105 of this invention. Test apparatus 150 consisted of a heating block, 152, that held modified fiber 100. The heating block was made up of an electrical heating coil (not shown) and connected to a source of electrical power, 154. A thermocouple, 160, was mounted to functional optical material 105 to allow temperature measurements. Thermocouple 160 was connected to a display unit, 162, for amplification of the signal and display. A light source, 170, was used to send a light, 172, into one end of modified fiber 100 and a light detector detected light, 176, that had passed through the modified fiber 100.

Core 101 consisting of polymethylmethacrylate had a refractive index of about 1.49. Functional optical material 105 was adjusted to have a refractive index of about 1.49 to about 1.5 at room temperature. Upon heating modified fiber 100 the overall refractive index of modified fiber 100 decreased.

At room temperature, there was only a small amount of light being transmitted through core 101 of modified fiber 100. When segment 103 containing functional optical material 105 was heated, the refractive index was lowered and more light was transmitted through modified fiber 100. Cooling modified fiber 100 back to room temperature resulted in a higher refractive index segment and, thus, less light was guided in the core resulting in a lower intensity output. Thus, the thermooptic light intensity modulation was reversible.

An electrooptic switch or modulator could be made using the same materials with slightly different ratios of compounds and with the application of electrodes. Electrooptic switches and modulators are well known in the art so that once knowing the teachings of the present invention the fabrication of an electrooptic switch or electrooptic modulator with the herein disclosed materials will be within the skill of the person of ordinary skill in the art. Typical applications in which the functional optical materials of the invention may be used are disclosed in: U.S. Pat. No. 5,857,039 to Bosc; U.S. Pat. No. 5,659,010 to Sotoyama, et al.; U.S. Pat. No. 5,818,983 to Yoshimura, et al.; U.S. Pat. No. 3,589,794 to Marcatili; and "Dielectric Rectangular Waveguide and Directional Coupler for Integrated Optics", E. A. J. Marcatili, *Bell Syst. Tech. J.*, vol. 48, pp. 2071-2102, September 1969.

System Example 40

Solubility of Conventional Chromophores and Chromophores of this Invention in Low-Refractive Index Monomers One of the major practical aspects of this invention is the ability to create stable/compatible combinations of the chromophores ($\chi^{(2)}$ or $\chi^{(3)}$) in polymers. A series of experiments that demonstrate how the chromophore modifications of this invention improve the compatibility of the chromophores in the polymers of this invention are shown in the following table.

System Example 40

Example of a Guest/Host System of EC1 in Low Refractive Index Polymers

In this example, several different multi-component polymers were synthesized, and used as the matrix for EO measurements. The multi-monomer thermoplastic polymers of this invention were prepared in the following manner.

The specified monomers were mixed together in the specified weight percent. This liquid monomer mixture (25 cc) was added slowly to 200 mls of dry tetrahydrofuran (THF) contained in a 400 ml round bottom 3 neck flask fitted with a heating mantle, glass shaft stirrer, reflux condenser and addition funnel. To the monomer mixture was added 0.5 grams of Vazo 64™ (free radical initiator from E. I. DuPont DeNemours, Wilmington, Del., USA) and the entire mixture heated in the THF at 68° C. over a 1 hour time period. The reaction was continued over an 8-hour time period after which the THF/polymer solution was cooled to room temperature and the polymer precipitated out of the solution with excess methanol. The resulting polymers were evaluated for their refractive index, $T_g$, molecular weight, and chromophore stability.

Another method to prepare these polymers consisted of filling 2 ounce or 8 ounce glass bottles with the monomer mixtures, dioxane solvent, and Vazo 64™ catalyst. The bottles then were placed in an oven at constant temperature (60° C.) for 8-24 hours. The polymer solution then was treated with methanol to precipitate the polymer out of solution.

The following table provides the weight composition of representative polymers prepared

TABLE 34

Chromophore/polymer compatibility studies (10-20% chromophore blended with different polymers)

| Chromophore ($\chi^{(2)}$ or $\chi^{(3)}$) | Polymer | Results |
| --- | --- | --- |
| DR-1 ($\chi^{(2)}$) (all-hydrocarbon prior-art chromophore) | polymethyl-methacrylate (prior art) | Clear, transparent film (compatible) |
| DR-1 ($\chi^{(2)}$) (all-hydrocarbon prior-art chromophore) | Copolymer of trifluoroethyl methacrylate (80%) and hydroxyethyl methacrylate (20%) | Not a clear film (incompatible) |
| Trifluoromethyl-modified DR-1 (chromophore of this invention) ($\chi^{(2)}$) | Copolymer of trifluoroethyl methacrylate (80%) and hydroxyethyl methacrylate (20%) | Clear, transparent film (compatible) |
| Anthracene ($\chi^{(3)}$) (all-hydrocarbon prior-art chromophore) | Polystyrene (prior art) | Compatible |
| Anthracene ($\chi^{(3)}$) (all-hydrocarbon prior-art chromophore) | Terpolymer of trifluoroethyl methacrylate (60%); pentafluorostyrene (20%); styrene (20%) | Incompatible |
| Fluorinated anthracene ($\chi^{(3)}$) (CF3 functionalized chromophore of this invention | Terpolymer of trifluoroethyl methacrylate (60%); pentafluorostyrene (20%); styrene (20%) | Compatible |

TABLE 35

Composition of Novel Host Polymers

| Low Index Monomer 1 (wt %) | Low Index Monomer 2 (wt %) | EO Chromophore Solubility Monomer (Crosslinking or Adhesion Promotion Monomer) (wt %) |
|---|---|---|
| TFEMA (60%) | none | MMA (20%) NVP (20%) |
| TFEMA (80%) | none | NVP (20%) |
| TFEMA (80%) | none | THFMA (20%) |
| TFEMA (63-85%) | none | MMA (37-15%) |
| TFEMA (100%) | none | none |
| TFEMA (80%) | none | HEMA (20%) |
| TFEMA (45%) | TDOFMA (55%) | none |
| TFEMA (20%) | TFPMA (60%) | HEMA (20%) |
| TFEMA (20%) | TFPMA (70%) | HEMA (10%) |
| TFEMA (15%) | TFPMA (80%) | HEMA (5%) |
| TFEMA (10%) | TFPMA (80%) | HEMA (10%) |
| TFEMA (20%) | HFIPMA (60%) | HEMA (20%) |
| TFEMA (20%) | HFBMA (60%) | HEMA (20%) |
| TFEMA (80%) | none | P4VP (20%) |

Note:
TFEMA = trifluoroethylmethacrylate
MMA = methylmethacrylate
NVP = N-vinylpyrrolidone
THFMA = tetrahydrofuranmethacrylate
TDOFMA = tridecafluorooctylmethacrylate
TFPMA = tetrafluoropropylmethacrylate
HFIPMA = hexafluoroisopropylmethacrylate
HFBMA = hexafluorobutylmethacrylate
P4VP = poly(4-vinylpyridine)

To each of these polymers was added approximately 10% by weight of an EO chromophore of this invention (Chromophore Example 25) in dioxane (1-5% solids) and spun down onto indium tin oxide (ITO) coated glass or silica substrates. This system was metalized and poled in a similar manner as Polymer Example 1, and the EO response then determined as described in Polymer Example 2. A second sample was commonly spun down onto a CaF$_2$ slide, and the refractive index measured at multiple wavelengths.

System Example 41

Direct Formation of Electrooptic Polymers

In this example, several different multi-component electrooptic polymers were synthesized, and used as the matrix for EO measurements. In these examples, the chromophore was directly incorporated into the polymer during the synthesis. The multi-monomer thermoplastic polymers of this Invention were prepared by the procedure reported in the preceding example.

The following table provides the weight composition of representative polymers prepared

TABLE 36

Formation of Novel Electrooptic Polymers

| Sample No. | Low Index Monomer 1 (wt %) | Low Index Monomer 2 (wt %) | Chromophore (wt %) |
|---|---|---|---|
| 1 | Trifluroethyl-methacrylate (45%) | Hexafluorobutyl-methacrylate (45%) | Chromophore Example 25 (10%) |
| 2 | Trifluroethyl-methacrylate (15%) | Hexafluoroisopropyl methacrylate (65%) | Chromophore Example 25 (20%) |

The EO polymers of this example in dioxane (1-5% solids) were spun down onto Indium Tin Oxide (ITO) coated glass or silica substrates. This system was metalized and poled in a similar manner as Polymer Example 1, and the EO response then determined as described in Polymer Example 2. A second sample was commonly spun down onto a CaF$_2$ slide, and the refractive index measured at multiple wavelengths.

System Example 42

Sol-Gel Crosslinking Chromophore Film 1 part 3-(heptafluoroisopropoxy)-propyl-triethoxysilane [HFIPPTS] and 1 part (3-glycidoxypropyl)trimethoxysilane [3-GPTMS] and 0.1 part of either the chromophore from Chromophore Example 25 or Chromophore Example 26 were mixed together in dioxane, methanol or tetrahydrofuran, and a trace amount of HCl or acetic acid. This solution was applied to a glass slide; solvent was removed and the slide then baked at 75° C. for 1 hour. A red, brittle, glass-like film was obtained.

Note: Small amounts of zirconium isopropoxide or triethoxysilane or tetraethyl orthosilicate can also be added to the above mixture to create a sol-gel crosslinking chromophore film.

Note: Other [OH] functional chromophores can also be used in this invention.

Other variations on the sol-gel concept include reacting a polymer of methyl-3,3,3-trifluoro-propylsilane with (3-glycidoxypropyl)trimethoxy silane or a commercial fluoropolymer [Lumiflon LF-910-LM] with isocyanatopropyltriethoxy silane to create organic polymer-inorganic polymer hybrid structures. Since these are functional polymers (contain OH, COOH, Si(O alkyl)$_3$ functional groups, they can be reacted with functional chromophores (possible examples are Chromophore Examples 25, 26, 29) to create chromophore chemically-attached crosslinked films. A complete description on preparing sol-gels can be found in *Sol-Gel Technology for Thin Films, Fibers, Preforms, Electronics*, and *Specialty Shapes*, Lisa C. Klein, ed., Noyes Publications, Park Ridge, N.J. (1988).

System Example 43

Polyurethane Organic Crosslinking Chromophore Films

Reaction of the thermoplastic polymers of this invention that preferably contained 5-20% hydroxyl functionality (fluorinated monomers copolymerized with hydroxyethylmethacrylate or other hydroxy functional acrylate or methacrylate monomer) with diisocyanates (Desmodur N-32 or 1,6 hexamethylene diisocyanates) and a hydroxy functionalized chromophore (possible examples are Chromophore Examples 25, 26) created chemically bound crosslinked chromophore films.

For example, 0.11 g of a low refractive index terpolymer (80% TFEMA, 15% TFPMA, 5% HEMA) was dissolved in 0.3 g of dioxane to which was added 26 mg of N-3200 diisocyanate and 10 mg of Chromophore Example 25. To this mixture was added 12 mg of dibutyltin dilaurate as a catalyst, and the mixture than applied to a glass slide. After solvent evaporation, the film was cured and crosslinked by heating at 60° C. for 1 hour. The resulting film was insoluble in acetone.

Note: Other [OH] functional chromophores can also be used in this invention.

Further modifications of this concept include using fluorinated diols (for example tetrafluoro-1,4-butane diol) and hydrocarbon diols (for example 1,6-hexane diol) as reactive diluents for the creation of the crosslinked polyurethane backbone structure.

System Example 44

Free Radical Crosslinking Chromophore Films

Combinations of methacrylate unsaturated functional chromophore (examples are Chromophore Examples 27, 28, 29) can be combined with fluorinated or non-fluorinated monomers (such as trifluoromethyl methacrylate or methyl methacrylate) and free radical crosslinking monomers (such as trimethylolpropane triacrylate or polyethylene glycoldiacrylate [PEGDA]) and then be thermally initiated using benzoyl peroxide as the catalyst.

For example, 0.03 g TFEMA and 5.2 mg of chromophore (Chromophore Example 8, 9, or 10) and 0.5 mg of benzoyl peroxide were mixed together, laminated between glass plates, and heated to 60° C. for 2 hours. After cooling to room temperature the glass plates were split apart to give a solid cured film containing the chemically reacted chromophore on one surface.

System Example 45

Addition Cure Chromophore Crosslinking Reactions

Chromophores containing more than one type of reactive functionality (for example, Chromophore Example 29) can be polymerized into a thermoplastic film, but then can be addition reaction

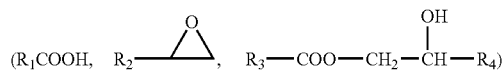

crosslinked with the appropriate chemistry.

For example, 10 weight percent of Chromophore Example 29 was copolymerized with 80 weight percent of TFEMA and 10 weight percent of glycidylmethacrylate to give a thermoplastic polymer. This polymer was cast out of solution onto a glass plate and baked at 80° C. for 3 hours. The result was a thermally cured film that could not be redissolved in a solvent.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. A functional optical material for use in an optical system, comprising:
   (a) a polymer selected from one or more of:
      (1) a thermoplastic polymer;
      (2) a thermosetting polymer; or
      (3) a combination of thermoplastic and thermosetting polymers; wherein said thermoplastic and/or thermosetting polymers contain carbon-hydrogen and/or carbon-fluorine functionality; and
   (b) one or more optically active chromophores being one or more of blended or copolymerized with said polymer; and
   one or more of:
   (c) a compatibilizer copolymerized with said polymer, having one or more pendant groups of nitrites, esters, hydroxyls, aromatics; fluorinated esters, or fluorinated aromatics; or
   (d) an adhesion promoter copolymerized with said polymer, having one or more pendant groups of nitrites, silanes, fluorinated silanes, organic acids; fluorinated organic acids, hydroxyls, fluorinated alcohols, amides, or amines.

2. The functional optical material of claim 1, wherein said chromophore is one or more of a substituted aniline, substituted azobenzene, substituted stilbene, substituted imine, chromophores of the Donor-Bridge-Acceptor structure, or $\chi_{(3)}$ chromophores.

3. The functional optical material of claim 2, wherein said chromophore one or more of the following substituted anilines:

a first substituted anilines,

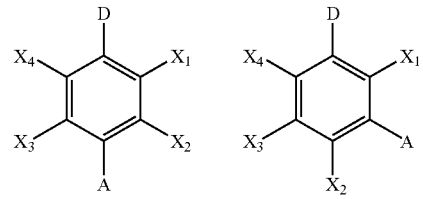

where, D=donor=—$NH_2$, —$N(CH_3)_2$, —$N(CH_2CH_3)_2$, or —$N(Y_1)(Y_2)$, where $Y_i$=alkyl, alkyl alcohols, alkyl (hydrocarbon fluorocarbon) esters, or alkyl silane derivatives;

A=acceptor=—$NO_2$, —$C(CN)$—$C(CN)_2$, —$C(R_1)$—$C(CN)_2$, —$C(R_1)$—$C(R_2)(R_3)$, or —$N$—$C(R_2)(R_3)$, wherein $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$, wherein when A=—$NO_2$, or —$C(CN)C(CN)_2$, then $X_1$, $X_2$, $X_3$, $X_4$ each are independently one or more of —F or —H, and at least one —F is selected, and when A=—$C(R_1)$—$C(CN)_2$, wherein $R_1$=$CF_3$, $C_2F_5$, or $C_nF_{2n+1}$, then $X_1$, $X_2$, $X_3$, $X_4$ each are independently one or more of —F or —H, and when A=—$C(R_1)$—$C(R_2)(R_3)$, wherein $R_1$=$CF_3$, $C_2F_5$, or $C_nF_{2n+1}$, $R_2$=$CF_3$, $C_2F_5$, or $C_nF_{2n+1}$, $R_3$=H, $CH_3$, $CF_3$, or $C_2F_5$, then $X_1$, $X_2$, $X_3$, $X_4$ each are independently one or more of —F or —H, and when A=—$N$—$C(R_2)(R_3)$, wherein $R_2$=$CF_3$, $C_2F_5$, or $C_nF_{2n+1}$, $R_3$=H, $CH_3$, $CF_3$, or $C_2F_5$, then $X_1$, $X_2$, $X_3$, $X_4$ each are independently one or more of —F or —H;

or a second substituted aniline,

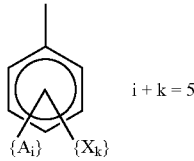

i + k = 5 wherein D=donor—$NH_2$, —$N(CH_3)_2$, —$N(CH_2CH_3)_2$, or —$N(Y_1)(Y_2)$ where $Y_i$=alkyl, alkyl alcohols, alkyl (hydrocarbon or fluorocarbon) esters, or alkyl silane derivatives;

a primary acceptor A=—$NO_2$, —$C(CN)$=$C(CN)_2$, —$C(R_1)$=$C(CN)_2$, —$C(R_1)$=$C(R_2)(R_3)$, or —N=C$(R_2)(R_3)$, $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$, a secondary acceptor A=—CN, —$CF_3$, —COOH, —OH, or —$C_nH_{2n}OH$, wherein if there are exactly two acceptors, and $A_1$ and $A_2$ are both primary acceptors being one or more of —$NO_2$, or —$C(CN)C(CN)_2$, then the set of $\{X_k\}$ each are independently one or more of —F and —H, but at least one —F must be selected;

wherein if there are exactly two acceptors, and $A_1$ and $A_2$ are both secondary acceptors being one or more of —CN, —$CF_3$, —COOH, —OH, or —$C_nH_{2n}OH$, then the set of {Xk} each are independently one or more of —F or —H, but at least one —F must be selected;

wherein if there are exactly two acceptors, and one or more of A1 or A2 are one or more of primary acceptor —$C(R_1)$=$C(CN)_2$, —$C(R_1)$=$C(R_2)(R_3)$, or —N=C$(R_2)(R_3)$, where $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$, then the set of $\{X_k\}$ each are independently one or more of —F and —H; and wherein if there are exactly two acceptors and $A_1$ is selected from any primary acceptor and $A_2$ is selected from any secondary acceptor, then $X_1$, $X_2$, $X_3$ each are independently one or more of —F or —H, wherein if there are three or more acceptors A, then the $X_1$ each are independently one or more of —F or —H.

4. The functional optical material of claim 2, wherein said chromophore is one or more substituted azobenzenes of:

a first substituted azobenzenes,

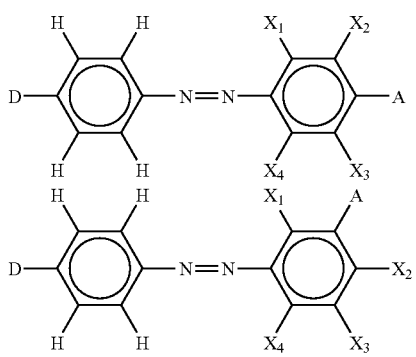

wherein where, D=donor—$NH_2$, —$N(CH_3)_2$, —$N(CH_2CH_3)_2$, or —$N(Y_1)(Y_2)$, where $Y_i$=alkyl, alkyl alcohols, alkyl (hydrocarbon fluorocarbon) esters, or alkyl silane derivatives;

A=acceptor=—$NO_2$, —$C(CN)$=$C(CN)_2$, —$C(R_1)$=$C(CN)_2$, —$C(R_1)$=$C(R_2)(R_3)$, or —N=$C(R_2)(R_3)$, wherein $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$, wherein when A=—$NO_2$, or —$C(CN)C(CN)_2$, then $X_1$, $X_2$, $X_3$, $X_4$ each are independently one or more of —F or —H, and at least one —F is selected, and when A—$C(R_1)$=$C(CN)_2$, wherein $R_1$=$CF_3$, $C_2F_5$, or $C_nF_{2n+1}$, then $X_1$, $X_2$, $X_3$, $X_4$ each are independently one or more of —F or —H, and when A=—$C(R_1)$=$C(R_2)(R_3)$, wherein $R_1$=$CF_3$, $C_2F_5$, or $C_nF_{2n+1}$, $R_2$=$CF_3$, $C_2F_5$, or $C_nF_{2n+1}$, $R_3$=H, $CH_3$, $CF_3$, or $C_2F_5$, then $X_1$, $X_2$, $X_3$, $X_4$ each are independently one or more of —F or —H, and when A=—N=$C(R_2)(R_3)$, wherein $R_2$=$CF_3$, $C_2F_5$, or $C_nF_{2n+1}$, $R_3$=H, $CH_3$, $CF_3$, or $C_2F_5$, then $X_1$, $X_2$, $X_3$, $X_4$ each are independently one or more of —F or —H;

or a second substituted azobenzene:

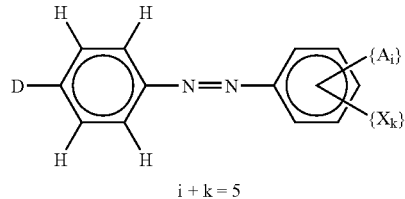

i + k = 5 wherein D=donor=—$NH_2$, —$N(CH_3)_2$, —$N(CH_2CH_3)_2$, or —$N(Y_1)(Y_2)$ where $Y_i$=alkyl, alkyl alcohols, alkyl (hydrocarbon or fluorocarbon) esters, or alkyl silane derivatives;

a primary acceptor A=—$NO_2$, —$C(CN)$=$C(CN)_2$, —$C(R_1)$=$C(CN)_2$, —$C(R_1)$=$C(R_2)(R_3)$, or —N=C$(R_2)(R_3)$, $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$, a secondary acceptor A=—CN, —$CF_3$, —COOH, —OH, or —$C_nH_{2n}OH$, wherein if there are exactly two acceptors, and $A_1$ and $A_2$ are both primary acceptors being one or more of —$NO_2$, or —$C(CN)C(CN)_2$, then the set of $\{X_k\}$ each are independently one or more of —F and —H, but at least one —F must be selected;

wherein if there are exactly two acceptors, and $A_1$ and $A_2$ are both secondary acceptors being one or more of —CN, —$CF_3$, —COOH, —OH, or —$C_nH_{2n}OH$, then the set of $\{X_k\}$ each are independently one or more of —F or —H, but at least one —F must be selected;

wherein if there are exactly two acceptors, and one or more of $A_1$ or $A_2$ are one or more of primary acceptor —$C(R_1)$=$C(CN)_2$, —$C(R_1)$=$C(R_2)(R_3)$, or —N=$C(R_2)(R_3)$, where $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$, then the set of $\{X_k\}$ each are independently one or more of —F and —H; and wherein if there are exactly two acceptors and $A_1$ is selected from any primary acceptor and $A_2$ is selected from any secondary acceptor, then $X_1$, $X_2$, $X_3$ each are independently one or more of —F or —H, wherein if there are three or more acceptors A, then the $X_i$ each are independently one or more of —F or —H.

5. The functional optical material according to claim 2, wherein said chromophore is one or more substituted stilbenes of:

a first substituted stilbene:

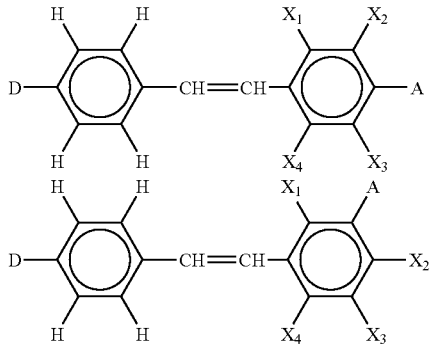

wherein, where, D=donor=—$NH_2$, —$N(CH_3)_2$, —$N(CH_2CH_3)_2$, or —$N(Y_1)(Y_2)$, where $Y_i$=alkyl, alkyl alcohols, alkyl (hydrocarbon fluorocarbon) esters, or alkyl silane derivatives;

A=acceptor=—$NO_2$, —$C(CN)=C(CN)_2$, —$C(R_1)=C(CN)_2$, —$C(R_1)=C(R_2)(R_3)$, or —$N=C(R_2)(R_3)$, wherein $R_1$=$CF_3$, $C_2F_5$, or $C_nF_{2n+1}$, $R_2$=H, $CH_3$, $CF_3$, $C_2F_5$, or $C_nY_{2n+1}$, $R_3$=H, $CH_3$, $CF_3$, or $C_2F_5$, wherein when A=—$NO_2$, or —$C(CN)C(CN)_2$, then $X_1$, $X_2$, $X_3$, $X_4$ each are independently one or more of —F or —H, and at least one —F is selected, and when A=—$C(R_1)=C(CN)_2$, wherein $R_1$=$CF_3$, $C_2F_5$, or $C_nF_{2n+1}$, then $X_1$, $X_2$, $X_3$, $X_4$ each are independently one or more of —F or —H, and when A=—$C(R_1)=C(R_2)(R_3)$, wherein $R_1$=$CF_3$, $C_2F_5$, or $C_nF_{2n+1}$, $R_2$=$CF_3$, $C_2F_5$, or $C_nF_{2n+1}$, $R_3$=H, $CH_3$, $CF_3$, or $C_2F_5$, then $X_1$, $X_2$, $X_3$, $X_4$ each are independently one or more of —F or —H, and when A=—$N=C(R_2)(R_3)$, wherein $R_2$=$CF_3$, $C_2F_5$, or $C_nF_{2n+1}$, $R_3$=H, $CH_3$, $CF_3$, or $C_2F_5$, then $X_1$, $X_2$, $X_3$, $X_4$ each are independently one or more of —F or —H;

or second substituted stilbene:

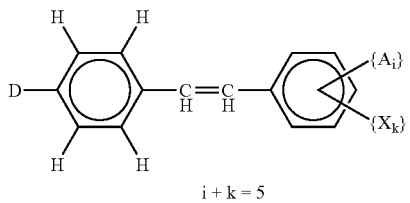

i + k = 5 wherein D=donor=—$NH_2$, —$N(CH_3)_2$, —$N(CH_2CH_3)_2$, or —$N(Y_1)(Y_2)$ where $Y_i$=alkyl, alkyl alcohols, alkyl (hydrocarbon or fluorocarbon) esters, or alkyl silane derivatives;

a primary acceptor A=—$NO_2$, —$C(CN)=C(CN)_2$, —$C(R_1)=C(CN)_2$, —$C(R_1)=C(R_2)(R_3)$, or —$N=C(R_2)(R_3)$, $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$, a secondary acceptor A=—CN, —$CF_3$, —COOH, —OH, or —$C_nH_{2n}OH$, wherein if there are exactly two acceptors, and $A_1$ and $A_2$ are both primary acceptors being one or more of —$NO_2$, or —$C(CN)C(CN)_2$, then the set of {$X_k$} each are independently one or more of —F and —H, but at least one —F must be selected;

wherein if there are exactly two acceptors, and $A_1$ and $A_2$ are both secondary acceptors being one or more of —CN, —$CF_3$, —COOH, —OH, or —$C_nH_{2n}OH$, then the set of {$X_k$} each are independently one or more of —F or —H, but at least one —F must be selected;

wherein if there are exactly two acceptors, and one or more of $A_1$ or $A_2$ are one or more of primary acceptor —$C(R_1)=C(CN)_2$, —$C(R_1)=C(R_2)(R_3)$, or —$N=C(R_2)(R_3)$, where $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$, then the set of {$X_k$} each are independently one or more of —F and —H; and wherein if there are exactly two acceptors and $A_1$ is selected from any primary acceptor and $A_2$ is selected from any secondary acceptor, then $X_1$, $X_2$, $X_3$ each are independently one or more of —F or —H, wherein if there are three or more acceptors A, then the $X_i$ each are independently one or more of —F or —H.

6. The functional optical material of claim 2, wherein said chromophore is one or more of substituted imines of:

a first substituted imine:

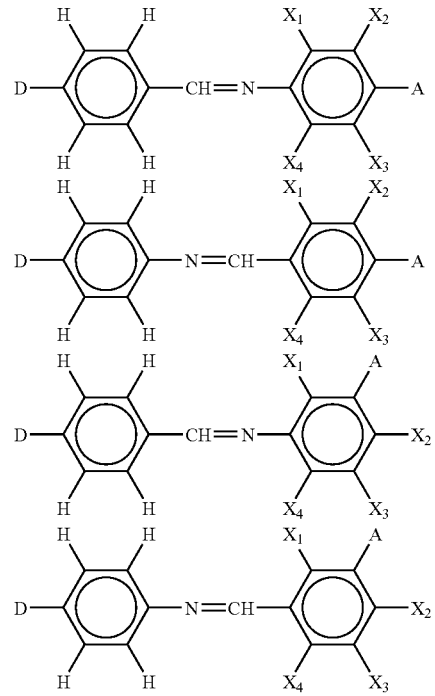

wherein,

D=donor=—$NH_2$, —$N(CH_3)_2$, —$N(CH_2CH_3)_2$, or —$N(Y_1)(Y_2)$ where $Y_i$=alkyl, alkyl alcohols, alkyl (hydrocarbon fluorocarbon) esters, or alkyl silane derivatives;

A=acceptor=—$NO_2$, —$C(CN)=C(CN)_2$, —$C(R_1)=C(CN)_2$, —$(R_1)=C(R_2)(R_3)$, or —$N=C(R_2)(R_3)$, wherein $R_1$=$CF_3$, $C_2F_5$, $C_nF_{2n+1}$, $R_2$=H, $CH_3$, $CF_3$, $C_2F_5$, $C_nF_{2n+1}$, $R_3$=H, $CH_3$, $CF_3$, $C_2F_5$ wherein when A=—$NO_2$, or $C(CN)C(CN)_2$, then $X_1$, $X_2$, $X_3$, $X_4$ are each independently selected from the group —F and —H, and at least one —F is selected, and when A=—C($R_1$)=C(CN)$_2$, wherein $R_1$=CF$_3$, C$_2$F$_5$, C$_n$F$_{2n+1}$, then X$_1$, X$_2$, X$_3$, X$_4$ are each independently selected from the group —F and —H, and when A=—C($R_1$)=C($R_2$)($R_3$), wherein $R_1$=CF$_3$, C$_2$F$_5$, C$_n$F$_{2n+1}$, $R_2$=CF$_3$, C$_2$F$_5$, C$_n$F$_{2n+1}$, $R_3$=H, CH$_3$, CF$_3$, C$_2$F$_5$, then X$_1$, X$_2$, X$_3$, X$_4$ are each independently selected from the group —F and —H, and when A=—N=C($R_2$)($R_3$), wherein $R_2$=CF$_3$, C$_2$F$_5$, C$_n$F$_{2n+1}$, $R_3$=H, CH$_3$, CF$_3$, C$_2$F$_5$, then X$_1$, X$_2$, X$_3$, X$_4$ are each independently selected from the group —F and —H a or second substituted imine:

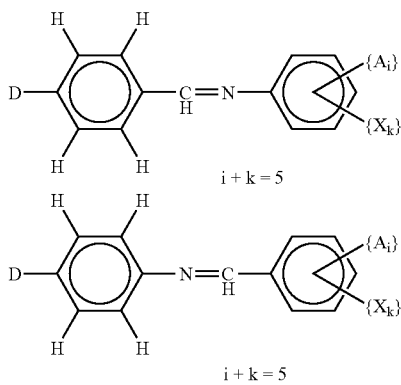

wherein D=donor=—NH$_2$, —N(CH$_3$)$_2$, —N(CH$_2$CH$_3$)$_2$, or —N(Y$_1$)(Y$_2$) where Y$_i$=alkyl, alkyl alcohols, alkyl (hydrocarbon or fluorocarbon) esters, or alkyl silane derivatives;

a primary acceptor A=—NO$_2$, —C(CN)=C(CN)$_2$, —C($R_1$)=C(CN)$_2$, —C($R_1$)=C($R_2$)($R_3$), or —N=C($R_2$)($R_3$), $R_1$=CF$_3$, C$_2$F$_5$, or C$_n$F$_{2n+1}$, $R_2$=H, CH$_3$, CF$_3$, C$_2$F$_5$, or C$_n$F$_{2n+1}$, $R_3$=H, CH$_3$, CF$_3$, or C$_2$F$_5$, a secondary acceptor A=—CN, —CF$_3$, —COOH, —OH, or —C$_n$H$_{2n}$OH, wherein if there are exactly two acceptors, and A$_1$ and A$_2$ are both primary acceptors being one or more of —NO$_2$, or —C(CN)C(CN)$_2$, then the set of {X$_k$} each are independently one or more of —F and —H, but at least one —F must be selected;

wherein if there are exactly two acceptors, and A$_1$ and A$_2$ are both secondary acceptors being one or more of —CN, —CF$_3$, —COOH, —OH, or —C$_n$H$_{2n}$OH, then the set of {X$_k$} each are independently one or more of —F or —H, but at least one —F must be selected;

wherein if there are exactly two acceptors, and one or more of A$_1$ or A$_2$ are one or more of primary acceptor —C($R_1$)=C(CN)$_2$, —C($R_1$)=C($R_2$)($R_3$), or —N=C($R_2$)($R_3$), where $R_1$=CF$_3$, C$_2$F$_5$, or C$_n$F$_{2n+1}$, $R_2$=H, CH$_3$, CF$_3$, C$_2$F$_5$, or C$_n$F$_{2n+1}$, $R_3$=H, CH$_3$, CF$_3$, or C$_2$F$_5$, then the set of {X$_k$} each are independently one or more of —F and —H; and wherein if there are exactly two acceptors and A1 is selected from any primary acceptor and A$_2$ is selected from any secondary acceptor, then X$_1$, X$_2$, X$_3$ each are independently one or more of —F or —H, wherein if there are three or more acceptors A, then the X$_i$ each are independently one or more of —F or —H.

7. The functional optical material of claim 2, wherein one of said optically active chromophore comprises:

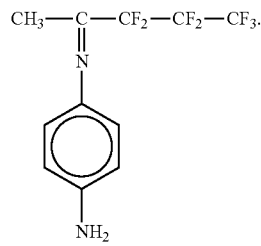

8. The functional optical material of claim 2, wherein said chromophore comprises:

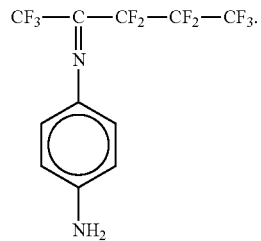

9. The functional optical material of claim 1, wherein said polymer is one or more of acrylic/methacrylic resins; copolymers of acrylic acid esters, methacrylic acid esters, and other mono-unsaturated monomers; polyester polymers; polyurethane polymers; polyimide polymers; polyamide polymers; polyphosphazenes; epoxy resins.

10. The functional optical material of claim 1, wherein said thermoplastic polymer is one or more of copolymers of esters of acrylic and methacrylic acid where the alcohol portion of the ester can be based on hydrocarbon, or partially or fully fluorinated alkyl chains; polyesters where the diacid or diol can contain carbon-hydrogen aliphatic, aromatic or carbon-fluorine functionality; polyurethanes where the diisocyanate can be aliphatic or aromatic, and the diol can contain carbon-hydrogen or carbon-fluorine functionality; polyimides where the acid, amine, or diamine can be partially or fully fluorinated; polyamides where the diacid or diamine can contain carbon-hydrogen aliphatic, aromatic or carbon-fluorine functionality; polyphosphazenes where the polyphosphazene backbone structure can contain fluorinated aromatic or aliphatic functional groups, or carbon-hydrogen functionality; epoxy resins where the epoxy resin can contain carbon-hydrogen or carbon-fluorine functionality, which can further be reacted with diacids or anhydrides that also contain carbon-hydrogen or carbon-fluorine functionality; or organic-inorganic hybrid or nanocomposite polyester polymers where the polyester component consists of aliphatic, aromatic carbon hydrogen or carbon-fluorine functionality and the inorganic components are based on silane or organometallic materials.

11. The functional optical material of claim 1, which has a glass transition temperature above or about 100° C.

12. The functional optical material of claim 1, which has a refractive index value of less than about 1.5.

13. The functional optical material of claim 1, which has a refractive index value of greater than or equal to about 1.5.

14. The functional optical material of claim 1, which additionally contains between about 0.1% and 10% of a promoter having one or more adhesive promotion groups.

15. The functional optical material of claim 1, wherein said compatibilizer contains one or more of nitrile, ester, fluorinated ester, or fluorinated aromatic groups.

16. The functional optical material of claim 1, wherein said adhesion promoter contains one or more of nitrile, silane, fluorinated silane, organic acid; fluorinated organic acid, alcohol, or fluorinated alcohol groups.

17. The functional optical material of claim 1, which additionally contains monomers that provide water resistance by having one or more of styrene or cycloaliphatic groups.

18. The functional optical material of claim 1, which has between about 0.1% and 20% of one or more compatibilizers for said one or more chromophores.

19. The functional optical material of claim 1, wherein said polymer (a) contains carbon-fluorine functionality and also contains less than about 5 wt-% of hydrogen.

20. The functional optical material of claim 1, which has less than 2% water absorption according to a 24 hour water immersion test.

21. The functional optical material of claim 1, which requires about or less than 100 volts per micron of film thickness to pole.

22. The functional material of claim 1, wherein said compatibilizer has a nitrile group, and an adhesion promoter has a silane group.

23. In a functional optical material for use in an optical system, said functional optical material formed from a polymer and a chromophore, the improvement which comprises:
said chromophore being one or more of:
a first substituted aniline:

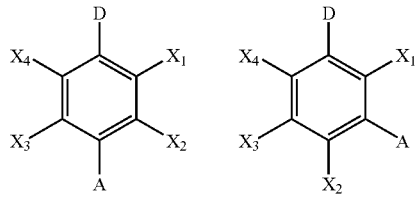

wherein,
D=donor=—$NH_2$, —$N(CH_3)_2$, —$N(CH_2CH_3)_2$, or —$N(Y_1)(Y_2)$, where $Y_i$=alkyl, alkyl alcohols, alkyl (hydrocarbon fluorocarbon) esters, or alkyl silane derivatives;
A=acceptor=—$NO_2$, —$C(CN)=C(CN)_2$, —$C(R_1)=C(CN)_2$, —$C(R_1)=C(R_2)(R_3)$, or —$N=C(R_2)(R_3)$, wherein $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$,
wherein when A=—$NO_2$, or —$C(CN)C(CN)_2$, then $X_1$, $X_2$, $X_3$, $X_4$ each are independently one or more of —F or —H, and at least one —F is selected, and
when A=—$C(R_1)$=$C(CN)_2$, wherein $R_1$=$CF_3$, $C_2F_5$, or $C_nF_{2n+1}$, then $X_1$, $X_2$, $X_3$, $X_4$ each are independently one or more of —F or —H, and
when A=—$C(R_1)$=$C(R_2)(R_3)$, wherein $R_1$=$CF_3$, $C_2F_5$, or $C_nF_{2n+1}$, $R_2$=$CF_3$, $C_2F_5$, or $C_nF_{2n+1}$, $R_3$=H, $CH_3$, $CF_3$, or $C_2F_5$, then $X_1$, $X_2$, $X_3$, $X_4$ each are independently one or more of —F or —H, and
when A=—$N$=$C(R_2)(R_3)$, wherein $R_2$=$CF_3$, $C_2F_5$, or $C_nF_{2n+1}$, $R_3$=H, $CH_3$, $CF_3$, or $C_2F_5$, then $X_1$, $X_2$, $X_3$, $X_4$ each are independently one or more of —F or —H;

or a second substituted aniline:

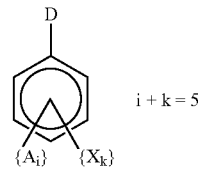

$i + k = 5$ wherein,
D=donor=—$NH_2$, —$N(CH_3)_2$, —$N(CH_2CH_3)_2$, or —$N(Y_1)(Y_2)$ where $Y_i$=alkyl, alkyl alcohols, alkyl (hydrocarbon or fluorocarbon) esters, or alkyl silane derivatives;
a primary acceptor A=—$NO_2$, —$C(CN)=C(CN)_2$, —$C(R_1)=C(CN)_2$, —$C(R_1)=C(R_2)(R_3)$, or —$N=C(R_2)(R_3)$, $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$,
a secondary acceptor A=—CN, —$CF_3$, —COOH, —OH, or —$C_nH_{2n}OH$,
wherein if there are exactly two acceptors, and $A_1$ and $A_2$ are both primary acceptors being one or more of —$NO_2$, or —$C(CN)C(CN)_2$, then the set of $\{X_k\}$ each are independently one or more of —F and —H, but at least one —F must be selected;
wherein if there are exactly two acceptors, and $A_1$ and $A_2$ are both secondary acceptors being one or more of —CN, —$CF_3$, —COOH, —OH, or —$C_nH_{2n}OH$, then the set of $\{X_k\}$ each are independently one or more of —F or —H, but at least one —F must be selected;
wherein if there are exactly two acceptors, and one or more of $A_1$ or $A_2$ are one or more of primary acceptor —$C(R_1)$=$C(CN)_2$, —$C(R_1)$=$C(R_2)(R_3)$, or —$N$=$C(R_2)(R_3)$, where $R_1$=$CF_3$, $C_2F_5$, or $C_nF_{2n+1}$, $R_2$=H, $CH_3$, $CF_3$, $C_2F_5$, or $C_nF_{2n+1}$, $R_3$=H, $CH_3$, $CF_3$, or $C_2F_5$, then the set of $\{X_k\}$ each are independently one or more of —F and —H; and
wherein if there are exactly two acceptors and $A_1$ is selected from any primary acceptor and $A_2$ is selected from any secondary acceptor, then $X_1$, $X_2$, $X_3$ each are independently one or more of —F or —H,
wherein if there are three or more acceptors A, then the $X_i$ each are independently one or more of —F or —H.

24. In a functional optical material for use in an optical system, said functional optical material formed from a polymer and a chromophore, the improvement which comprises:
said chromophore being one or more of:
a first substituted azobenzene:

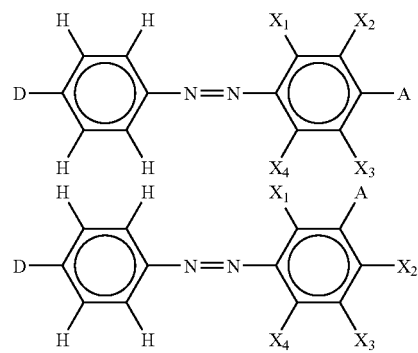

wherein,

D=donor=—NH$_2$, —N(CH$_3$)$_2$, —N(CH$_2$CH$_3$)$_2$, or —N(Y$_1$)(Y$_2$), where Y$_i$=alkyl, alkyl alcohols, alkyl (hydrocarbon fluorocarbon) esters, or alkyl silane derivatives;

A=acceptor=—NO$_2$, —C(CN)=C(CN)$_2$, —C(R$_1$)=C(CN)$_2$, —C(R$_1$)=C(R$_2$)(R$_3$), or —N=C(R$_2$)(R$_3$), wherein R$_1$=CF$_3$, C$_2$F$_5$, or C$_n$Y$_{2n+1}$, R$_2$=H, CH$_3$, CF$_3$, C$_2$F$_5$, or C$_n$F$_{2n+1}$, R$_3$=H, CH$_3$, CF$_3$, or C$_2$F$_5$, wherein when A=—NO$_2$, or —C(CN)C(CN$_2$), then X$_1$, X$_2$, X$_3$, X$_4$ each are independently one or more of —F or —H, and at least one —F is selected, and when A=—C(R$_1$)=C(CN)$_2$, wherein R$_1$=CF$_3$, C$_2$F$_5$, or C$_n$F$_{2n+1}$, then X$_1$, X$_2$, X$_3$, X$_4$ each are independently one or more of —F or —H, and when A=—C(R$_1$)=C(R$_2$)(R$_3$), wherein R$_1$=CF$_3$, C$_2$F$_5$, or C$_n$F$_{2n+1}$, R$_2$=CF$_3$, C$_2$F$_5$, or C$_n$F$_{2n+1}$, R$_3$=H, CH$_3$, CF$_3$, or C$_2$F$_5$, then X$_1$, X$_2$, X$_3$, X$_4$ each are independently one or more of —F or —H, and when A=—N=C(R$_2$)(R$_3$), wherein R$_2$=CF$_3$, C$_2$F$_5$, or C$_n$F$_{2n+1}$, R$_3$=H, CH$_3$, CF$_3$, or C$_2$F$_5$, then X$_1$, X$_2$, X$_3$, X$_4$ each are independently one or more of —F or —H;

or a second substituted azobenzene:

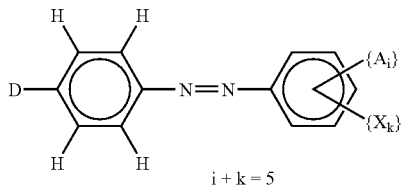

i + k = 5 wherein,

D=donor=—NH$_2$, —N(CH$_3$)$_2$, —N(CH$_2$CH$_3$)$_2$, or —N(Y$_1$)(Y$_2$) where Y$_i$=alkyl, alkyl alcohols, alkyl (hydrocarbon or fluorocarbon) esters, or alkyl silane derivatives;

a primary acceptor A=—NO$_2$, —C(CN)=C(CN)$_2$, —C(R$_1$)=C(CN)$_2$, —C(R$_1$)=C(R$_2$)(R$_3$), or —N=C(R$_2$)(R$_3$), R$_1$=CF$_3$, C$_2$F$_5$, or C$_n$F$_{2n+1}$, R$_2$=H, CH$_3$, CF$_3$, C$_2$F$_5$, or C$_n$F$_{2n+1}$, R$_3$=H, CH$_3$, CF$_3$, or C$_2$F$_5$, a secondary acceptor A=—CN, —CF$_3$, —COOH, —OH, or —C$_n$H$_{2n}$OH, wherein if there are exactly two acceptors, and A$_1$ and A$_2$ are both primary acceptors being one or more of —NO$_2$, or —C(CN)C(CN)$_2$, then the set of {X$_k$} each are independently one or more of —F and —H, but at least one —F must be selected;

wherein if there are exactly two acceptors, and A$_1$ and A$_2$ are both secondary acceptors being one or more of —CN, —CF$_3$, —COOH, —OH, or —C$_n$H$_{2n}$OH, then the set of {X$_k$} each are independently one or more of —F or —H, but at least one —F must be selected;

wherein if there are exactly two acceptors, and one or more of A$_1$ or A$_2$ are one or more of primary acceptor —C(R$_1$)=C(CN)$_2$, —C(R$_1$)=C(R$_2$)(R$_3$), or —N=C(R$_2$)(R$_3$), where R$_1$=CF$_3$, C$_2$F$_5$, or C$_n$F$_{2n+1}$, R$_2$=H, CH$_3$, CF$_3$, C$_2$F$_5$, or C$_n$F$_{2n+1}$, R$_3$=H, CH$_3$, CF$_3$, or C$_2$F$_5$, then the set of {X$_k$} each are independently one or more of —F and —H; and wherein if there are exactly two acceptors and A$_1$ is selected from any primary acceptor and A$_2$ is selected from any secondary acceptor, then X$_1$, X$_2$, X$_3$ each are independently one or more of —F or —H, wherein if there are three or more acceptors A, then the X$_i$ each are independently one or more of —F or —H.

25. In a functional optical material for use in an optical system, said functional optical material formed from a polymer and a chromophore, the improvement which comprises:

said chromophore being one or more of:

a first substituted stilbene:

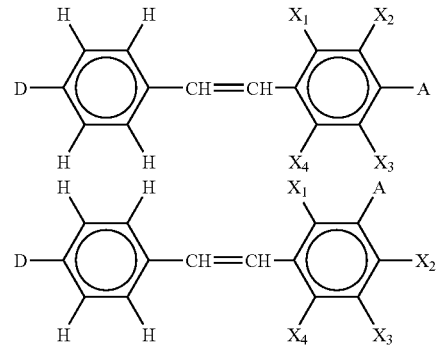

wherein,

D=donor=—NH$_2$, —N(CH$_3$)$_2$, —N(CH$_2$CH$_3$)$_2$, or —N(Y$_1$)(Y$_2$), where Y$_i$=alkyl, alkyl alcohols, alkyl (hydrocarbon fluorocarbon) esters, or alkyl silane derivatives;

A=acceptor=—NO$_2$, —C(CN)=C(CN)$_2$, —C(R$_1$)=C(CN)$_2$, —C(R$_1$)=C(R$_2$)(R$_3$), or —N=C(R$_2$)(R$_3$), wherein R$_1$=CF$_3$, C$_2$F$_5$, or C$_n$F$_{2n+1}$, R$_2$=H, CH$_3$, CF$_3$, C$_2$F$_5$, or C$_n$F$_{2n+1}$, R$_3$=H, CH$_3$, CF$_3$, or C$_2$F$_5$, wherein when A=—NO$_2$, or —C(CN)C(CN$_2$), then X$_1$, X$_2$, X$_3$, X$_4$ each are independently one or more of —F or —H, and at least one —F is selected, and when A=—C(R$_1$)=C(CN)$_2$, wherein R$_1$=CF$_3$, C$_2$F$_5$, or C$_n$F$_{2n+1}$, then X$_1$, X$_2$, X$_3$, X$_4$ each are independently one or more of —F or —H, and when A=—C(R$_1$)=C(R$_2$)(R$_3$), wherein R$_1$=CF$_3$, C$_2$F$_5$, or C$_n$F$_{2n+1}$, R$_2$=CF$_3$, C$_2$F$_5$, or C$_n$F$_{2n+1}$, R$_3$=H, CH$_3$, CF$_3$, or C$_2$F$_5$, then X$_1$, X$_2$, X$_3$, X$_4$ each are independently one or more of —F or —H, and when A=—N=C(R$_2$)(R$_3$), wherein R$_2$=CF$_3$, C$_2$F$_5$, or C$_n$F$_{2n+1}$, R$_3$=H, CH$_3$, CF$_3$, or C$_2$F$_5$, then X$_1$, X$_2$, X$_3$, X$_4$ each are independently one or more of —F or —H;

or a second substituted stilbene:

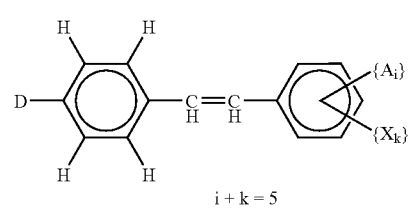

i + k = 5 wherein,

D=donor=—NH$_2$, —N(CH$_3$)$_2$, —N(CH$_2$CH$_3$)$_2$, or —N(Y$_1$)(Y$_2$) where Y$_i$=alkyl, alkyl alcohols, alkyl (hydrocarbon or fluorocarbon) esters, or alkyl silane derivatives;

a primary acceptor A=—NO$_2$, —C(CN)=C(CN)$_2$, —C(R$_1$)=C(CN)$_2$, —C(R$_1$)=C(R$_2$)(R$_3$), or —N=C(R$_2$)(R$_3$), R$_1$=CF$_3$, C$_2$F$_5$, or C$_n$F$_{2n+1}$, R$_2$=H, CH$_3$, CF$_3$, C$_2$F$_5$, or C$_n$F$_{2n+1}$, R$_3$=H, CH$_3$, CF$_3$, or C$_2$F$_5$, a secondary acceptor A=—CN, —CF$_3$, —COOH, —OH, or —C$_n$H$_{2n}$OH, wherein if there are exactly two acceptors, and A$_1$ and A$_2$ are both primary acceptors being one or more of —NO$_2$, or C(CN)C(CN$_2$), then the set of {X$_k$} each are independently one or more of —F and —H, but at least one —F must be selected;

wherein if there are exactly two acceptors, and A$_1$ and A$_2$ are both secondary acceptors being one or more of —CN, —CF$_3$, —COOH, —OH, or —C$_n$H$_{2n}$OH, then the set of {X$_k$} each are independently one or more of —F or —H, but at least one —F must be selected;

wherein if there are exactly two acceptors, and one or more of A$_1$ or A$_2$ are one or more of primary acceptor —C(R$_1$)=C(CN)$_2$, —C(R$_1$)=C(R$_2$)(R$_3$), or —N=C(R$_2$)(R$_3$), where R$_1$=CF$_3$, C$_2$F$_5$, or C$_n$F$_{2n+1}$, R$_2$=H, CH$_3$, CF$_3$, C$_2$F$_5$, or C$_n$F$_{2n+1}$, R$_3$=H, CH$_3$, CF$_3$, or C$_2$F$_5$, then the set of {X$_k$} each are independently one or more of —F and —H; and wherein if there are exactly two acceptors and A$_1$ is selected from any primary acceptor and A$_2$ is selected from any secondary acceptor, then X$_1$, X$_2$, X$_3$ each are independently one or more of —F or —H, wherein if there are three or more acceptors A$_1$ then the X$_i$ each are independently one or more of —F or —H.

26. In a functional optical material for use in an optical system, said functional optical material formed from a polymer and a chromophore, the improvement which comprises:
said chromophore being one or more of:
a first substituted imine:

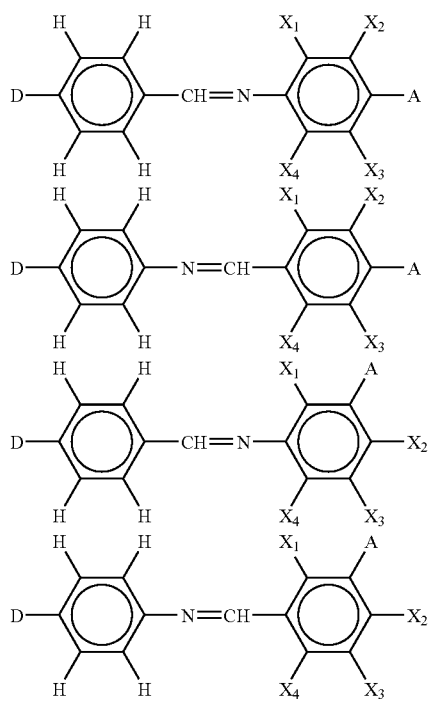

wherein,
D=donor=—NH$_2$, —N(CH$_3$)$_2$, —N(CH$_2$CH$_3$)$_2$, or —N(Y$_1$)(Y$_2$), where Y$_i$=alkyl, alkyl alcohols, alkyl (hydrocarbon fluorocarbon) esters, or alkyl silane derivatives;
A=acceptor=—NO$_2$, —C(CN)=C(CN)$_2$, —C(R$_1$)=C(CN)$_2$, —C(R$_1$)=C(R$_2$)(R$_3$), or —N=C(R$_2$)(R$_3$),
wherein R$_1$=CF$_3$, C$_2$F$_5$, or C$_n$F$_{2n+1}$, R$_2$=H, CH$_3$, CF$_3$, C$_2$F$_5$, or C$_n$F$_{2n+1}$, R$_3$=H, CH$_3$, CF$_3$, or C$_2$F$_5$, wherein when A=—NO$_2$, or —C(CN)C(CN$_2$), then X$_1$, X$_2$, X$_3$, X$_4$ each are independently one or more of —F or —H, and at least one —F is selected, and when A=—C(R$_1$)=C(CN)$_2$, wherein R$_1$=CF$_3$, C$_2$F$_5$, or C$_n$F$_{2n+1}$, then X$_1$, X$_2$, X$_3$, X$_4$ each are independently one or more of —F or —H, and when A=—C(R$_1$)=C(R$_2$)(R$_3$), wherein R$_1$=CF$_3$, C$_2$F$_5$, or C$_n$F$_{2n+1}$, R$_2$=CF$_3$, C$_2$F$_5$, or C$_n$F$_{2n+1}$, R$_3$=H, CH$_3$, CF$_3$, or C$_2$F$_5$, then X$_1$, X$_2$, X$_3$, X$_4$ each are independently one or more of —F or —H, and when A=—N=C(R$_2$)(R$_3$), wherein R$_2$=CF$_3$, C$_2$F$_5$, or C$_n$F$_{2n+1}$, R$_3$=H, CH$_3$, CF$_3$, or C$_2$F$_5$, then X$_1$, X$_2$, X$_3$, X$_4$ each are independently one or more of —F or —H;

or second substituted imine:

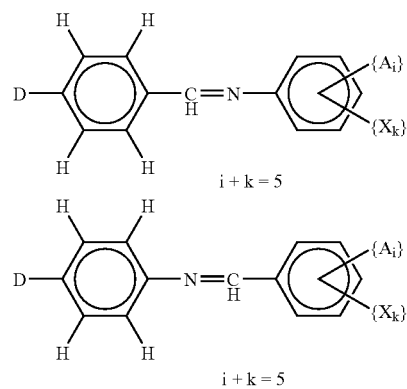

wherein,
D=donor=—NH$_2$, —N(CH$_3$)$_2$, —N(CH$_2$CH$_3$)$_2$, or —N(Y$_1$)(Y$_2$) where Y$_i$=alkyl, alkyl alcohols, alkyl (hydrocarbon or fluorocarbon) esters, or alkyl silane derivatives;
a primary acceptor A=—NO$_2$, —(CN)=C(CN)$_2$, —C(R$_1$)=C(CN)$_2$, —C(R$_1$)=C(R$_2$)(R$_3$), or —N=C(R$_2$)(R$_3$), R$_1$=CF$_3$, C$_2$F$_5$, or C$_n$F$_{2n+1}$, R$_2$=H, CH$_3$, CF$_3$, C$_2$F$_5$, or C$_n$F$_{2n+1}$, R$_3$=H, CH$_3$, CF$_3$, or C$_2$F$_5$,
a secondary acceptor A=—CN, —CF$_3$, —COOH, —OH, or —C$_n$H$_{2n}$OH, wherein if there are exactly two acceptors, and A$_1$ and A$_2$ are both primary acceptors being one or more of —NO$_2$, or —C(CN)C(CN$_2$), then the set of {X$_k$} each are independently one or more of —F and —H, but at least one —F must be selected;

wherein if there are exactly two acceptors, and A$_1$ and A$_2$ are both secondary acceptors being one or more of —CN, —CF$_3$, —COOH, —OH, or —C$_n$H$_{2n}$OH, then the set of {X$_k$} each are independently one or more of —F or —H, but at least one —F must be selected;

wherein if there are exactly two acceptors, and one or more of A$_1$ or A$_2$ are one or more of primary acceptor —C(R$_1$)=C(CN)$_2$, —C(R$_1$)=C(R$_2$)(R$_3$), or —N=C(R$_2$)(R$_3$), where R$_1$=CF$_3$, C$_2$F$_5$, or C$_n$F$_{2n+1}$, R$_2$=H, CH$_3$, CF$_3$, C$_2$F$_5$, or C$_n$F$_{2n+1}$, R$_3$=H, CH$_3$, CF$_3$, or C$_2$F$_5$, then the set of {X$_k$} each are independently one or more of —F and —H; and wherein if there are exactly two acceptors and A$_1$ is selected from any primary acceptor and A$_2$ is selected from any secondary acceptor, then X$_1$, X$_2$, X$_3$ each are independently one or more of —F or —H, wherein if there are three or more acceptors A$_1$ then the X$_i$ each are independently one or more of —F or —H.

27. A functional optical material for use in an optical system, comprising:
(a) a polymer selected from the group comprising,
(1) a thermoplastic polymer;
(2) a thermosetting polymer; and
(3) a combination of thermoplastic and thermosetting polymers; wherein said one or more thermoplastic or thermosetting polymers contain one or more of carbon-hydrogen or carbon-fluorine functionality; and
(b) an optically active chromophore being one or more of blended or copolymerized with said polymer, wherein said chromophore comprises:

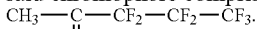
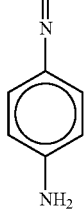

28. A functional optical material for use in an optical system, comprising:
(a) a polymer selected from the group comprising,
(1) a thermoplastic polymer;
(2) a thermosetting polymer; and
(3) a combination of thermoplastic and thermosetting polymers; wherein one or more of said thermoplastic polymer or said thermosetting polymer contains one or more of carbon-hydrogen or carbon-fluorine functionality; and
(b) an optically active chromophore being one or more of blended or copolymerized with said polymer, wherein at least one chromophore comprises:

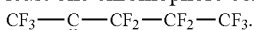
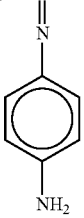

29. A functional optical material useful in an optical system comprising:
a polymer of
(a) one or more of a partially or fully fluorinated first monomer having a refractive index of less than 1.5,
(b) optionally, one or more of a second monomer having a refractive index of greater than or equal to 1.5;
(c) at least one optically active chromophore being one or more of blended or copolymerized with said polymer; and
one or more of:
(d) a compatibilizer copolymerized with said polymer, having one or more pendant groups of nitrites, esters, hydroxyls, aromatics; fluorinated esters, or fluorinated aromatics; or
an adhesion promoter copolymerized with said polymer, having one or more pendant groups of nitrites, silanes, fluorinated silanes, organic acids; fluorinated organic acids, hydroxyls, fluorinated alcohols, amides, or amines.

30. A method of forming a functional optical material, which comprises:
(a) providing a polymer selected from one or more of:
(1) a thermoplastic polymer;
(2) a thermosetting polymer; or
(3) a combination of thermoplastic and thermosetting polymers; wherein said thermoplastic and/or thermosetting polymers contain carbon-hydrogen and/or carbon-fluorine functionality;
(b) providing one or more optically active chromophores;
(c) providing one or more of:
(i) a compatibilizer having one or more pendant groups of nitrites, esters, hydroxyls, aromatics; fluorinated esters, or fluorinated aromatics; or
(ii) an adhesion promoter having one or more pendant groups of nitrites, silanes, fluorinated silanes, organic acids; fluorinated organic acids, hydroxyls, fluorinated alcohols, amides, or amines;
(d) one or more of blending or copolymerizing said chromophore with said polymer; and
(e) copolymerizing one or more of said compatibilizer or said adhesion promoter with said polymer.

31. The method of claim 30, wherein said functional optical material has a $T_g$ of greater than about 100° C.

32. A functional optical material for use in an optical system comprising:

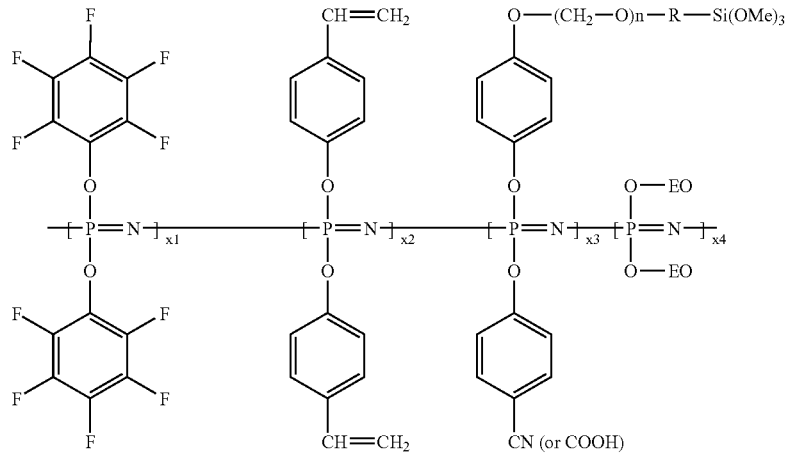

wherein $x_1$=50-80 wt. %, $x_2$=10-15 wt. %, $x_3$=1-5 wt. %, $x_4$=5-20 wt. %, and wherein one or more of said —F atoms may be substituted by an —H atom.

33. A gelled functional optical material for use in an optical system, comprising:
 (a) a polymer selected from one or more of:
  (1) a thermoplastic polymer;
  (2) a thermosetting polymer; or
  (3) a combination of thermoplastic and thermosetting polymers; wherein said thermoplastic and/or thermosetting polymers contain carbon-hydrogen and/or carbon-fluorine functionality; and
 (b) one or more optically active chromophores being one or more of blended or copolymerized with said polymer; one or more of:
 (c) a compatibilizer copolymerized with said polymer, having one or more pendant groups of nitriles, esters, hydroxyls, aromatics; fluorinated esters, or fluorinated aromatics; or
 (d) an adhesion promoter copolymerized with said polymer, having one or more pendant groups of nitriles, silanes, fluorinated silanes, organic acids; fluorinated organic acids, hydroxyls, fluorinated alcohols, amides, or amines; and
 (e) a solvent for gelling said functional optical material.

34. The gelled functional optical material of claim 33, wherein said solvent is one or more of aliphatic alcohols, aromatic alcohols, esters, carbonates, or ethers.

35. The gelled functional optical material of claim 34, wherein said solvent is fluorinated.

36. The gelled functional optical material of claim 34, wherein said solvent is one or more of trimethylolpropane, triacrylate, dioctylsuberate, propylene carbonate, nitrobenzene, dioctylsuberate, dioctylsuberate, dioctyl phthalate, dioxane, or dibutylphthalate.

37. The gelled functional optical material of claim 33, wherein said polymer is one or more of acrylic/methacrylic resins; copolymers of acrylic acid esters, methacrylic acid esters, and other mono-unsaturated monomers; polyester polymers; polyurethane polymers; polyimide polymers; polyamide polymers; polyphosphazenes; epoxy resins.

38. The gelled functional optical material of claim 33, wherein said thermoplastic polymer is one or more of copolymers of esters of acrylic and methacrylic acid where the alcohol portion of the, ester can be based on hydrocarbon, or partially or fully fluorinated alkyl chains; polyesters where the diacid or diol can contain carbon-hydrogen aliphatic, aromatic or carbon-fluorine functionality; polyurethanes where the diisocyanate can be aliphatic or aromatic, and the diol can contain carbon-hydrogen or carbon-fluorine functionality; polyimides where the acid, amine, or diamine can be partially or fully fluorinated; polyamides where the diacid or diamine can contain carbon-hydrogen aliphatic, aromatic or carbon-fluorine functionality; polyphosphazenes where the polyphosphazene backbone structure can contain fluorinated aromatic or aliphatic functional groups, or carbon-hydrogen functionality; epoxy resins where the epoxy resin can contain carbon-hydrogen or carbon-fluorine functionality, which can further be reacted with diacids or anhydrides that also contain carbon-hydrogen or carbon-fluorine functionality; or organic-inorganic hybrid or nanocomposite polyester polymers where the polyester component consists of aliphatic, aromatic carbon hydrogen or carbon-fluorine functionality and the inorganic components are based on silane or organometallic materials.

39. The gelled functional optical material of claim 33, which has a glass transition temperature below the operating temperature of the optical system.

40. The gelled functional optical material of claim 33, which has a refractive index value of less than about 1.5.

41. The gelled functional optical material of claim 33, which has a refractive index value of greater than or equal to about 1.5.

42. The gelled functional optical material of claim 33, which additionally contains between about 0.1% and 10% of a promoter having one or more adhesive promotion groups.

43. The gelled functional optical material of claim 33, wherein said compatibilizer contains one or more of nitrile, ester, fluorinated ester, or fluorinated aromatic groups.

44. The gelled functional optical material of claim 33, wherein said adhesion promoter contains one or more of nitrile, silane, fluorinated silane, organic acid; fluorinated organic acid, alcohol, or fluorinated alcohol groups.

45. The gelled functional optical material of claim 33, which additionally contains monomers that provide water resistance by having one or more of styrene or cycloaliphatic groups.

46. The gelled functional optical material of claim 33, which has between about 0.1% and 20% of one or more compatibilizers for said one or more chromophores.

47. The gelled functional optical material of claim 33, wherein said polymer (a) contains carbon-fluorine functionality and also contains less than about 5 wt-% of hydrogen.

48. The gelled functional optical material of claim 33, which has less than 2% water absorption according to a 24 hour water immersion test.

49. The gelled functional material of claim 33, wherein said compatibilizer has a nitrile group, and an adhesion promoter has a silane group.

50. The gelled functional optical material of claim 33, wherein said chromophore is one or more of a substituted aniline, substituted azobenzene, substituted stilbene, or substituted imine, chromophores of the Donor-Bridge-Acceptor structure, $\chi_{(3)}$ chromophores, or electrochromic, or photochromic materials or dye.

51. A functional optical material for use in an optical system, comprising:
 (a) a polymer selected from one or more of:
  (1) a thermoplastic polymer;
  (2) a thermosetting polymer; or
  (3) a combination of thermoplastic and thermosetting polymers; wherein said thermoplastic and/or thermosetting polymers contain carbon-hydrogen and/or carbon-fluorine functionality; and
 (b) one or more optically active chromophores being one or more of blended or copolymerized with said polymer; one or more of:
 (c) a compatibilizer copolymerized with said polymer, having one or more pendant groups of nitrites, esters, hydroxyls, aromatics; fluorinated esters, or fluorinated aromatics; or
 (d) an adhesion promoter copolymerized with said polymer, having one or more pendant groups of nitrites, silanes, fluorinated silanes, organic acids; fluorinated organic acids, hydroxyls, fluorinated alcohols, amides, or amines; and
 (e) a filler, wherein the optical loss of said functional optical material does not more than about double by virtue of the presence of said filler.

52. The functional optical material of claim 51, which additionally comprises a solvent for gelling said functional optical material.

53. The functional optical material of claim 52, wherein said solvent is one or more of aliphatic alcohols, aromatic alcohols, esters, carbonates, or ethers.

54. The functional optical material of claim 52, wherein said solvent is one or more of trimethylolpropane, triacrylate, dioctylsuberate, propylene carbonate, nitrobenzene, dioctylsuberate, dioctylsuberate, dioctyl phthalate, dioxane, or dibutylphthalate.

55. The functional optical material of claim 51, wherein said filler is one or more of silica, $CaF_2$, CdSe, CdS coated CdSe, a rare earth metal, cross-linked polymers that are incompatible with said polymer, organometallic compounds, metal chelates, metal salts of organic acids, metal salts of inorganic acids, semiconductors, metal oxides, metals, silicates, or aluminates.

56. The functional optical material of claim 51, wherein said solvent is fluorinated.

57. The functional optical material of claim 51, wherein said polymer is one or more of acrylic/methacrylic resins; copolymers of acrylic acid esters, methacrylic acid esters, and other mono-unsaturated monomers; polyester polymers; polyurethane polymers; polyimide polymers; polyamide polymers; polyphosphazenes; epoxy resins.

58. The functional optical material of claim 51, wherein said thermoplastic polymer is one or more of copolymers of esters of acrylic and methacrylic acid where the alcohol portion of the ester can be based on hydrocarbon, or partially or fully fluorinated alkyl chains; polyesters where the diacid or diol can contain carbon-hydrogen aliphatic, aromatic or carbon-fluorine functionality; polyurethanes where the diisocyanate can be aliphatic or aromatic, and the diol can contain carbon-hydrogen or carbon-fluorine functionality; polyimides where the acid, amine, or diamine can be partially or fully fluorinated; polyamides where the diacid or diamine can contain carbon-hydrogen aliphatic, aromatic or carbon-fluorine functionality; polyphosphazenes where the polyphosphazene backbone structure can contain fluorinated aromatic or aliphatic functional groups, or carbon-hydrogen functionality; epoxy resins where the epoxy resin can contain carbon-hydrogen or carbon-fluorine functionality, which can further be reacted with diacids or anhydrides that also contain carbon-hydrogen or carbon-fluorine functionality; or organic-inorganic hybrid or nanocomposite polyester polymers where the polyester component consists of aliphatic, aromatic carbon hydrogen or carbon-fluorine functionality and the inorganic components are based on silane or organometallic materials.

59. The functional optical material of claim 51, which has a glass transition temperature above or about 100° C.

60. The functional optical material of claim 51, which has a refractive index value of less than about 1.5.

61. The functional optical material of claim 51, which has a refractive index value of greater than or equal to about 1.5.

62. The functional optical material of claim 51, which additionally contains between about 0.1% and 10% of a promoter having one or more adhesive promotion groups.

63. The functional optical material of claim 51, wherein said compatibilizer contains one or more of nitrile, ester, fluorinated ester, or fluorinated aromatic groups.

64. The functional optical material of claim 51, wherein said adhesion promoter contains one or more of nitrile, silane, fluorinated silane, organic acid; fluorinated organic acid, alcohol, or fluorinated alcohol groups.

65. The functional optical material of claim 51, which additionally contains monomers that provide water resistance by having one or more of styrene or cycloaliphatic groups.

66. The functional optical material of claim 51, which has between about 0.1% and 20% of one or more compatibilizers for said one or more chromophores.

67. The functional optical material of claim 51, wherein said polymer (a) contains carbon-fluorine functionality and also contains less than about 5 wt-% of hydrogen.

68. The functional optical material of claim 51, which has less than 2% water absorption according to a 24 hour water immersion test.

69. The functional optical material of claim 51, which requires about or less than 100 volts per micron of film thickness to pole.

70. The functional material of claim 51, wherein said compatibilizer has a nitrile group, and an adhesion promoter has a silane group.

71. The functional optical material of claim 51, wherein said chromophore is one or more of a substituted aniline, substituted azobenzene, substituted stilbene, or substituted imine.

* * * * *

UNITED STATES PATENT AND TRADEMARK OFFICE
CERTIFICATE OF CORRECTION

| | | |
|---|---|---|
| PATENT NO. | : 7,854,863 B2 | |
| APPLICATION NO. | : 10/505041 | |
| DATED | : December 21, 2010 | |
| INVENTOR(S) | : Elizabeth Drotleff et al. | |

It is certified that error appears in the above-identified patent and that said Letters Patent is hereby corrected as shown below:

Front page, Item (75) inventor "Kevin Bruce" should read -- Kevin Bruce Spahr --.

Column 109, line 5, claim 3, formula " 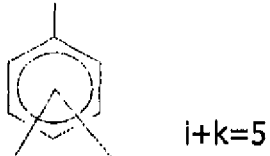 " should read -- 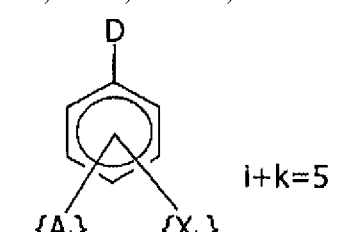 --;
line 31, formula "{Xk}" should read -- $\{X_k\}$ --.

Column 111, line 30, claim 5, text "$R_3$—H," should read -- $R_3$=H, --.

Column 113, line 12, claim 6, text "a or second" should read -- or a second --;
line 49, formula "—$C_nH_2OH$," should read -- —$C_nH_{2n}OH$, --;
line 59, text "A1" should read -- $A_1$ --.

Column 117, line 8, claim 24, formula "$C_nY_{2n+1}$," should read -- $C_nF_{2n+1}$, --;
line 42, formula "$R_1$—$CF_3$," should read -- $R_1$=$CF_3$, --.

Column 118, line 33, claim 25, formula "$R_3$—H," should read -- $R_3$=H, --.

Column 120, line 52, claim 26, formula "—$C_bH_{2n}OH$," should read -- $C_nH_{2n}OH$, --.

Signed and Sealed this
Twenty-second Day of March, 2011

David J. Kappos
*Director of the United States Patent and Trademark Office*

CERTIFICATE OF CORRECTION (continued)
U.S. Pat. No. 7,854,863 B2

Column 122, line 14, claim 29, text "aromatics;" should read -- aromatics, --;
    line 18, text "organic acids;" should read -- organic acids, --;
    line 33, claim 30, text "aromatics;" should read -- aromatics, --;
    line 37, text "acids;" should read -- acids, --.

Column 123, line 36, claim 36, text "dioctylsuberate, dioctylsuberate," should be deleted;
    line 47, claim 38, text "the, ester" should read -- the ester --;
    line 65, text "carbon hydrogen" should read -- carbon-hydrogen --.

Column 124, line 55, claim 51, text "aromatics;" should read -- aromatics, --;
    line 59, text "organic acids;" should read -- organic acids, --.

Column 125, lines 6-7, claim 54, text "dioctylsuberate, dioctylsuberate," should be deleted.

Column 126, line 18, claim 64, text "organic acids;" should read -- organic acids, --.